(12) United States Patent
Nakamura et al.

(10) Patent No.: US 7,531,234 B2
(45) Date of Patent: May 12, 2009

(54) HIGH REFRACTION FILM, HIGH REFRACTION FILM-FORMING COATING COMPOSITION, ANTI-REFLECTION FILM, PROTECTIVE FILM FOR POLARIZING PLATE, POLARIZING PLATE AND IMAGE DISPLAY DEVICE

(75) Inventors: Kenichi Nakamura, Minami-Ashigara (JP); Shigeaki Ootani, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 294 days.

(21) Appl. No.: 10/511,035

(22) PCT Filed: Apr. 28, 2003

(86) PCT No.: PCT/JP03/05476

§ 371 (c)(1),
(2), (4) Date: Oct. 13, 2004

(87) PCT Pub. No.: WO03/093878

PCT Pub. Date: Nov. 13, 2003

(65) Prior Publication Data

US 2005/0175796 A1   Aug. 11, 2005

(30) Foreign Application Priority Data

| May 1, 2002 | (JP) | 2002-129929 |
| Dec. 13, 2002 | (JP) | 2002-362856 |
| Dec. 13, 2002 | (JP) | 2002-362873 |
| Feb. 18, 2003 | (JP) | 2003-040041 |

(51) Int. Cl.
*B32B 5/16* (2006.01)

(52) U.S. Cl. .................. 428/328; 428/323
(58) Field of Classification Search .............. None
See application file for complete search history.

(56) References Cited

U.S. PATENT DOCUMENTS

| 2,992,122 A * | 7/1961 | Beck et al. ................ 501/33 |
| 6,037,289 A * | 3/2000 | Chopin et al. ............. 502/2 |

(Continued)

FOREIGN PATENT DOCUMENTS

EP    0 736 073    3/1998

(Continued)

*Primary Examiner*—Monique R Jackson
(74) *Attorney, Agent, or Firm*—Buchanan Ingersoll & Rooney PC

(57) ABSTRACT

A high refraction film, an anti-reflection film, a protective film for polarizing plate, a polarizing plate and an image display device excellent in weathering resistance are provided. The high refraction film comprises inorganic fine particles having an average particle diameter of from 1 to 200 nm comprising titanium dioxide as a main component and has a refractive index of from 1.55 to 2.40. The anti-reflection film comprises a transparent support and a high refraction film formed thereon. The polarizing plate comprises a polarizing film and two protective films having said polarizing film interposed therebetween, wherein an anti-reflection film is used as at least one of the two protective films or wherein an anti-reflection film is used as one protective film and an optically compensated film having optical isomerism is used as another protective sheet. The image display device has a structure comprising an anti-reflection film or a polarizing plate disposed on the image display surface thereof.

30 Claims, 3 Drawing Sheets

U.S. PATENT DOCUMENTS

| | | | |
|---|---|---|---|
| 6,719,821 B2 * | 4/2004 | Yadav et al. | 75/343 |
| 6,777,070 B1 * | 8/2004 | Murata et al. | 428/323 |

FOREIGN PATENT DOCUMENTS

| | | |
|---|---|---|
| EP | 1 029 832 | 8/2000 |
| EP | 1 089 093 | 4/2001 |
| JP | 11-209554 A | 8/1999 |
| JP | 2000-109345 A | 4/2000 |
| JP | 2001-166104 A | 6/2001 |
| JP | 2002-006104 A | 1/2002 |
| JP | 2002-116323 A | 4/2002 |
| JP | 2002-302561 A | 10/2002 |

* cited by examiner (a)

(b)

(a)

(b)

(a)

(b)

HIGH REFRACTION FILM, HIGH REFRACTION FILM-FORMING COATING COMPOSITION, ANTI-REFLECTION FILM, PROTECTIVE FILM FOR POLARIZING PLATE, POLARIZING PLATE AND IMAGE DISPLAY DEVICE

TECHNICAL FIELD

The present invention relates to a high refraction film, a high refraction film-forming coating composition, and an anti-reflection film, a protective film for polarizing plate, a polarizing plate and an image display device comprising a high refraction film.

BACKGROUND ART

An anti-reflection film is disposed on the display surface of various image display devices such as liquid crystal display device (LCD), plasma display panel (PDP), electroluminescence display (ELD) and cathode ray display device (CRT) to inhibit contrast drop due to reflection of external light or image. Therefore, an anti-reflection film is required to have a high physical strength (scratch resistance, etc.), chemical resistance and weathering resistance (resistance to moist heat, light-resistance, etc.).

As the anti-reflection coat (layer having a laminated structure of high refraction film, middle refraction film, low refraction film, etc.) to be used in the anti-reflection film there has heretofore been normally used a multi-layer coat comprising a lamination of thin transparent films of metal oxide. It has been usually practiced to form these thin transparent films of metal oxide by a chemical vapor deposition (CVD) method or physical vapor deposition (PVD) method, particularly vacuum deposition method, which is one of physical vapor deposition methods.

However, the vacuum deposition method for the formation of thin transparent film of metal oxide gives a low productivity and thus is not suitable for mass production, and a coating method having a high productivity has been proposed.

In the case where the anti-reflection film is prepared by a coating method, it is preferred that the high refraction film be prepared by incorporating inorganic fine particles having a high refractive index dispersed more finely in a film. It is known that when inorganic fine particles having a high refractive index are incorporated finely dispersed in a film in a larger amount, a transparent high refraction film having a higher refractive index is formed (see, for example, JP-A-8-110401, JP-A-8-179123, JP-A-11-153702, JP-A-2001-166104, JP-A-2001-188104, JP-A-2002-116323, and JP-A-2002-156508).

It is also known that the incorporation of titanium dioxide fine particles having an extremely high refractive index in a high refraction film is very effective (see, for example, JP-A-11-153702, JP-A-2001-166104, JP-A-2001-188104, JP-A-2002-116323, and JP-A-2002-156508).

However, in the case where titanium dioxide is used in the anti-reflection film as mentioned above, it is disadvantageous in that when the titanium dioxide fine particles are used under the sunshine over an extended period of time, organic compounds contained in the anti-reflection film are decomposed because the titanium dioxide fine paticles have a photocatalytic action, remarkably deteriorating the physical strength and optical properties of the anti-reflection film. This phenomenon occurs remarkably particularly with a high refraction film having titanium dioxide particles incorporated finely dispersed therein.

Further, the surface active agent and dispersant which are normally used as means for dispersing the inorganic fine particles are effective to keep the inorganic fine particles finely dispersed and hence form a transparent high refraction layer at the step of forming a high refraction layer, but it is very difficult to provide the high refraction layer thus obtained with a high physical strength (scratch resistance, etc.), chemical resistance and weathering resistance (resistance to moist heat, light-resistance).

Accordingly, it has been desired to prepare an anti-reflection film excellent in physical strength (scratch resistance, etc.), chemical resistance and weathering resistance (resistance to moist heat, light-resistance) by a coating method, but these requires have never been satisfied sufficiently.

On the other hand, the recent trend is for more liquid crystal display devices (LCD) to be provided with a wider screen having an anti-reflection film provided thereon.

A polarizing plate is an indispensable optical material for liquid crystal display device (LCD) and normally has a polarizing film protected by two sheets of protective film.

By providing these protective films with anti-reflection performance, drastic reduction of cost and thickness of display device is made possible.

The protective film used for polarizing plate needs to be adhesive enough to be adhered to the polarizing film. As a means for improving the adhesiveness to the polarizing film, it has been normally practiced to saponify the protective film, thereby hydrophilizing the surface thereof.

By effecting the saponification after the formation of an anti-reflection layer on the protective film, cost can be further reduced. However, in the case where the anti-reflection film is saponified to give a protective film for polarizing plate, the saponifying solution further deteriorates the physical strength (scratch resistance, etc.), chemical resistance and weathering resistance (resistance to moist heat, light-resistance) of the high refraction layer.

DISCLOSURE OF THE INVENTION

The present invention has been worked out in the light of the aforementioned problems with the known technique.

A first object of the present invention is to provide a high refraction film excellent in weathering resistance.

A second object of the present invention is to provide a coating composition for forming said high refraction film.

A third object of the present invention is to provide an anti-reflection film and a protective film for polarizing plate excellent in physical strength (scratch resistance, etc.), chemical resistance and weathering resistance (resistance to moist heat).

A fourth object of the present invention is to provide said anti-reflection film and protective film for polarizing plate in a large amount at a low price.

A fifth object of the present invention is to provide a polarizing plate and an image display device, which have been subjected to anti-reflection treatment by a proper means.

The above objects are accomplished by a high refraction film, a high refraction film-forming coating composition, an anti-reflection film, a protective film for polarizing plate, a polarizing plate and an image display device having the following constitution.

1. A high refraction film having a refractive index of from 1.55 to 2.40 comprising an inorganic fine particles having an average particle diameter of from 1 to 200 nm mainly composed titanium dioxide.

2. A coating composition for forming a high refraction film having a refractive index of from 1.55 to 2.40 comprising an inorganic fine particles mainly composed of titanium dioxide containing at least one element selected from the group consisting of cobalt, aluminum and zirconium.

3. An anti-reflection film comprising a transparent support and a high refraction film formed thereon.

4. An anti-reflection film comprising a transparent support and at least one of a high refraction layer and a low refraction layer formed thereon, wherein said high refraction layer is a layer having a refractive index of from 1.55 to 2.40 comprising an inorganic fine particles mainly composed of titanium dioxide and containing at least one element selected from the group consisting of cobalt, aluminum and zirconium and said low refraction layer is a layer made of a cured film comprising as a main component a copolymer comprising a repeating unit derived from a fluorine-containing vinyl monomer and a repeating unit having a (meth)acryloyl group in its side chain.

5. A process for the production of the afore-mentioned anti-reflection film.

6. A protective film for polarizing plate comprising a transparent support and a high refraction film formed thereon wherein the contact angle of the surface of said transparent support on the side thereof opposite the side having said high refraction film with respect to water is not greater than 40 degrees.

7. A process for the production of the aforementioned protective film for polarizing plate.

8. A polarizing plate comprising a polarizing film and two sheets of protective film having said polarizing film interposed therebetween wherein an anti-reflection film is used as at least one of the two sheets of protective film.

9. A polarizing plate comprising a polarizing film and two sheets of protective film having said polarizing film interposed therebetween wherein an anti-reflection film is used as at least one of the two sheets of protective film and an optically compensated film having optical isomerism is used as the other.

10. An image display device having an anti-reflection film or a polarizing plate disposed on the image display surface thereof.

DESCRIPTION OF REFERENCE NUMERALS AND SIGNS

Figure 1:
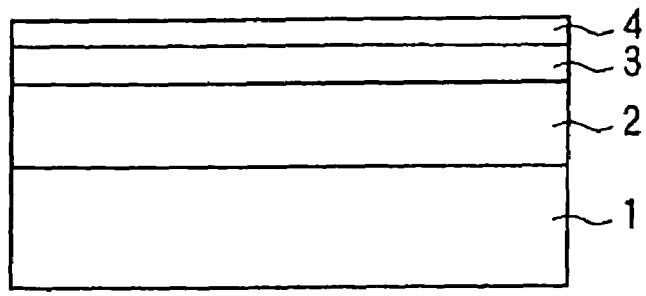
FIGS. 1(a) and (b) each are a schematic sectional view illustrating typically the layer structure of an anti-reflection film excellent in anti-reflection performance.
Figure 1:
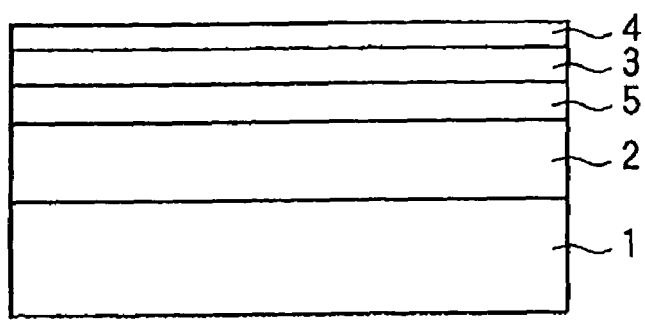

1 Transparent support
2 Hard coat layer
3 High refraction film
4 Low refraction film (outermost layer)
5 Middle refraction layer
6 Anti-glare layer
7 Particles having a refractive index of from 1.40 to 1.80 and an average particle diameter of from 0.5 to 10 μm
8 Adhesive layer
9 Protective film for polarizing plate
10 Protective film for polarizing plate
11 Polarizing plate

MODE FOR CARRYING OUT THE INVENTION

The present invention will be further described hereinafter.

High Refraction Film

The high refraction film of the present invention is characterized by the incorporation of an inorganic fine particles mainly composed of titanium dioxide containing at least one element selected from the group consisting of cobalt, aluminum and zirconium and the exhibition of a refractive index of from 1.55 to 2.40. The high refraction film of the present invention is a so-called high refraction film or middle refraction film and will be hereinafter generically referred to as "high refraction film". The refractive index of the high refraction film is preferably from 1.60 to 2.20, particularly from 1.65 to 2.10. The high refraction film of the present invention will be further described hereinafter.

Inorganic Fine Particles Mainly Composed of Titanium Dioxide

The high refraction film of the present invention comprises an inorganic fine particles having as a main component titanium dioxide containing at least one element selected from the group consisting of cobalt, aluminum and zirconium. The term "main component" as used herein is meant to indicate the highest content (% by weight) in the components constituting the fine particles.

The inorganic fine particles of the present invention mainly composed of titanium dioxide preferably has a refractive index of from 1.90 to 2.80, more preferably from 2.10 to 2.80, most preferably from 2.20 to 2.80.

The inorganic fine particles of the present invention are capable of controlling the refractive index of the high refraction film as well as inhibiting the cure shrinkage of the film.

The inorganic fine particles mainly composed of titanium dioxide is preferably kept finely divided in the dispersing medium as much as possible, and its primary particle preferably has an average particle diameter of from 1 to 200 nm, more preferably from 1 to 150 nm, even more preferably from 1 to 100 nm, particularly from 1 to 80 nm. By finely dividing the inorganic fine particles to a size of not greater than 200 nm, a high refraction film having a desired transparency can be formed.

The particle diameter of the inorganic fine particles can be measured by a light scattering method or electron microphotography. The specific surface area of the inorganic fine particles is preferably from 10 to 400 m$^2$/g, more preferably from 20 to 200 m$^2$/g, most preferably from 30 to 150 m$^2$/g.

The content of the inorganic fine particles in the high refraction film is preferably from 10 to 90% by weight, more preferably from 15 to 80% by weight, particularly from 15 to 75% by weight based on the weight of the high refraction film.

Referring to the crystal structure of the inorganic fine particles mainly composed of titanium dioxide, the main components are preferably rutile, rutile/anatase mixed crystal, anatase and amorphous structure, particularly rutile structure.

By incorporating at least one element selected from the group consisting of Co (cobalt), Al (aluminum) and Zr (zirconium) in the inorganic fine particles mainly composed of titanium dioxide, the photocatalytic activity of titanium dioxide can be inhibited, making it possible to improve the weathering resistance of the high refraction film of the present invention.

Among these elements, at least Co is preferably incorporated in the inorganic fine particles. Further, two or more of the aforementioned elements are used in combination.

Moreover, Co, Al and Zr are preferably present in the form of oxide.

The content of Co, Al and Zr based on Ti (titanium) in the inorganic fine particles is preferably from 0.05 to 30% by weight, more preferably from 0.1 to 10% by weight, even more preferably from 0.2 to 7% by weight, particularly from 0.3 to 5% by weight, most preferably from 0.5 to 3% by weight.

Co, Al and Zr are present in the interior or on the surface of the inorganic fine particles mainly composed of titanium dioxide. Co, Al and Zr are preferably present in the interior of the inorganic fine particles mainly composed of titanium dioxide, most preferably both in the interior and on the surface of the inorganic fine particles mainly composed of titanium dioxide.

The presence (e.g., doping) of Co, Al and Zr in the interior of the inorganic fine particles mainly composed of titanium dioxide can be accomplished by various methods. Examples of these methods include ion implantation method (Yasushi Aoki, "Hyoumen Kagaku (Surface Science)", Vol. 18, No. 5, pp. 262-268, 1998), and methods described in JP-A-11-263620, JP-T-11-512336 ("JP-T" means a published Japanese translation of a PCT application), EP-A 0 335 773, and JP-A-5-330825.

In particular, a method which comprises introducing Co, Al and Zr in the process for the formation of the inorganic fine particles mainly composed of titanium dioxide (as described in JP-T-11-512336, EP-A 0 335 773, and JP-A-5-330825) is particularly preferred.

The inorganic fine particles comprising titanium dioxide as a main component may further comprise other elements incorporated therein depending on the purpose. The other elements may be incorporated as impurities. Examples of the other elements include Sn, Sb, Cu, Fe, Mn, Pb, Cd, As, Cr, Hg, Zn, Mg, Si, P and S.

The inorganic fine particles of the present invention comprising titanium dioxide as a main component may be subjected to surface treatment in order to lower or eliminate photocatalytic activity of titanium dioxide. Surface treatment is carried out by the use of an inorganic or organic compound. Examples of the inorganic compound to be used in surface treatment include inorganic compounds containing cobalt ($CoO_2$, $Co_2O_3$, $Co_3O_4$, etc.), inorganic compounds containing aluminum ($Al_2O_3$, $Al(OH)_3$, etc.), inorganic compounds containing zirconium ($ZrO_2$, $Zr(OH)_4$, etc.), inorganic compound containing silicon ($SiO_2$, etc.), and inorganic compounds containing iron ($Fe_2O_3$, etc.).

Particularly preferred among these inorganic compounds are inorganic compounds containing cobalt, inorganic compounds containing aluminum, and inorganic compounds containing zirconium, most preferably inorganic compounds containing cobalt, $Al(OH)_3$, and $Zr(OH)_4$.

Examples of the organic compound to be used in surface treatment include polyol, alkanolamine, stearic acid, silane coupling agent, and titanate coupling agent. The silane coupling agent is mostly preferred. In particular, the inorganic fine particles are preferably subjected to surface treatment with an organic metal compound represented by the following general formula (I) and derivative thereof.

$$(R^1)_m\text{—Si}(OR^2)_n \quad (I)$$

In the general formula (I), $R^1$ represents a substituted or unsubstituted alkyl group or aryl group. $R^2$ represents a substituted or unsubstituted alkyl group or acyl group. The suffix m represents 0 or an integer of from 1 to 3 and the suffix n represents an integer of from 1 to 4, with the proviso that the sum of m and n is 4.

In the general formula (I), $R^1$ represents a substituted or unsubstituted alkyl group or aryl group. Examples of the alkyl group include methyl group, ethyl group, propyl group, isopropyl group, hexyl group, t-butyl group, sec-butyl group, hexyl group, decyl group, hexadecyl group, etc. The number of carbon atoms in the alkyl group represented by $R^1$ is preferably from 1 to 30, more preferably from 1 to 16, particularly from 1 to 6. Examples of the aryl group represented by $R^1$ include phenyl group, naphthyl group, etc. Preferred among these aryl groups is phenyl group.

The substituents are not specifically limited but are preferably halogen atoms (fluorine, chlorine, bromine, etc.), hydroxyl groups, mercapto groups, carboxyl groups, epoxy groups, alkyl groups (methyl group, ethyl group, i-propyl group, propyl group, t-butyl group, etc.), aryl groups (phenylgroup, naphthyl group, etc.), alkoxy groups (methoxy, ethoxy, i-propoxy group, hexyloxy group, etc.), aryloxy groups (phenoxy group, etc.), alkylthio groups (methylthio group, ethylthio group, etc.), arylthio groups (phenylthio group, etc.), alkenyl groups (vinyl group, 1-propenyl group, etc.), alkoxysilyl groups (trimethoxysilyl group, triethoxysilyl group, etc.), acyloxy groups (acetoxy group, (meth)acryloyl group, etc.), alkoxycarbonyl groups (methoxycarbonyl group, ethoxycarbonyl group, etc.), aryloxycarbonyl groups (phenoxycarbonyl group, etc.), carbamoyl groups (carbamoyl group, N-methylcarbamoyl group, N,N-dimethylcarbamoyl group, N-methyl-N-octylcarbamoyl group, etc.), acylamino groups (acetylamino group, benzoylamino group, acrylamino group, methacrylamino group, etc.), etc.

Even more desirable among these groups are hydroxyl groups, mercapto groups, carboxyl groups, epoxy groups, alkyl groups, alkoxysilyl groups, acyloxy groups, and acrylamino groups. Particularly preferred among these groups are epoxy groups, polymerizable acyloxy groups ((meth)acryloyl group, etc.), and polymerizable acylamino groups (acrylamino group, methacrylamino group, etc.). These substituents maybe further substituted.

$R^2$ represents a substituted or unsubstituted alkyl group or acyl group. The description of the alkyl group, acyl group and substituents is the same as in $R^1$. $R^2$ is preferably an unsubstituted alkyl group or unsubstituted acyl group, particularly unsubstituted alkyl group.

The suffix m represents 0 or an integer of from 1 to 4. The sum of m and n is 4. When there are a plurality of $R^1$'s or $R^2$'s, the plurality of $R^1$'s or $R^2$'s maybe the same or different. The suffix m is preferably 0, 1 or 2, particularly 1.

Specific examples of the compound represented by the general formula (I) will be shown below, the present invention is not limited thereto.

 (1)

 (2)

 (3)

 (4)

 (5)

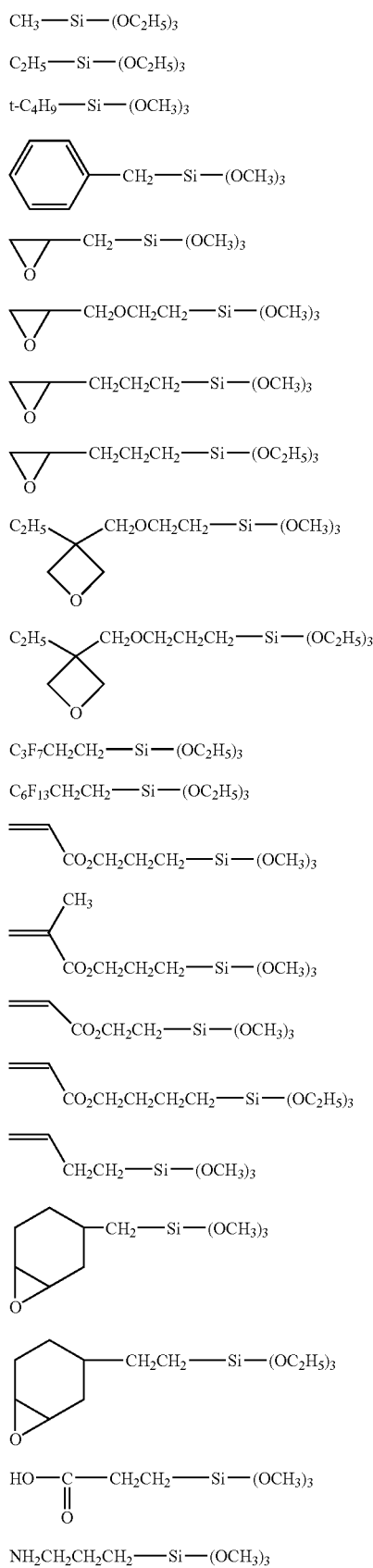
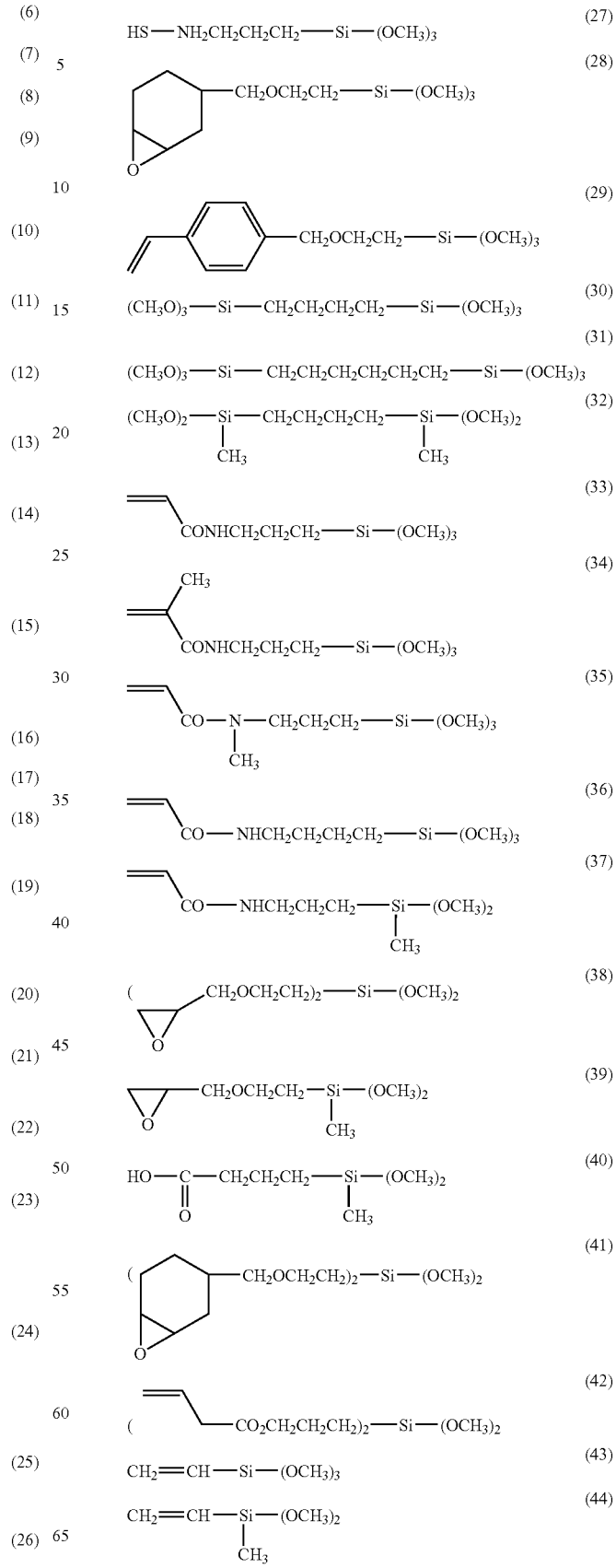

-continued

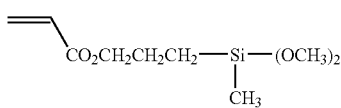
(45)

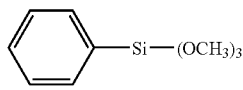
(46)

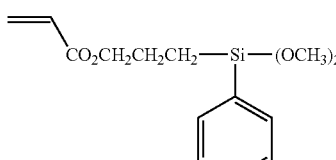
(47)

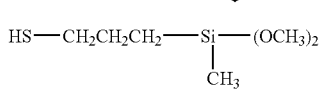
(48)

Particularly preferred among these specific examples are compounds (1), (12), (18), (19), etc.

The content of the compound of the general formula (I) is preferably from 1 to 90% by weight, more preferably from 2 to 80% by weight, particularly from 5 to 50% by weight of the total solid content in the high refraction film.

Examples of the titanate coupling agent include metal alkoxides such as tetraisopropoxytitanium, e.g., tetamethoxytitanium, tetraethoxy titanium, PLENACT (KR-TTS, KR-46B, KR-55, KR-41B, etc., produced by Ajinomoto Co., Ltd.), etc.

Preferred examples of the organic compound to be used in surface treatment include polyol, alkanolamine, and other organic compound shaving anionic group. Particularly preferred among these organic compounds are organic compounds having carboxyl group, sulfonate group or phosphate group.

Stearic acid, lauric acid, oleic acid, linoleic acid, linolenic acid, etc. are preferably used.

The organic compound to be used in surface treatment preferably further has a crosslinkable or polymerizable functional group. Examples of the crosslinkable or polymerizable functional group include ethylenically unsaturated groups which can undergo addition reaction/polymerization reaction of radical seeds (e.g., (meth)acrylic group, allyl group, styryl group, vinyloxy group), cationically-polymerizable groups (epoxy group, oxatanyl group, vinyloxy group), polycondensation-reactive groups (hydrolyzable silyl group, N-methylol group, etc.), etc. Preferably, groups having ethylenically unsaturated group are used.

Two or more of the above-described surface treatment methods may be conducted in combination. It is particularly preferred that an inorganic compound containing aluminum and an inorganic compound containing zirconium be used in combination.

The inorganic fine particles of the present invention mainly composed of titanium dioxide may be subjected to surface treatment to have a core/shell structure as described in JP-A-2001-166104.

The shape of the inorganic fine particles mainly composed of titanium dioxide to be incorporated in the high refraction film is preferably rice grain-shaped, spherical, cubic, spindle-shaped or amorphous, particularly amorphous or spindle-shaped.

Two or more kinds of inorganic fine particless may be incorporated in combination in the high refraction film.

Dispersant

For the dispersion of the inorganic fine particles mainly composed of titanium dioxide to be used in the high refraction film of the present invention, a dispersant may be used.

For the dispersion of the inorganic fine particles mainly composed of titanium dioxide of the present invention, a dispersant having an anionic group is preferably used.

As the anionic group, a group having an acidic proton such as carboxyl group, sulfonate group (sulfo), phosphate group (phosphono) and sulfonamide group or salt thereof is useful. In particular, carboxyl group, sulfonate group, phosphate group or salt thereof is preferred, particularly carboxyl group or phosphate group. The number of anionic groups to be contained per molecule of dispersant may be one or more.

For the purpose of further improving the dispersibility of the inorganic fine particles, a plurality of anionic groups may be incorporated in the dispersant. The number of anionic groups to be contained in the dispersant is preferably two or more, more preferably five or more, particularly 10 or more on the average. A plurality of kinds of anionic groups may be contained per molecule of dispersant.

The dispersant may contain a crosslinkable or polymerizable functional group. Examples of the crosslinkable or polymerizable functional group include ethylenically unsaturated groups which can undergo addition reaction/polymerization reaction of radical seeds (e.g., (meth)acrylic group, allyl group, styryl group, vinyloxy group), cationically-polymerizable groups (epoxy group, oxatanyl group, vinyloxy group), polycondensation-reactive groups (hydrolyzable silyl group, N-methylol group, etc.), etc. Preferably, groups having ethylenically unsaturated group are used.

The dispersant which is preferably used in the dispersion of the inorganic fine particles mainly composed of titanium dioxide to be used in the high refraction film of the present invention is a dispersant having an anionic group and a crosslinkable or polymerizable functional group and having the crosslinkable or polymerizable functional group in its side chain.

The weight-average molecular weight (Mw) of the dispersant having an anionic group and a crosslinkable or polymerizable functional group and having the crosslinkable or polymerizable functional group in its side chain is not specifically limited but is preferably not smaller than 1,000. The weight-average molecular weight (Mw) of the dispersant is more preferably from 2,000 to 1,000,000, even more preferably from 5,000 to 200,000, particularly from 10,000 to 100,000.

The dispersant having an anionic group and a crosslinkable or polymerizable functional group and having the crosslinkable or polymerizable functional group in its side chain preferably has the aforementioned anionic group in its side chain or at the terminal end thereof. Referring to the method for incorporating the anionic group in the side chain, synthesis may be carried out by the use of polymer reaction such as method involving the polymerization of monomer (e.g., (meth)acrylic acid, maleic acid, partly-esterified maleic acid, itaconic acid, crotonic acid, 2-carboxyethyl(meth)acrylate, 2-sulfoethyl (meth)acrylate, mono-2-(meth)acryloyloxyethyleester phosphate) and method involving the reaction of a polymer having an amino group or the like with an acid anhydride.

The content of the anionic group-containing polymer unit in the dispersant having an anionic group in its side chain is from $10^{-4}$ to 100 mol %, preferably from 1 to 50 mol %, particularly from 5 to 20 mol % based on the total polymer unit.

On the other hand, referring to the method for incorporating an anionic group in the dispersant at the terminal thereof, synthesis may be carried out by the use of a method involving the polymerization reaction in the presence of an anionic group-containing chain transfer agent (e.g., thioglycolic acid), a method involving the polymerization reaction in the presence of an anionic group-containing polymerization initiator (e.g., V-501, produced by Wako Pure Chemical Industries, Ltd.) or the like.

A particularly preferred dispersant is a dispersant having an anionic group in its side chain.

Examples of the crosslinkable or polymerizable functional group include ethylenically unsaturated groups which can undergo addition reaction/polymerization reaction of radical seeds (e.g., (meth)acrylic group, allyl group, styryl group, vinyloxy group), cationically-polymerizable groups (epoxy group, oxatanyl group, vinyloxy group), polycondensation-reactive groups (hydrolyzable silyl group, N-methylol group, etc.), etc. Preferably, groups having ethylenically unsaturated group are used.

The number of crosslinkable or polymerizable functional groups to be incorporated per molecule of dispersant is preferably two or more, more preferably five or more, particularly ten or more on the average. A plurality of crosslinkable or polymerizable functional groups may be incorporated per molecule of dispersant.

As the polymer unit having ethylenically unsaturated groups in its side chain in the preferred dispersant of the present invention there may be used a polymer unit having a poly-1,2-butadiene or poly-1,2-isoprene structure or (meth)acrylic acid ester or amide polymer unit having a specific residue (R in —COOR or —CONHR) bonded thereto. Examples of the aforementioned specific residue (R group) include —$(CH_2)_n$—$CR_1$=$CR_2R_3$, —$(CH_2O)_n$—$CH_2CR_1$=$CR_2R_3$, —$(CH_2CH_2O)_n$—$CH_2CR_1$=$CR_2R_3$, —$(CH_2)_n$—NH—CO—O—$CH_2CR_1$=$CR_2R_3$, —$(CH_2)_n$—O—CO—$CR_1$=$CR_2R_3$, and —$(CH_2CH_2O)_2$—X (in which $R_1$ to $R_3$ each represent a hydrogen atom, halogen atom, $C_1$-$C_{20}$ alkyl group, aryl group, alkoxy group or aryloxy group, $R_1$ and $R_2$ or $R_3$ may be connected to each other to form a ring, n represents an integer of from 1 to 10, and X represents a dicyclopentadienyl residue). Specific examples of the ester residue include —$CH_2CH$=$CH_2$ (corresponding to polymer of allyl(meth)acrylate described in JP-A-64-17047), —$CH_2CH_2O$—$CH_2CH$=$CH_2$, —$CH_2CH_2OCOCH$=$CH_2$, —$CH_2CH_2OCOC(CH_3)$=$CH_2$, —$CH_2C(CH_3)$=$CH_2$, —$CH_2CH$=$CH$—$C_6H_5$, —$CH_2CH_2OCOCH$=$CH$—$C_6H_5$, —CH2CH2-NHCOO—CH2CH=CH2, and —$CH_2CH_2O$—X (in which X represents a dicyclopentadienyl residue). Specific examples of the amide residue include —$CH_2CH$=$CH_2$, —$CH_2CH_2$—Y (in which Y represents a 1-cyclohexenyl residue), —$CH_2CH_2$—OCO—CH=$CH_2$, and —$CH_2CH_2$—OCO—$C(CH_3)$=$CH_2$.

The afore-mentioned dispersant having an ethylenically unsaturated group undergoes addition of free radical (polymerization initiating radical or growing radical in the process of polymerization of polymerizable compound) to the unsaturated connecting group and hence addition polymerization of the molecules themselves or via polymer chain of polymerizable compound so that the molecules are crosslinked to cause curing. Alternatively, the afore-mentioned dispersant undergoes removal of atoms (e.g., hydrogen atom on the carbon atom adjacent to the unsaturated connecting group) with a free radical to produce polymer radicals which are then connected to each other to crosslink the molecules, resulting in the curing of the dispersant.

Referring to the method for incorporating a crosslinkable or polymerizable functional group in the side chain, synthesis may be carried out by the use of a method involving the copolymerization of crosslinkable or polymerizable functional group-containing monomers (e.g., allyl(meth)acrylate, glycidiyl(meth)acrylate, trialkoxysilylpropyl methacrylate), the copolymerization of butadiene or isoprene or the copolymerization of vinyl monomers having 3-chloropionic acid ester site followed by dehydrochlorination as described in JP-A-3-249653, a method involving the incorporation of crosslinkable or polymerizable functional groups by polymer reaction (e.g., polymer reaction of epoxy group-containing vinyl monomer into carboxyl group-containing polymer) or the like.

The unit containing a crosslinkable or polymerizable functional group may constitute all the polymer units other than the anionic group-containing polymer unit but preferably accounts for from 5 to 50 mol %, particularly from 5 to 30 mol % of all the crosslinkable or polymerizable units.

The preferred dispersant of the present invention may be a copolymer with a proper monomer other than the monomers having a crosslinkable or polymerizable functional group and anionic group. The copolymer components are not specifically limited but are selected from various standpoints such as dispersion stability, compatibility with other monomer components and strength of resulting film. Preferred examples of the copolymer components include methyl(meth)acrylate, n-butyl(meth)acrylate, t-butyl(meth)acrylate, cyclohexyl (meth)acrylate, styrene, etc.

Preferred embodiments of the dispersant of the present invention are not specifically limited but are preferably block copolymers or random copolymers, particularly random copolymers from the standpoint of cost and ease of synthesis.

Specific preferred examples of the dispersant of the present invention will be given below, but the present invention is not limited thereto. These examples represent random copolymers unless otherwise specified.

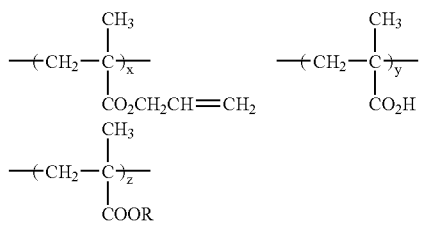

The x/y/z ratio indicates molar ratio.

|       | x  | y  | z  | R                                          | Mw      |
|-------|----|----|----|--------------------------------------------|---------|
| P-(1) | 80 | 20 | 0  | —                                          | 40,000  |
| P-(2) | 80 | 20 | 0  | —                                          | 110,000 |
| P-(3) | 80 | 20 | 0  | —                                          | 10,000  |
| P-(4) | 90 | 10 | 0  | —                                          | 40,000  |
| P-(5) | 50 | 50 | 0  | —                                          | 40,000  |
| P-(6) | 30 | 20 | 50 | $CH_2CH_2CH_3$                             | 30,000  |
| P-(7) | 20 | 30 | 50 | $CH_2CH_2CH_2CH_3$                         | 50,000  |
| P-(8) | 70 | 20 | 10 | $CH(CH_3)_3$                               | 60,000  |
| P-(9) | 70 | 20 | 10 | —CH₂CH(CH₂CH₃)CH₂CH₂CH₃                    | 150,000 |
| P-(10)| 40 | 30 | 30 | —CH₂—C₆H₅                                  | 15,000  |
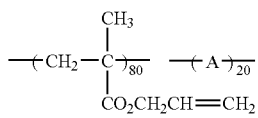
|        | A | Mw |
|--------|---|----|
| P-(11) | 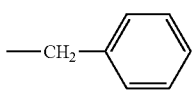 | 20,000 |
| P-(12) | | 30,000 |
| P-(13) | | 100,000 |
| P-(14) | | 20,000 |
| P-(15) | | 50,000 |
| P-(16) | | 15,000 |

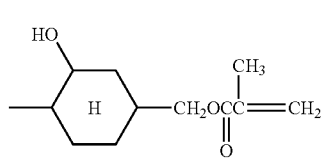

-continued
| | | | | | | |
|---|---|---|---|---|---|---|
| P-(26) | 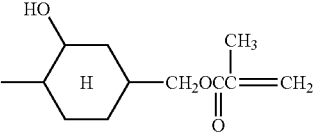 | C$_4$H$_9$ (n) | 80 | 10 | 10 | 30,000 |
| P-(27) | 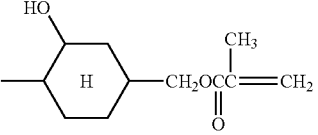 | C$_4$H$_9$ (n) | 50 | 20 | 30 | 30,000 |
| P-(28) | 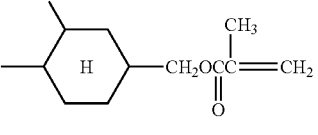 | C$_4$H$_9$ (t) | 10 | 10 | 80 | 20,000 |
| P-(29) | 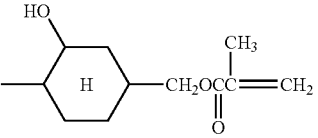 | CH$_2$CH$_2$OH | 50 | 10 | 40 | 20,000 |
| P-(30) | 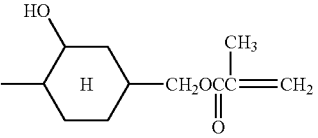 | C$_4$H$_9$ (n) | 10 | 10 | 80 | 25,000 |
| | | |
|---|---|---|
| P-(31) | 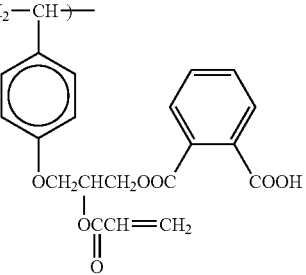 | Mw = 60,000 |
| P-(32) | 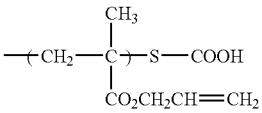 | Mw = 10,000 |
| P-(33) | 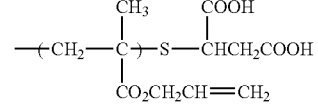 | Mw = 20,000 |
| P-(34) | 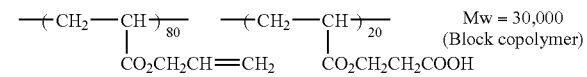 | Mw = 30,000 (Block copolymer) |
| P-(35) | 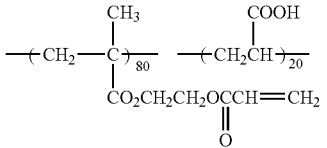 | Mw = 15,000 (Block copolymer) |

-continued

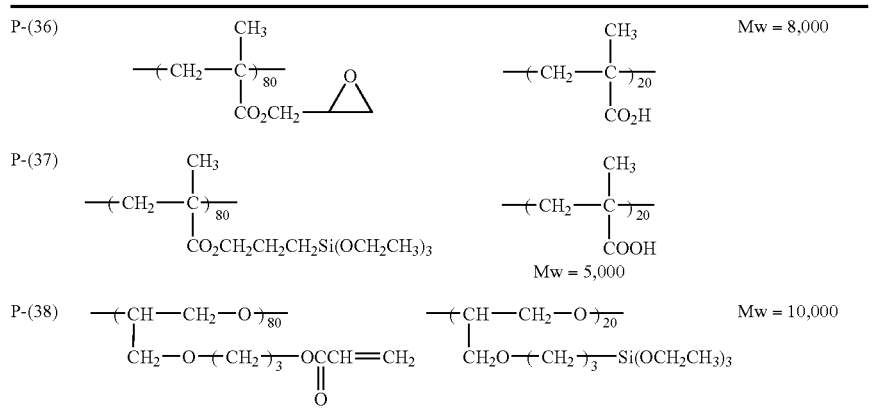

The amount of the inorganic fine particles to be used is preferably from 1 to 50% by weight, more preferably from 5 to 30% by weight, most preferably from 5 to 20% by weight based on the dispersant. Two or more kinds of dispersant may be used in combination.

High Refraction Film and its Forming Method

The inorganic fine particles comprising titanium dioxide as a main component to be used in the high refraction film is used in the form of dispersion to form a high refraction film. For the dispersion of the inorganic fine particles, the inorganic fine particles are dispersed in a dispersing medium in the presence of the aforementioned dispersant.

As the dispersing medium there is preferably used a liquid having a boiling point of from 60° C. to 170° C. Examples of the dispersing medium include water, alcohols (e.g., methanol, ethanol, isopropanol, butanol, benzyl alcohol), ketone (e.g., acetone, methyl ethyl ketone, methyl isobutyl ketone, cyclohexanone), esters (e.g., methyl acetate, ethyl acetate, propyl acetate, butyl acetate, methyl formate, ethyl formate, propyl formate, butyl formate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofurane), and ether alcohols (e.g., 1-methoxy-2-propanol). Toluene, xylene, methyl ethyl ketone, methyl isobutyl ketone, cyclohexanone and butanol are preferred.

Particularly preferred dispersing media are methyl ethyl ketone, methyl isobutyl ketone, and cyclohexanone.

The inorganic fine particles are dispersed using a dispersing machine. Examples of the dispersing machine include sand grinder mill (e.g., bead mill with pin), dynomill, high speed impeller mill, pebble mill, roller mill, attritor, and colloid mill. Sand grinder mill, dynomill, and high speed impeller mill are particularly preferred. Further, preliminary dispersion treatment may be effected. Examples of the dispersing machine to be used in preliminary dispersion treatment include ball mill, three-roll mill, kneader, and extruder.

The high refraction film to be used in the present invention is preferably formed by adding to a dispersion obtained by dispersing the inorganic fine particles in a dispersing medium as mentioned above preferably a binder precursor required for the formation of a matrix (e.g., ionizing radiation-curing polyfunctional monomer or polyfunctional oligomer described later), a photopolymerization initiator, etc. to form a coating composition for forming a high refraction film, applying the coating composition for forming a high refraction film to a transparent support, and then subjecting the ionizing radiation-curing compound (e.g., polyfunctional monomer or polyfunctional oligomer) to crosslinking reaction or polymerization reaction to cause curing.

Further, the binder contained in the coating composition for forming a high refraction film is preferably allowed to undergo crosslinking reaction or polymerization reaction with the dispersant at the same time with or after the application of the film.

Referring particularly to the binder in the high refraction film, the aforementioned preferred dispersant and the ionizing radiation-curing polyfunctional monomer or polyfunctional oligomer are subjected to crosslinking or polymerization reaction to cause the anionic group in the dispersant to be captured in the binder. The binder in the high refraction film has a function of allowing the anionic group to keep the inorganic fine particles dispersed. The crosslinked or polymerized structure renders the binder capable of forming a film, improving the physical strength, chemical resistance and weathering resistance of the high refraction film containing the inorganic fine particles.

The functional group in the ionizing radiation-curing polyfunctional monomer or polyfunctional oligomer is preferably a photopolymerizable, electron ray-polymerizable or radiation-polymerizable, particularly photopolymerizable functional group.

Examples of the photopolymerizable functional group include unsaturated polymerizable functional groups such as (meth)acryloyl group, vinyl group, styryl group and allyl group, etc. Preferred among these photopolymerizable functional groups is (meth)acryloyl group.

Specific examples of the photopolymerizable polyfunctional monomer having a photopolymerizable functional group include (meth)acrylic acid diesters of alkylene glycol such as neopentyl glycol acrylate, 1,6-hexanediol(meth)acrylate and propylene glycol di(meth)acrylate, (meth)acrylic acid diesters of polyoxyalkylene glycol such as triethyleneglycol di(meth)acrylate, dipropyleneglycol di(meth)acrylate, polyethyleneglycol di(meth)acrylate and polypropyleneglycol di(meth)acrylate, (meth)acrylic acid diesters of polyvalent alcohol such as pentaerythritol di(meth)acrylate, (meth)acrylic acid diesters of ethylene oxide or propylene oxide adduct such as 2,2-bis{4-(acryloxy.diethoxy)phenyl}propane and 2-2-bis{4-(acryloxy.polypropoxy)phenyl}propane, etc.

Further, epoxy(meth)acrylates, urethane(meth)acrylates and polyester(meth)acrylates are preferably used as photopolymerizable polyfunctional monomers.

In particular, esters of polyvalent alcohol with (meth) acrylic acid are preferred. Even more desirable are polyfunctional monomers having three or more (meth)acryloyl groups per molecule. Specific examples of these polyfunctional monomers include trimethylolpropane tri(meth)acrylate, trimethylolethane tri(meth)acrylate, 1,2,4-cyclohexane tetra(meth)acrylate, pentaglycerol triacrylate, pentaerythritol tetra(meth)acrylate, pentaerythritol(meth)acrylate, (di)pentaerythritol triacrylate, (di)pentaerythritol pentaacrylate, (di)pentaerythritol tetra(meth)acrylate, (di)pentaeruthritol hexa(meth)acrylate, tripentaeruthritol triacrylate, tripentaethritol hexatriacrylate, etc.

Two or more kinds of polyfunctional monomer may be used in combination.

The polymerization reaction of the photopolymerizable polyfunctional monomer is preferably effected in the presence of a photopolymerization initiator. Preferred examples of the photopolymerization initiator include photoradical polymerization initiator and photocationic polymerization initiator. Particularly preferred among these photopolymerization initiators is photoradical polymerization initiator.

Examples of the photoradical polymerization initiator include acetophenones, benzophenones, Michler's benzoyl benzoate, α-amyloximester, tetramethylthiuram monosulfide, thioxanthones, etc.

Examples of commercially available photoradical polymerization initiators include KAYACURE (DETX-S, BP-100, BDMK, CTX, BMS, 2-EAQ, ABQ, CPTX, EPD, ITX, QTX, BTC, MCA, etc.), produced by NIPPON KAYAKU CO., LTD., Irgacure (651, 184, 500, 907, 369, 1173, 2959, 4265, 4263, etc.), produced by Cibasophy Ciba-Geigy Japan Limited, Esacure (KIP100F, KB1, EB3, BP, X33, KT046, KT37, KIP150, TXT), produced by Sartomer Company, etc.

In particular, photo-cleavable photoradical polymerization initiators are preferred. These photo-cleavable photoradical polymerization initiators are described in Kazuhiro Takabo, "Saishin UV Koka gijutsu (Modern UV Curing Technology)", K. K. Gijutsu Joho Kyokai, page 159, 1991.

Examples of commercially available photo-cleavable photoradical polymerization initiators include Irgacure (651, 184, 907), produced by Cibasophy Ciba-Geigy Japan Limited, etc.

The photopolymerization initiator is preferably used in an amount of from 0.1 to 15 parts by weight, more preferably from 1 to 10 parts by weight based on 100 parts by weight of the polyfunctional monomer.

In addition to the photopolymerization initiator, a photosensitizer may be used. Specific examples of the photosensitizer include n-butylamine, triethylamine, tri-n-butylphosphine, Michler's ketone, and thioxanthone.

Examples of commercially available photosensitizers include KAYACURE (DMBI, EPA), produced by NIPPON KAYAKU CO., LTD., etc.

The photopolymerization reaction is preferably carried out by irradiation with ultraviolet rays after the application and drying of the high refraction film.

The high refraction film to be used in the present invention can also contain the compound represented by the general formula (I) and/or derivative compound thereof as decribed hereinbefore, that are the compounds used for surface treatment of the inorganic fine particles.

In this embodiment, the content of the compound of the general formula (I) is also preferably from 1 to 90% by weight, more preferably from 2 to 80% by weight, particularly from 5 to 50% by weight based on the total solid content in the high refraction film Further, compounds (1), (12), (18), (19) and the like are particularly preferably used.

The binder contained in the high refraction film of the present invention preferably further has a silanol group. The further incorporation of a silanol group in the binder makes it possible to further improve the physical strength, chemical resistance and weathering resistance of the high refraction film.

The silanol group can be incorporated in the binder, e.g., by adding a compound represented by the general formula (I) having a crosslinkable or polymerizable functional group to the aforementioned coating composition for forming a high refraction film, applying the coating composition to a transparent support, and then subjecting the aforementioned dispersant, polyfunctional monomer or polyfunctional oligomer and compound represented by the general formula (I) to crosslinking reaction or polymerization reaction.

A particularly preferred example of the compound represented by the general formula (I) is a compound having (meth)acryloyl group as a crosslinkable or polymerizable functional group, such as 3-acryloxylpropyltrimethoxysilane and 3-methacryloxypropyl trimethoxysilane.

It is also preferred that the binder in the high refraction film have an amino group or quaternary ammonium group. The binder of the high refraction film having an amino group or quaternary ammonium group can be formed, e.g., by adding a monomer having a crosslinkable or polymerizable functional group and an amino group or quaternary ammonium group to the aforementioned coating composition for forming a high refraction film, applying the coating composition to a transparent support, and then subjecting the monomer to crosslinking reaction or polymerization reaction with the aforementioned dispersant and polyfunctional monomer or polyfunctional oligomer.

The monomer having an amino group or quaternary ammonium group acts as a dispersing medium for the inorganic fine particles in the coating composition. Further, after coating, the monomer can be subjected to crosslinking reaction or polymerization reaction with the dispersant and polyfunctional monomer or polyfunctional oligomer to form a binder, making it possible to keep the inorganic fine particles fairly dispersed in the high refraction film and hence prepare a high refraction film excellent in physical strength, chemical resistance and weathering resistance.

Preferred examples of the monomer having an amino group or quaternary ammonium group include N,N-dimethylaminoethyl(meth)acrylate, N,N-dimethylaminopropyl (meth)acrylate, (meth)acrylic acid hydroxypropyltrimethylammonium chloride, dimethylallylammonium chloride, etc.

The amount of the monomer having an amino group or quaternary ammonium group to be used based on the dispersant is preferably from 1 to 40% by weight, more preferably from 3 to 30% by weight, particularly from 3 to 20% by weight. By effecting crosslinking or polymerization reaction to form a binder at the same time with or after the coating of the high refraction film, these monomers are allowed to act effectively before the coating of the high refraction film.

The crosslinked or polymerized binder has a structure comprising a crosslinked or polymerized polymer main chain. Examples of the polymer main chain include polyolefin (saturated hydrocarbon), polyether, polyurea, polyurethane, polyester, polyamine, polyamide, and melamine resin. Particularly preferred among these polymer main chains are polyolefin main chain, polyether main chain and polyurea main chain, more preferably polyolefin main chain and polyether main chain, particularly polyolefin main chain.

The polyolefin main chain is formed by saturated hydrocarbon. The polyolefin main chain is obtained, e.g., by addition polymerization reaction of unsaturated polymerizable group. The polyether main chain has repeating units bonded to each other with an ether bond (—O—). The polyether main chain is obtained, e.g., by the ring-opening polymerization reaction of an epoxy group. The polyurea main chain has repeating units bonded to each other with a urea bond (—NH—CO—NH—). The polyurea main chain is obtained, e.g., by the polycondensation reaction of an isocyanate group with an amino group. The polyurethane main chain has repeating units bonded to each other with a urethane bond (—NH—CO—O—). The polyurethane main chain is obtained, e.g., by the polycondensation reaction of an isocyanate group with a hydroxyl group (containing N-methylol group). The polyester main chain has repeating units connected to each other with an ester bond (—CO—O—). The polyester main chain is obtained, e.g., by the polycondensation reaction of a carboxyl group (containing an acid halide group) with a hydroxyl group (containing N-methylol group). The polyamine main chain has repeating units bonded to each other with an imino bond (—NH—). The polyamine main chain is obtained, e.g., by the ring-opening polymerization reaction of ethyleneimine group. The polyamide main has repeating units bonded to each other with an amide bond (—NH—CO—). The polyamide main chain is obtained, e.g., by the reaction of an isocyanate group with a carboxyl group (containing an acid halide group). The melamine resin main chain is obtained, e.g., by the polycondensation reaction of a triazine group (e.g., melamine) with an aldehyde (e.g., formaldehyde). In the melamine resin, the main chain itself has a crosslinked or polymerized structure.

The anionic group is preferably connected to the main chain as a binder side chain via a connecting group.

Preferred examples of the connecting group for connecting the anionic group and the binder main chain to each other include —CO—, —O—, alkylene group, arylene group, and divalent group selected from the group consisting of combinations thereof. The crosslinked or polymerized structure has two or more main chains chemically bonded (preferably covalently) to each other. The crosslinked or polymerized structure preferably has three or more main chains covalently bonded to each other. The crosslinked or polymerized structure is preferably formed by —CO—, —O—, —S—, nitrogen atom, phosphorus atom, aliphatic residue, aromatic residue and a divalent or higher group selected from the group consisting of combinations thereof.

The binder is preferably a copolymer comprising a repeating unit having an anionic group and a repeating unit having a crosslinked or polymerizable structure. The proportion of the repeating unit having an anionic group in the copolymer is preferably from 2 to 96 mol %, more preferably from 4 to 94 mol-%, most preferably from 6 to 92 mol %. The repeating unit may have two or more anionic groups. The proportion of the repeating unit having a crosslinked or polymerized structure in the copolymer is preferably from 4 to 98 mol %, more preferably from 6 to 96 mol %, most preferably from 8 to 94 mol %.

The repeating units in the binder may have both an anionic group and a crosslinked or polymerized structure. The binder may contain other repeating units (repeating units free of both anionic group and crosslinked or polymerized structure).

Preferred examples of the other repeating units include repeating units containing silanol group, amino group or quaternary ammonium group.

In the repeating unit having a silanol group, the silanol group is connected to the main chain of the binder directly or via a connecting group. The silanol group is preferably connected as a side chain to the main chain via a connecting group. Preferred examples of the connecting group for connecting the silanol group and the binder main chain to each other include —CO—, —O—, alkylene group, arylene group, and divalent group selected from the group consisting of combinations thereof. When the binder contains a repeating unit having a silanol group, the proportion of the silanol group is preferably from 2 to 98 mol %, more preferably from 4 to 96 mol %, most preferably from 6 to 94 mol %.

In the repeating unit having an amino group or quaternary ammonium group, the amino group or quaternary ammonium group is connected to the main chain of the binder directly or via a connecting group. The amino group or quaternary ammonium group is preferably connected as a side chain to the main chain via a connecting group. The amino group or quaternary ammonium group is preferably a secondary, tertiary or quaternary ammonium group, more preferably a tertiary or quaternary ammonium group. The group connected to the nitrogen atom in the secondary, tertiary or quaternary ammonium group is preferably an alkyl group, more preferably a $C_1$-$C_{12}$ alkyl group, even more preferably a $C_1$-$C_6$ alkyl group. The counter ion of the quaternary ammonium group is preferably a halide ion. Preferred examples of the connecting group for connecting the amino group or quaternary ammonium group and the binder main chain to each other include —CO—, —NH—, —O—, alkylene group, arylene group, and divalent group selected from the group consisting of combinations thereof. When the binder contains a repeating unit having an amino group or quaternary ammonium group, the proportion of the amino group or quaternary ammonium group is preferably from 0.1 to 32 mol %, more preferably from 0.5 to 30 mol %, most preferably from 1 to 28 mol %.

The silanol group and amino group or quaternary ammonium group may be contained in the repeating unit having an anionic group or the repeating unit having a crosslinked or polymerized structure to exert the same effect.

The crosslinked or polymerized binder is preferably formed by applying the coating composition for forming a high refraction film to a transparent support, and then subjecting the coating composition to crosslinking or polymerization reaction at the same time with or after coating.

The high refraction film preferably comprises a binder obtained by the crosslinking or polymerization reaction of an ionizing radiation-curing compound containing an aromatic ring, an ionizing radiation-curing compound containing a halogenating element other than fluorine (e.g., Br, I, Cl), an ionizing radiation-curing compound containing an atom such as S, N and P or the like.

The high refraction film may comprise a resin, a surface active agent, an antistat, a coupling agent, a thickening agent, a coloring inhibitor, a coloring material (pigment, dye), an anti-foaming agent, a leveling agent, a fire retardant, an ultraviolet absorber, an infrared absorber, a tackifying agent, a polymerization inhibitor, an oxidation inhibitor, a surface modifier, electrically-conductive metal fine particles, etc. incorporated therein besides the aforementioned components (inorganic fine particles, polymerization initiator, photosensitizer, etc.).

The high refraction film may comprise particles having an average particle diameter of from 0.2 to 10 μm as described later incorporated therein to act also as ant-glare layer capable of protecting against glare.

The thickness of the high refraction film can be properties designed depending on the purpose. In the case where the high refraction film is used as an optical interference layer, the thickness of the high refraction film is preferably from 30 to 200 nm, more preferably from 50 to 170 nm, particularly from 60 to 150 nm. In the case where the high refraction film acts also as a hard coat layer, the thickness of the high refraction film is preferably from 0.5 to 10 μm, more preferably from 1 to 7 μm, particularly from 2 to 5 μm.

In the formation of the high refraction film, the crosslinking reaction or polymerization reaction of the ionizing radiation-curing compound is preferably effected in an atmosphere having an oxygen concentration of not higher than 10% by volume.

By forming the high refraction film in an atmosphere having an oxygen concentration of not higher than 10% by volume, the physical strength, chemical resistance and weathering resistance of the high refraction film and even the adhesiveness of the high refraction film to the layer adjacent thereto can be improved.

More preferably, the high refraction film is formed by the crosslinking reaction or polymerization reaction of the ionizing radiation-curing compound in an atmosphere having an oxygen concentration of not higher than 6% by volume, even more preferably not higher than 4% by volume, particularly not higher than 2% by volume, most preferably not higher than 1% by volume.

The adjustment of the oxygen concentration to not higher than 10% by volume is preferably carried out by replacing the atmosphere (nitrogen concentration: about 79% by volume; oxygen concentration: about 21% by volume) by other gases, particularly nitrogen (purge with nitrogen).

Preferred examples of coating solvent for the high refraction film include methyl ethyl ketone, methyl isobutyl ketone, and cyclohexanone.

The coating solvent may contain solvents other than ketone-based solvents. Examples of these solvents include alcohols (e.g., methanol, ethanol, isopropanol, butanol, benzyl alcohol), esters (e.g., methyl acetate, ethyl acetate, propyl acetate, butyl acetate, methyl formate, ethyl formate, propyl formate, butylformate), aliphatic hydrocarbons (e.g., hexane, cyclohexane), halogenated hydrocarbons (e.g., methylene chloride, chloroform, carbon tetrachloride), aromatic hydrocarbons (e.g., benzene, toluene, xylene), amides (e.g., dimethylformamide, dimethylacetamide, n-methylpyrrolidone), ethers (e.g., diethyl ether, dioxane, tetrahydrofurane), and ether alcohols (e.g., 1-methoxy-2-propanol).

The content of the ketone-based solvents in the coating solvent is preferably not lower than 10% by weight, preferably not lower than 30% by weight, more preferably not lower than 60% by weight based on the total weight of solvents contained in the coating composition.

The strength of the high refraction film is preferably not lower than H, more preferably not lower than 2H, most preferably not lower than 3H according to pencil hardness test of JIS K5400.

The abrasion of the test specimen when subjected to Taber test according to JIS K5400 is preferably as small as possible.

The haze of the high refraction film is preferably as low as possible if it is free of particles providing an anti-glare performance. The haze of the high refraction film is preferably not higher than 5%, more preferably not higher than 3%, particularly not higher than 1%.

Anti-Reflection Film

Further, the anti-reflection film of the present invention also has the aforementioned high refraction film provided on the transparent support. Moreover, the anti-reflection film of the present invention may further have a low refraction film having a lower refractive index than that of the high refraction film. The transparent support and various layers provided in the anti-reflection film of the present invention will be described in detail hereinafter.

Transparent Support

The transparent support is preferably a plastic film. Examples of the plastic film include cellulose esters (e.g., triacetyl cellulose, diacetyl cellulose, propionyl cellulose, butyryl cellulose, acetyl propionyl cellulose, nitrocellulose), polyamides, polycarbonates, polyesters (e.g., polyethylene terephthalate, polyethylene naphthalate, poly-1,4-cyclohexanedimethylene terephthalate, polyethyelene-1,2-diphenoxyethane-4,4'-dicarboxylate, polybutyleneterephthalate), polystyrenes (e.g., syndioctactic polystyrene), polyolefins (e.g., polypropylene, polyethylene, polymethylpentene), polysulfones, polyethersulfones, polyallylates, polyetherimides, polymethyl methacrylates, and polyether ketones. Preferred among these plastic films are triacetyl cellulose, polycarbonates, polyethyene terephthalates, and polyethylene naphthalates. In particular, when the product is used for liquid crystal display device, triacetyl cellulose is preferred.

In the case where the transparent support is a triacetyl cellulose film, it is preferably a triacetyl cellulose film prepared by subjecting a triacetyl cellulose dope prepared by dissolving triacetyl cellulose in a solvent to either single-layer casting or multi-layer co-casting.

In particular, from the standpoint of environmental protection, a triacetyl cellulose film prepared from a triacetyl cellulose dope prepared by subjecting triacetyl cellulose to low temperature dissolution or high temperature dissolution in a solvent substantially free of dichloromethane is preferred.

The single-layer triacetyl cellulose film is prepared by a drum casting method as disclosed in JP-A-7-11055, etc., or a band casting method or the like while the latter triacetyl cellulose film made of a plurality of layers is prepared by a so-called co-casting method as disclosed in JP-A-61-94725, JP-B-62-43846, etc.

For example, a solution (dope) obtained by dissolving a raw material flake in a solvent such as halogenated hydrocarbons (dichloromethane, etc.), alcohols (methanol, ethanol, butanol, etc.), esters (methyl formate, methyl acetate, etc.) and ethers (dioxane, tetrahydrofurane, diethylether, etc.), and then optionally adding various additives such as plasticizer, ultraviolet absorber, deterioration inhibitor, lubricant and peeling accelerator to the solution is cast over a support made of a horizontal endless metal belt or rotating drum using a dope supplying unit (referred to as "die").

In the case of single-layer form, a single dope is subjected to single-layer casting. In the case of multi-layer form, a low concentration dope and a high concentration dope are subjected to co-casting so that the low concentration dope is laminated on both sides of the high concentration cellulose ester dope. The dope thus cast is dried on the support to some extent. The film thus rendered rigid is peeled off the support, and then passed through a drying zone using various conveying units to remove the solvent.

A typical example of the aforementioned solvent for dissolving triacetyl cellulose is dichloromethane. However, from the standpoint of global environment or working atmosphere, it is preferred that the solvent be substantially free of halogenated hydrocarbon such as dichloromethane. The term "substantially free of halogenated hydrocarbon" as used herein is meant to indicate that the proportion of halogenated hydrocarbon in the organic solvent falls below 5% by weight (preferably 2% by weight). In the case where a solvent substantially free of dichloromethane is used to prepare the triacetyl cellulose dope, the following special dissolution method is preferably employed.

A first method is referred to as "cold dissolution method" and will be described hereinafter. Firstly, triacetyl cellulose is gradually added to a solvent at a temperature around room temperature (−10° C. to 40° C.) with stirring. Subsequently, the mixture is cooled to a temperature of from −100° C. to −10° C. (preferably from −80° C. to −10° C., more preferably from −50° C. to −20° C., most preferably from −50° C. to −30° C.). Cooling may be effected over a dry ice-methanol bath (−75° C.) or in a chilled diethylene glycol solution (−30° C. to −20° C.). By thus cooling, the mixture of triacetyl cellulose and solvent is solidified. When the mixture is then heated to a temperature of from 0° C. to 200° C. (preferably from 0° C. to 150° C., more preferably from 0° C. to 120° C., most preferably from 0° C. to 50° C.), a solution having triacetyl cellulose fluidized in a solvent is obtained. Heating may be carried out by allowing the mixture to stand at room temperature or heating the mixture over a hot bath.

A second method is referred to as "hot dissolution method" and will be described hereinafter. Firstly, triacetyl cellulose is gradually added to a solvent at a temperature around room temperature (−10° C. to 40° C.) with stirring. The triacetyl cellulose solution of the present invention is preferably prepared by adding triacetyl cellulose to a mixed solvent containing various solvents so that it is previously allowed to swell. In the present method, the dissolved concentration of triacetyl cellulose is preferably not higher than 30% by weight but is preferably as high as possible from the standpoint of efficiency in drying during film making. Subsequently, the mixed organic solvent is heated to a temperature of from 70° C. to 240° C. (preferably from 80° C. to 220° C., more preferably from 100° C. to 200° C., most preferably from 100° C. to 190° C.) under a pressure of from 0.2 MPa to 30 MPa. The solution thus heated cannot be subjected to coating as it is and thus needs to be cooled to the lowest boiling point of the solvents used. In this case, it is usual to cool the system to a temperature of from −50° C. to 50° C. so that its pressure is returned to ordinary pressure. Cooling may be carried out merely by allowing the high pressure high temperature container or line in which triacetyl cellulose is received to stand at room temperature or preferably by cooling the device with a cooling medium such as cooling water.

The thickness of the aforementioned transparent support is not specifically limited but is preferably from 1 to 300 μm, more preferably from 30 to 150 μm, particularly from 40 to 120 μm, most preferably from 40 to 100 μm.

The light transmittance of the transparent support is preferably not lower than 80%, more preferably not lower than 86%. The haze of the transparent support is preferably not greater than 2.0%, more preferably not greater than 1.0%. The refractive index of the transparent support is preferably from 1.4 to 1.7. The transparent support may comprise an infrared absorber or ultraviolet absorber incorporated therein. The added amount of the infrared absorber is preferably from 0.01 to 20% by weight, more preferably from 0.05 to 10% by weight based on the weight of the transparent support. As a lubricant, inert inorganic compound fine particles may be incorporated in the transparent support. Examples of the inorganic compound include $SiO_2$, $TiO_2$, $BaSO_4$, $CaCO_3$, talc, and kaolin.

The transparent support may be subjected to surface treatment. Examples of surface treatment include chemical treatment, mechanical treatment, corona discharge treatment, flame treating, ultraviolet-light irradiation, high frequency treatment, glow discharge treatment, active plasma treatment, laser treatment, mixed acid treatment, and ozone oxidation. Preferred among these surface treatment methods are glow discharge treatment, ultraviolet-light irradiation, corona discharge treatment and flame treating, particularly glow discharge treatment and corona discharge treatment.

Outermost Layer

An outermost layer mainly composed of fluorine-containing compound is preferably formed on the anti-reflection film on the high refraction film side thereof. The outermost layer mainly composed of fluorine-containing compound acts as a low refraction film or stainproofing layer.

The term "mainly composed of fluorine-containing compound" as used herein is meant to indicate that the content of fluorine-containing compound in the outermost layer is not lower than 50% by weight, preferably not lower than 60% by weight based on the total weight of the outermost layer.

The refractive index of the fluorine-containing compound is preferably from 1.35 to 1.50, more preferably from 1.36 to 1.47, even more preferably from 1.38 to 1.45. Further, the fluorine-containing compound preferably contains fluorine atom in an amount of from 35% to 80% by weight, preferably from 45% to 75% by weight.

Examples of the fluorine-containing compound include fluorine-containing polymer, fluorine-containing silane compound, fluorine-containing surface active agent, fluorine-containing ether, etc.

Examples of the fluorine-containing polymer include those synthesized by the crosslinking reaction or polymerization reaction of ethylenically unsaturated monomers containing fluorine atom. Examples of the ethylenically unsaturated monomers containing fluorine atom include fluoroolefins (e.g., fluoroethylene, vinylidene fluoride, tetrafluoroethylene, hexafluoropropylene, perfluoro-2,2-dimethyl-1,3-dioxol), fluorinated vinylesters, and esters of fluorine-substituted alcohol with acrylic acid or methacrylic acid.

As the fluorine-containing polymer there may be used a copolymer comprising a repeating unit containing fluorine atom and a repeating unit free of fluorine atom.

The aforementioned copolymer can be obtained by the polymerization reaction of an ethylenically unsaturated monomer containing fluorine atom with an ethylenically unsaturated monomer free of fluorine atom.

Examples of the ethylenically unsaturated monomer free of fluorine atom include olefins (e.g., ethylene, propylene, isoprene, vinyl chloride, vinylidene chloride), acrylic acid esters (e.g., methyl acrylate, ethyl acrylate, 2-ethylhexyl acrylate), methacrylic acid esters (e.g., methyl methacrylate, ethyl methacrylate, butyl methacrylate, ethylene glycol dimethacrylate), styrenes and derivatives thereof (e.g., styrene, divinylbenzene, vinyltoluene, α-methylstyrene), vinylethers (e.g., methyl vinyl ether), vinylesters (e.g., vinyl acetate, vinyl propionate, vinyl cinnamate), acrylamides (e.g., N-tert butylacrylamide, N-cyclohexyl acrylamide), methacrylamide, and acrylonitrile.

Examples of the fluorine-containing silane compound include silane compounds containing perfluoroalkyl group (e.g., (heptadecafluoro-1,2,2,2-tetradecyl)triethoxysilane).

In the fluorine-containing surface active agent, its hydrophilic moiety may be anionic, cationic, nonionic or amphoteric. The hydrogen atoms in the hydrocarbon constituting the hydrophobic moiety are partially or entirely substituted by fluorine atom.

The fluorine-containing ether is normally a compound which is used as a lubricant. Examples of the fluorine-containing ether include perfluoropolyethers, etc.

Particularly preferably, the outermost layer is formed by a fluorine-containing polymer having a crosslinked or polymerized structure incorporated therein. The fluorine-containing polymer having a crosslinked or polymerized structure incorporated therein is obtained by crosslinking or polymerizing a fluorine-containing polymer having a crosslinkable or polymerizable group.

The fluorine-containing polymer having a crosslinkable or polymerizable group can be obtained by incorporating a crosslinkable or polymerizable group in a fluorine-containing polymer free of crosslinkable or polymerizable group as a side chain. The crosslinkable or polymerizable group is preferably a functional group which reacts upon the irradiation with light, preferably ultraviolet ray or electron beam (EB), or heating to provide the fluorine-containing polymer with a crosslinked or polymerized structure. Examples of the crosslinkable or polymerizable group include groups such as (meth)acryloyl, isocyanate, epoxy, aziridine, oxazoline, aldehyde, carbonyl, hydrazine, carboxyl, methylol and active methylene. As the fluorine-containing polymer having a crosslinkable or polymerizable group there may be used a commercially available product.

The crosslinking or polymerization reaction of the fluorine-containing polymer having a crosslinkable or polymerizable group is preferably carried out by irradiating the coating composition for forming the outermost layer with light or electron beam or heating the coating composition at the same time with or after the coating of the coating composition.

The outermost layer may contain a filler (e.g., inorganic fine particles, organic fine particles), a silane coupling agent, a lubricant (silicon compound such as dimethyl silicone, etc.), a surface active agent, etc. besides the fluorine-containing compound. Particularly preferably, an inorganic fine particles, a silane coupling agent, and a lubricant are incorporated in the outermost layer.

Preferred examples of the inorganic fine particles to be incorporated in the outermost layer include silicon dioxide (silica), fluorine-containing fine particles (e.g., magnesium fluoride, calcium fluoride, barium fluoride), etc. Particularly preferred among these inorganic fine particless is silicon dioxide(silica). The weight-average molecular weight of primary particles constituting the inorganic fine particles is preferably from 1 to 150 nm, more preferably from 1 to 100 nm, most preferably from 1 to 80 nm. In the outermost layer, the inorganic fine particles are preferably dispersed more finely. The shape of the inorganic fine particles is preferably rice grain-shaped, spherical, cubic, spindle-shaped, short fiber-shaped, ring-shaped or amorphous.

As the silane coupling agent to be incorporated in the outermost layer there may be used a compound represented by the aforementioned general formula (I) and/or derivative compound thereof. Preferred examples of the silane coupling agent include silane coupling agents containing hydroxyl group, mercapto group, carboxyl group, epoxy group, alkyl group, alkoxysilyl group, acyloxy group and acylamino group, particularly silane coupling agents containing epoxy group, polymerizable acyloxy group ((meth)acryloyl) and polymerizable acylamino group (acrylamino, methacrylamino).

Particularly preferred among the compounds represented by the general formula (I) is a compound having (meth)acryloyl group as a crosslinkable or polymerizable group such as 3-acryloxypropyltrimethoxysilane and 3-methacryloylpropyl trimethoxysilane.

As the lubricant, a fluorine-containing compound having dimethylsilicon or polysiloxane segment incorporated therein is preferred.

The outermost layer is preferably formed by irradiating a coating composition having a fluorine-containing compound and optional arbitrary components dissolved or dispersed therein with light or electron beam or heating the coating composition to cause crosslinking reaction or polymerization reaction.

In particular, in the case where the outermost layer is formed by the crosslinking reaction or polymerization reaction of an ionizing radiation-curing compound, the crosslinking reaction or polymerization reaction is preferably effected in an atmosphere having an oxygen concentration of not higher than 10% by volume. By forming the outermost layer in an atmosphere having an oxygen concentration of not higher than 10% by volume, an outermost layer excellent in physical strength and chemical resistance can be obtained.

The oxygen concentration is preferably not higher than 6% by volume, more preferably not higher than 4% by volume, particularly not higher than 2% by volume, most preferably not higher than 1% by volume.

The adjustment of the oxygen concentration to not higher than 10% by volume is preferably carried out by replacing the atmosphere (nitrogen concentration: about 79% by volume; oxygen concentration: about 21% by volume) by other gases, particularly nitrogen (purge with nitrogen).

In the case where the outermost layer is used as a low refraction film, the thickness of the outermost layer is preferably from 30 nm to 200 nm, more preferably from 50 nm to 150 nm, particularly from 60 nm to 120 nm. In the case where the outermost layer is used as a stain-proofing layer, the thickness of the outermost layer is preferably from 3 nm to 50 nm, more preferably from 5 nm to 35 nm, particularly from 7 nm to 25 nm.

The outermost layer preferably exhibits a surface dynamic friction coefficient of not greater than 0.25 to improve the physical strength of the anti-reflection film. The term "dynamic friction coefficient" as used herein is meant to indicate the dynamic fiction coefficient of the surface of the outermost layer with respect to a stainless steel sphere having a diameter of 5 mm measured when the stainless steel sphere is allowed to move along the surface of the outermost layer at a rate of 60 cm/min at a load of 0.98 N. The surface dynamic friction coefficient of the outermost layer is preferably not greater than 0.17, particularly not greater than 0.15.

In order to improve the stain-proofness of the anti-reflection film, the contact angle of the outermost layer with respect to water is preferably not smaller than 90°, more preferably not smaller than 95°, particularly not smaller than 100°.

Low Refraction Film

The low refraction film may acts also as the aforementioned outermost layer or may be disposed under the outermost layer.

In the case where the low refraction film acts also as the aforementioned outermost layer, matters which have bee already described with reference to the outermost layer can be applied. In the case where the low refraction film is disposed under the outermost layer, the low refraction film preferably contains a silicon compound.

The refractive index of the low refraction film is from 1.20 to 1.55, preferably from 1.30 to 1.50, more preferably from 1.35 to 1.48, particularly from 1.40 to 1.48.

In the case where the low refraction film is disposed under the outermost layer, the low refraction film can be formed by a coating method or gas phase method (vacuum deposition method, sputtering method, ion plating method, plasma CVD method, etc.). The coating method is preferred because it can produce a low refraction film at a low price.

In the low refraction film is prepared by coating, the low refraction film is preferably prepared from a compound selected from the group consisting of compound represented by the following general formula (II), hydrolyzate thereof and crosslinked silicon polymer produced by the condensation of the hydrolyzate, particularly crosslinked silicon polymer.

$$X_a Y_b SiZ_{4-a-b} \quad (II)$$

In the general formula (II), X represents a $C_1$-$C_{12}$ organic group (e.g., alkyl, aryl, halogenated alkyl, halogenated aryl, alkenyl or epoxy group, (meth)acryloxy group, mercapto group, amino group, cyano group). Y is a $C_1$-$C_3$ hydrocarbon group. Z represents a halogen atom or alkoxy group (e.g., $OCH_3$, $OC_2H_5$, $OC_3H_7$). The suffixes a and b are the same or different and each are an integer of from 0 to 2. The compound of the general formula (II) is not specifically limited, but specific examples of the general formula (II) include tetralkoxysilanes such as methyl silicate and ethyl silicate, trialkoxy or triacyloxysilanes such as methyl trimethoxysilane, methyl triethoxysilane, methyl trimethoxyethoxysilane, methyl triacetoxysilane, methyl tributoxysilane, ethyl trimethoxysilane, vinyl trimethoxysilane, vinyl triethoxysilane, vinyl triacetoxysilane, vinyl trimethoxyethoxysilane, phenyl trimethoxysilane, phenyl triethoxysilane, phenyl triacetoxysilane, γ-chloropropyl trimethoxysilane, γ-chloropropyl triethoxysilane, γ-chloropropyl triacetoxysilane, 3,3,3-trifluoropropyl trimethoxysilane, γ-glycidoxypropyl trimethoxysilane, γ-glycidoxypropyl triethoxysilane, γ-(β-glycidoxyethoxy)propyl trimethoxysilane, β-(3,4-epoxycyclohexyl)ethyl trimethoxysilane, β-(3,4-epoxycyclohexyl) ethyl triethoxysilane, γ-methacryloxypropyl trimethoxysilane, γ-aminopropyl trimethoxysilane, γ-aminopropyl triethoxysilane, γ-mercaptopropyl trimethoxysilane, γ-mercaptopropyl triethoxysilane, N-β(aminoethyl)-γ-aminopropyltrimethoxysilane, γ-(2-aminoethyl)aminopropyltrimethoxysilane and β-cyanoethyltriethoxysilane, dialkoxyordiacyloxysilanes such as dimethyl dimethoxysilane, dimethyl diethoxysilane, phenylmethyl dimethoxysilane, phenylmethyl diethoxysilane, γ-glycidoxypropylmethyl dimethoxysilane, γ-glycidoxypropylmethyl diethoxysilane, γ-glycidoxypropylphenyl dimethoxysilane, γ-glycidoxypropylphenyl diethoxysilane, γ-chloropropylmethyl dimethoxysilane, γ-chloropropylmethyl diethoxysilane, dimethyl diacetoxysilane, γ-methacryloxypropylmethyl dimethoxysilane, γ-methacryloxypropylmethyl diethoxysilane, γ-mercaptopropylmethyl dimethoxysilane, γ-mercaptopropylmethyl diethoxysilane, γ-aminopropylmethyl dimethoxysilane, γ-aminopropylmethyl diethoxysilane, methyl vinyl dimethoxysilane and methyl vinyl diethoxysilane, etc.

In particular, in the case where hardness is required, silicon compounds containing an epoxy group and (meth)acryloyl group are preferred. These silicon compounds maybe used singly or in combination of two or more thereof.

These silicon compounds are preferably cured with various hardening agents or catalysts. Examples of these hardening agents or catalysts include Lewis acid, various acids and bases containing Lewis base, and neutral or basic salts formed thereby, such as organic carboxylic acid, chromic acid, hypochlorous acid, boric acid, bromic acid, selenious acid, thiosulfuric acid, orthosilicic acid, thiocyanic acid, nitrous acid, aluminic acid, salt of carbonic acid with a metal, particularly alkaline metal, or ammonium salt of carbonic acid, alkoxide of aluminum, zirconium and titanium and complex compound thereof. In particular, aluminum chelate compounds are preferred. Examples of the aluminum chelate compounds include ethylacetoacetate aluminum diisopropylate, aluminum trisethyl acetoacetate, alkylacetoacetate aluminum diisopropylate, aluminum monoacetyl acetoacetonate bisethyl acetoacetate, aluminum trisacetate, etc.

The low refraction film preferably comprises an inorganic fine particles, fine particles such as LiF, $MgF_2$ and $SiO_2$, particularly $SiO_2$, incorporated therein.

The thickness of the low refraction film is preferably from 30 nm to 200 nm, more preferably from 50 nm to 150 nm, most preferably from 60 nm to 120 nm.

In the case where the low refraction film is free of particles providing anti-glare performance, the haze of the low refraction film is preferably as low as possible, more preferably not greater than 5%, even more preferably not greater than 3%, particularly not greater than 1%.

The strength of the low refraction film is preferably not lower than H, more preferably not lower than 2H, most preferably not lower than 3H according to pencil hardness test of JIS K5400.

The abrasion of the test specimen when subjected to Taber test according to JIS K5400 is preferably as small as possible.

In the present invention, the low refraction layer is also formed by a cured film comprising as a main component a copolymer comprising as essential constituents a repeating unit derived from a fluorine-containing vinyl monomer and a repeating unit having a (meth)acryloyl group in its side chain. The term "main component" used herein means a component having the largest amount (% by mass) in components constituting the cured film. The components derived from the copolymer preferably account for not lower than 70% by weight, more preferably not lower than 80% by weight, particularly not lower than 90% by weight of the solid content of the film. For the purpose of improving resistance to scuffing, it is particularly preferable that a hardening agent such as polyfunctional(meth)acrylatebe further added.

The refractive index of the low refraction layer is preferably from 1.20 to 1.49, more preferably from 1.20 to 1.45, particularly from 1.20 to 1.44.

The thickness of the low refraction layer is preferably from 50 nm to 400 nm, more preferably from 50 nm to 200 nm. The haze of the low refraction layer is preferably not greater than 3%, more preferably not greater than 2%, most preferably not greater than 1%. The particular strength of the low refraction layer is preferably not lower than H, more preferably not lower than 2H, most preferably not lower than 3H according to pencil hardness test at a load of 1 kg.

In order to improve the stain-proofness of the anti-reflection film, the contact angle of the low refraction layer with respect to water is preferably not smaller than 90°, more preferably not smaller than 95°, particularly not smaller than 100°.

The copolymer to be used in the low refraction layer of the present invention will be described hereinafter.

Examples of the fluorine-containing vinyl monomer include fluoroolefins (e.g., fluoroethylene, vinylidene fluoride, tetrafluoroethylene, hexafluoroethylene, hexafluoropropoylene), partially or fully-fluorinated alkylester derivatives of (meth)acrylic acid (e.g., Biscoat 6FM (trade name, produced by OSAKA ORGANIC CHEMICAL INDUSTRY LTD.), M-2020 (trade name, produced by DAIKIN INDUSTRIES, LTD.), fully or partially-fluorinated vinylethers, etc. Preferred among these fluorine-containing vinyl monomers are perfluoroolefins. Particularly preferred among these perfluoroolefins is hexafluoropropylene from the standpoint of refractive index, solubility, transparency, availability, etc. When the composition ratio of these fluorine-containing vinyl monomers is raised, the refractive index of the low refraction layer can be raised, but the strength of the low refraction layer is reduced. In the present invention, the fluorine-containing vinyl monomers are preferably incorporated in an amount such that the fluorine content in the copolymer is from 20% to 60% by weight, more preferably from 25% to 55% by weight, particularly from 30% to 50% by weight.

The copolymer of the present invention has a repeating unit having a (meth)acryloyl group as an essential constituent in its side chain. The method for incorporating a (meth)acryloyl group in the copolymer is not specifically limited. Examples of such a method include (1) a method which comprises synthesizing a polymer having a nucleophilic group such as hydroxyl group and amino group, and then allowing (meth)acrylic acid chloride, (meth)acrylic acid anhydride, anhydrous mixture of (meth)acrylic acid and methanesulfonic acid or the like to act on the polymer, (2) a method which comprises allowing (meth)acrylic acid to act on the aforementioned polymer having a nucleophilic group in the presence of a catalyst such as sulfuric acid, (3) a method which comprises allowing a compound having an isocyanate group such as methacryloyloxypropyl isocyanate and a (meth)acryloyl group in combination to act on the aforementioned polymer having a nucleophilic group, (4) a method which comprises synthesizing a polymer having an epoxy group, and then allowing a (meth)acrylic acid to act on the polymer, (5) a method which comprises allowing a compound having an epoxy group such as glycidyl methacrylate and a (meth)acrylyol group in combination to act on a polymer having a carboxyl group, (6) a method which comprises polymerizing vinyl monomers having 3-chloropropionic acid ester site, and then subjecting the product to dehydrochlorination, etc. In the present invention, it is particularly preferred that (meth)acryloyl group be incorporated in the polymer having a hydroxyl group by the method (1) or (2).

When the composition ratio of these repeating units containing (meth)acryloyl group is raised, the strength of the low refraction layer can be enhanced, but the refractive index of the low refraction layer, too, is raised. Though depending on the kind of the repeating unit derived from fluorine-containing vinyl monomer, the repeating unit containing (meth)acryloyl group preferably accounts for 5 to 90% by weight, more preferably 30 to 70% by weight, particularly 40 to 60% by weight of the low refraction layer.

The copolymer useful for the present invention may be optionally obtained by the copolymerization of other vinyl monomers besides the aforementioned repeating unit derived from fluorine-containing vinyl monomer and repeating unit having (meth)acryloyl group in its side chain from the standpoint of various views such as adhesiveness to substrate, Tg (contributing to film hardness) of polymer, solubility in solvent, transparency, slipperiness and dust-proofness/stainproofness. A plurality of these vinyl monomers may be used in combination depending on the purpose. These vinyl monomers are preferably incorporated in a total amount of from 0 to 65 mol %, more preferably from 0 to 40 mol %, particularly from 0 to 30 mol % based on the copolymer.

The vinyl monomer units which can be used in combination with the repeating units are not specifically limited. Examples of these vinyl monomer units include olefins (ethylene, propylene, isoprene, vinyl chloride, vinylidene chloride, etc.), acrylic acid esters (methyl acrylate, methyl acrylate, ethyl acrylate, 2-ethxylhexyl acrylate, 2-hydroxyethyl acrylate), methacrylic acid esters (methyl methacrylate, ethyl methacrylate, butyl methacrylate, 2-hydroxyethyl methacrylate, etc.), styrene derivatives (styrene, p-hydroxymethylstyrene, p-methoxystyrene), vinylethers (methyl vinyl ether, ethyl vinyl ether, cyclohexyl vinyl ether, hydroxyethyl vinyl ether, hydroxybutyl vinyl ether, etc.), vinyl esters (vinyl acetate, vinyl propionate, vinyl cinnamate, etc.), unsaturated carboxylic acids (acrylic acid, methacrylic acid, crotonic acid, maleic acid, itaconic acid, etc.), acrylamides (N,N-dimethylacrylamide, N-tert-butylacrylamide, N-cyclohexylacrylamide, etc.), methacrylamdies (N,N-dimethylmethacrylamide), acrylonitrile, etc.

As a preferred embodiment, the copolymer to be used in the present invention is a copolymer of the following general formula (III).

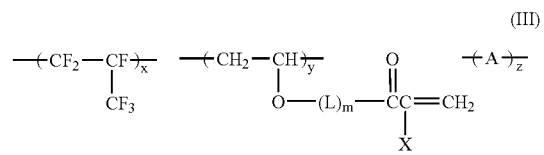

(III)

In the general formula (III), L represents a $C_1$-$C_{10}$ connecting group, preferably $C_1$-$C_6$ connecting group, particularly $C_2$-$C_4$ connecting group, which maybe straight-chain or have a branched structure or may have an annular structure or hetero atoms selected from the group consisting of O, N and S.

Preferred examples of the connecting group include *—$(CH_2)_2$—O—**, *—$(CH_2)_2$—NH—**, *—$(CH_2)_4$—O—**, *—$(CH_2)_6$—O—**, *—$(CH_2)_2$—$(CH_2)_2$—O—, —CONH—$(CH_2)_3$—O—, *—$CH_2CH(OH)CH_2$—O—*, *—$CH_2CH_2OCONH$ $(CH_2)_3$—O—** (in which * represents a connecting site on the polymer main chain side, and ** represents a connecting site on (meth)acryloyl group side), etc. The suffix m represents 0 or 1.

In the general formula (III), X represents a hydrogen atom or methyl group, preferably hydrogen atom from the standpoint of curing reactivity.

In the general formula (III), A represents a repeating unit derived from an arbitrary vinyl monomer. The repeating unit is not specifically limited so far as it is a constituent of a monomer copolymerizable with hexafluoropropylene and can be properly selected from the standpoint of various views such as adhesiveness to substrate, Tg (contributing to film hardness) of polymer, solubility in solvent, transparency, slipperiness and dustproofness/stainproofness. The repeating unit may be formed by a single vinyl monomer or a plurality of vinyl monomers depending on the purpose.

Preferred examples of the vinyl monomer include vinylethers such as methyl vinyl ether, ethyl vinyl ether, t-butyl vinyl ether, cyclohexyl vinyl ether, isopropyl vinyl ether, hydroxyethyl vinyl ether, hydroxybutyl vinyl ether, glycidyl vinyl ether and allyl vinyl ether, vinyl esters such as vinyl acetate, vinyl propionate and vinyl butyrate, (meth)acrylates such as methyl(meth)acrylate, ethyl(meth)acrylate, hydroxyethyl(meth)acrylate, glycidyl methacrylate, allyl(meth)acrylate and (meth)acryloyloxypropyl trimethoxysilane, styrene derivatives such as styrene and p-hydroxymethyl styrene, unsaturated carboxylic acids such as crotonic acid, maleic acid and itaconic acid, derivatives thereof, etc. Preferred among these vinyl monomers are vinyl ether derivatives and vinyl ester derivatives, particularly vinyl ether derivatives.

The suffixes x, y and z each represent mol % of the respective constituent and represent a value satisfying the relationships $30 \leq x \leq 60$, $5 \leq y \leq 70$ and $0 \leq z \leq 65$, preferably $35 \leq x \leq 55$, $30 \leq y \leq 60$ and $0 \leq z \leq 20$, particularly $40 \leq x \leq 55$, $40 \leq y \leq 55$ and $0 \leq z \leq 10$, respectively.

A particularly preferred embodiment of the copolymer to be used in the present invention is the following general formula (IV).

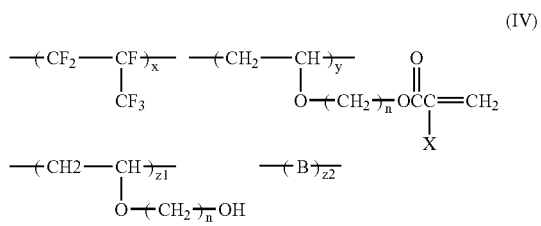

In the general formula (IV), X, x and y are as defined in the general formula (III). Preferred ranges of X, x and y are the same as in the general formula (III).

The suffix n represents an integer of from not smaller than 2 to not greater than 10, preferably from not smaller than 2 to not greater than 6, particularly from not smaller than 2 to not greater than 4.

B represents a repeating unit derived from arbitrary vinyl monomer which may be a single composition or may be formed by a plurality of compositions. Examples of the repeating unit include those described with reference to A in the aforementioned general formula (III).

The suffixes $z_1$ and $z_2$ each represent mol % of the respective constituent and represent a value satisfying the relationships $0 \leq z_1 \leq 65$ and $0 \leq z_2 \leq 65$, preferably, $0 \leq z_1 \leq 30$ and $0 \leq z_2 \leq 10$, particularly $0 \leq z_1 \leq 10$ and $0 \leq z_2 \leq 5$, respectively.

The copolymer represented by the general formula (III) or (IV) can be synthesized, e.g., by incorporating a (meth)acryloyl group in a copolymer containing a hexafluoropropylene component and a hydroxyalkyl vinyl ether component using any of the afore-mentioned methods.

Preferred examples of copolymers useful in the present invention will be given below, but the present invention is not limited thereto.

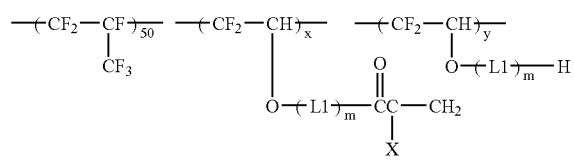

| | x | y | m | L1 | X |
|---|---|---|---|---|---|
| P-1 | 50 | 0 | 1 | *—CH$_2$CH$_2$O—** | H |
| P-2 | 50 | 0 | 1 | *—CH$_2$CH$_2$O—** | CH$_3$ |
| P-3 | 45 | 5 | 1 | *—CH$_2$CH$_2$O—** | H |
| P-4 | 40 | 10 | 1 | *—CH$_2$CH$_2$O—** | H |
| P-5 | 30 | 20 | 1 | *—CH$_2$CH$_2$O—** | H |
| P-6 | 20 | 30 | 1 | *—CH$_2$CH$_2$O—** | H |
| P-7 | 50 | 0 | 0 | — | H |
| P-8 | 50 | 0 | 1 | *—C$_4$H$_8$O—** | H |
| P-9 | 50 | 0 | 1 | *—(CH$_2$)$_2$O—(CH$_2$)$_2$O—** | H |
| P-10 | 50 | 0 | 1 | *—⬡—O—** | H |
| P-11 | 50 | 0 | 1 | *—CH$_2$CH$_2$NH—** | H |
| P-12 | 50 | 0 | 1 | *—CH$_2$CH$_2$OC(O)NHCH$_2$CH$_2$CH$_2$O—** | H |
| P-13 | 50 | 0 | 1 | *—CH$_2$CH$_2$OC(O)NHCH$_2$CH$_2$CH$_2$O—** | CH$_3$ |
| P-14 | 50 | 0 | 1 | *—CH$_2$CH$_2$CH$_2$CH$_2$OC(O)NHCH$_2$CH$_2$CH$_2$O—** | CH$_3$ |
| P-15 | 50 | 0 | 1 | *—CH$_2$CH(OH)CH$_2$O—** | H |
| P-16 | 50 | 0 | 1 | *—CH$_2$CH(CH$_2$OH)O—** | H |
| P-17 | 50 | 0 | 1 | *—CH$_2$CH$_2$OCH$_2$—CH(OH)CH$_2$O—** | H |

-continued

| | | | | L | A |
|---|---|---|---|---|---|
| P-18 | 50 | 0 | 1 | *—CH$_2$OCH$_2$CH(OH)—CH$_2$O—** | CH$_3$ |
| P-19 | 50 | 0 | 1 | *—CH$_2$OCH$_2$CH(CH$_2$OH)—O—** | CH$_3$ |
| P-20 | 40 | 10 | 1 | *—CH$_2$CH$_2$O—** | CH$_3$ |

The symbol * indicates the polymer main chain side, and the symbol ** indicates (meth)acryloyl group side.

$$-(CF_2-CF(CF_3))_a-(CF_2-CH(O-L1-OC(O)CCH=CH_2))_b-A_c-$$

| | a | b | b | L1 | A |
|---|---|---|---|---|---|
| P-21 | 55 | 45 | 0 | *—CH$_2$CH$_2$O—** | — |
| P-22 | 45 | 55 | 0 | *—CH$_2$CH$_2$O—** | — |
| P-23 | 50 | 45 | 5 | *—CH$_2$CH$_2$OC(O)NHCH$_2$CH$_2$CH$_2$O—** | —CH$_2$—CH(OCH$_2$CH$_2$OH)— |
| P-24 | 50 | 45 | 5 | *—CH$_2$CH(OH)—CH$_2$O—** | —CH$_2$—CH(O-CH$_2$-epoxide)— |
| P-25 | 50 | 45 | 5 | *—CH$_2$CH(CH$_2$OH)O—** | —CH$_2$—CH(O-CH$_2$-epoxide)— |
| P-26 | 50 | 40 | 10 | *—CH$_2$CH$_2$O—** | —CH$_2$—CH(OCH$_2$CH$_3$)— |
| P-27 | 50 | 40 | 10 | *—CH$_2$CH$_2$O—** | —CH$_2$—CH(O-cyclohexyl)— |
| P-28 | 50 | 40 | 10 | *—CH$_2$CH$_2$O—** | —CH(CH$_3$)—CH(COOH)— |

The symbol * indicates the polymer main chain side, and the symbol ** indicates acryloyl group side.

$$-(CF_2-CF(CF_3))_x-(CF_2-CH(O-(CH_2)_nOC(O)CX=CH_2))_y-(CH_2-CH(O-(CH_2)_n-OH))_{z1}-(B)_{z2}-$$

| | x | y | z1 | z2 | n | X | B |
|---|---|---|---|---|---|---|---|
| P-29 | 50 | 40 | 5 | 5 | 2 | H | —CH$_2$—CH(O—CH$_2$CH$_3$)— |
| P-30 | 50 | 35 | 5 | 10 | 2 | H | —CH$_2$—CH(O—C(CH$_3$)$_3$)— |

-continued

| | | | | | | | |
|---|---|---|---|---|---|---|---|
| P-31 | 40 | 40 | 10 | 10 | 4 | $CH_3$ | —$CH_2$—CH(—O—C$_6$H$_{11}$)— |

$$-(CF_2-CF)_{50}- \quad -(Y)_a- \quad -(Z)_b-$$
$$\quad\quad\quad |$$
$$\quad\quad\quad CF_3$$

| | a | b | Y | Z |
|---|---|---|---|---|
| P-32 | 45 | 5 | —CH(CH$_3$)—CH(CO$_2$CH$_2$CH(OH)CH$_2$OC(=O)C(CH$_3$)=CH$_2$)— | —CH(CH$_3$)—CH(COOH)— |
| P-33 | 40 | 10 | —CH$_2$—CH(CO$_2$H)(CONHCH$_2$CH$_2$OC(=O)CH=CH$_2$)— | —CH—CH— (maleic anhydride ring) |

$$-(CH_2-CH)_x- \quad -(CH_2-CH)_y- \quad -(CH_2-CH)_z-$$
$$\quad |\quad\quad\quad\quad |\quad\quad\quad\quad\quad |$$
$$\quad O=C\quad\quad\quad O=C\quad\quad\quad\quad O=C$$
$$\quad |\quad\quad\quad\quad |\quad\quad\quad\quad\quad |$$
$$\quad O\quad\quad\quad\quad O\quad\quad\quad\quad\quad O$$
$$\quad |\quad\quad\quad\quad |\quad\quad\quad\quad\quad |$$
$$\quad Rf\quad\quad\quad L-C(=O)CH-CH_2\quad L-H$$

| | x | y | z | Rf | L |
|---|---|---|---|---|---|
| P-34 | 60 | 40 | 0 | —CH$_2$CH$_2$C$_8$F$_{17}$—n | —CH$_2$CH$_2$O— |
| P-35 | 60 | 30 | 10 | —CH$_2$CH$_2$C$_4$F$_8$H—n | —CH$_2$CH$_2$O— |
| P-36 | 40 | 60 | 0 | —CH$_2$CH$_2$C$_6$F$_{12}$H | —CH$_2$CH$_2$CH$_2$CH$_2$O— |

$$-(CH_2-CH)_x- \quad -(CH_2-CH)_y- \quad -(CH_2-CH)_z-$$
with Rf, O—(CH$_2$)$_n$—OC(=O)CH—CH$_2$, and O—(CH$_2$)$_n$—OC(=O)CH=CH$_2$ substituents

| | x | y | z | n | Rf |
|---|---|---|---|---|---|
| P-37 | 50 | 50 | 0 | 2 | —CH$_2$C$_4$F$_8$H—n |
| P-38 | 40 | 55 | 5 | 2 | —CH$_2$C$_4$F$_8$H—n |
| P-39 | 30 | 70 | 0 | 4 | —CH$_2$C$_8$F$_{17}$ |
| P-40 | 60 | 40 | 0 | 2 | —CH$_2$CH$_2$C$_8$F$_{16}$H—n |

The synthesis of the copolymer to be used in the present invention can be carried out by synthesizing a precursor such as hydroxyl group-containing polymer by any of various polymerization methods such as solution polymerization, precipitation polymerization, suspension polymerization, precipitation polymerization, mass polymerization and emulsion polymerization, and then incorporating a (meth)acryloyl group in the precursor by the aforementioned polymer reaction. The polymerization reaction may be effected by any known method such as batchwise method, semi-continuous method and continuous method.

Examples of the method for initiating the polymerization include a method involving the use of a radical polymerization initiator, a method involving irradiation with light or radiation, etc. These polymerization methods and polymerization initiating methods are described in Teiji Tsuruta, "Kobunshi Gosei Houhou (Polymer Synthesis Method)", revised edition (published by Nikkan Kogyo Shinbun, 1971) and Takayuki Otsu and Masayoshi Kinoshita, "Koubunshi Gosei no Jikkenho (Method of Experiment of Polymer Synthesis)", Kagaku Dojin, 1972, pp. 124 to 154.

Particularly preferred among the aforementioned polymerization methods is solution polymerization method using a radical polymerization initiator. As the solvent to be used in solution polymerization there may be used one or a mixture of two or more of various organic solvents such as ethyl acetate, butyl acetate, acetone, methyl ethyl ketone, methyl isobutyl ketone, cyclohexanone, tetrahydrofurane, dioxane, N,N-dimethylformamide, N,N-dimethylacetamide, benzene, toluene, acetonitrile, methylene chloride, chloroform, dichloroethane, methanol, ethanol, 1-propanol, 2-propanol and 1-butanol. A mixture of these organic solvents with water may be used.

The polymerization temperature needs to be predetermined in connection with the molecular weight of the polymer thus produced, the kind of the initiator, etc. and can range from below 0° C. to above 100° C., but the polymerization is preferably effected at a temperature of from 50° C. to 100° C.

The reaction pressure can be properly predetermined but is normally preferably from 1 to 100 kg/cm$^2$, particularly from 1 to 30 kg/cm$^2$. The reaction time is from about 5 hours to 30 hours.

Preferred examples of the reprecipitation solution for the polymer thus obtained include isopropanol, hexane, methanol, etc.

The low refraction layer-forming composition of the present invention is normally in liquid form and is prepared by dissolving the aforementioned copolymer as an essential constituent and optionally various additives and a radical polymerization initiator in a proper solvent. In this case, the solid content concentration is properly predetermined depending on the purpose but is normally from about 0.01 to 60% by weight, preferably from about 0.5 to 50% by weight, particularly from about 1 to 20% by weight.

From the standpoint of improving resistance to scuffing of the low retraction layer, additives, for example, a hardener such as polyfunctional (meth)acrylate compound, polyfunctional epoxy compound, polyisocyanate compound, aminoplast, polybasic acid or anhyride thereof, or an inorganic fine particle such as silica, can be added to the low refraction layer in a small amount from the standpoint of interfacial adhesiveness to the high refraction layer. The amount of these additives, if added, is preferably from 0 to 30% by weight, more preferably from 0 to 20% by weight, particularly from 0 to 10% by weight based on the total solid content in the low refraction layer.

For the purpose of providing properties such as stainproofness, water resistance, chemical resistance and slipperiness, a known silicone-based or fluorine-based stainproofing agent, a lubricant or the like may be properly added. The amount of these additives, if added, is preferably from 0 to 20% by weight, more preferably from 0 to 10% by weight, particularly from 0 to 5% by weight based on the total solid content in the low refraction layer.

Hard Coat Layer

The hard coat layer is provided on the surface of the transparent support to provide the anti-reflection film with physical strength. It is particularly preferred that the hard coat layer be provided interposed between the transparent support and the aforementioned high refraction film.

The hard coat layer is preferably formed by the crosslinking reaction or polymerization reaction of an ionizing radiation-curing compound of low molecular weight oligomers or polymers. The hard coat layer can be formed, e.g., by applying a coating composition containing an ionizing radiation-curing polyfunctional monomer or polyfunctional oligomer to a transparent support, and then subjecting the polyfunctional monomer or polyfunctional monomer or polyfunctional oligomer to crosslinking reaction or polymerization reaction.

The ionizing radiation-curing polyfunctional monomer or polyfunctional oligomer is preferably a photopolymerizable, electron ray-polymerizable or radiation-polymerizable functional group, particularly photopolymerizable functional group.

Examples of the photopolymerizable functional group include unsaturated polymerizable functional groups such as (meth)acryloyl group, vinyl group, styryl group or allyl group, and cation-polymerizable functional groups such as epoxy group, thioepoxy group or vinyl groups. Of those, (meth)acryloyl group and epoxy group are preferable.

Specific examples of the photopolymerizable polyfunctional monomer having a photopolymerizable functional group include those exemplified with reference to the high refraction film. The photopolymerizable polyfunctional monomer is preferably polymerized in the presence of a photopolymerization initiator or photosensitizer. The photopolymerization reaction is preferably carried out by applying a hard coat layer, drying the hard coat layer, and then irradiating the hard coat layer with ultraviolet rays.

The hard coat layer preferably contains an inorganic fine particles having an average primary particle diameter of not greater than 200 nm. The term "average particle diameter" as used herein is meant to indicate weight-average diameter. By predetermining the average primary particle diameter to be not greater than 200 nm, a hard coat layer which can keep its desired transparency can be formed.

The inorganic fine particles acts to raise the hardness of the hard coat layer as well as inhibit the cure shrinkage of the coat layer. The inorganic fine particles are also added for the purpose of controlling the refractive index of the hard coat layer.

As the inorganic fine particles there may be used a fine particles of silicon dioxide, aluminum oxide, calcium carbonate, barium sulfate, talc, kaolin, calcium sulfate, titanium dioxide, zirconium oxide, tin oxide, ATO, ITO, zinc oxide or the like besides the inorganic fine particles exemplified with reference to the high refraction film. Preferred among these fine particless are silicon dioxide, titanium dioxide, zirconium oxide, aluminum oxide, tin oxide, ATO, ITO and zinc oxide.

The average primary particle diameter of the inorganic fine particles contained in the hard coat layer is preferably from 5 nm to 200 nm, more preferably from 10 nm to 150 nm, even more preferably from 20 nm to 100 nm, particularly from 20 nm to 50 nm.

The inorganic fine particles are preferably dispersed in the hard coat layer as finely as possible.

The particle size of the inorganic fine particles in the hard coat layer is preferably from 5 nm to 300 nm, more preferably from 10 nm to 200 nm, even more preferably from 20 nm to 150 nm, particularly from 20 nm to 80 nm as calculated in terms of average particle diameter.

The content of the inorganic fine particles in the hard coat layer is preferably from 10% to 90% by weight, more preferably from 15% to 80% by weight, particularly from 15% to 75% by weight based on the total weight of the hard coat layer.

As previously mentioned, the high refraction film can act also as a hard coat layer. In the case where the high refraction film acts also as a hard coat layer, the high refraction film is preferably formed by incorporating inorganic fine particles having a high refractive index finely dispersed in the hard coat layer using the method described with reference to the high refraction film.

The hard coat layer may further comprise particles having an average particle diameter of from 0.2 μm to 10 μm described later incorporated therein to act also as an anti-glare layer having an anti-glare performance.

The thickness of the hard coat layer can be properly designed depending on the purpose. The thickness of the hard coat layer is preferably from 0.2 μm to 10 μm, more preferably from 0.5 μm to 7 μm, particularly from 0.7 μm to 5 μm.

The strength of the hard coat layer is preferably not lower than H, more preferably not lower than 2H, most preferably not lower than 3H according to pencil hardness test of JIS K5400.

The abrasion of the test specimen when subjected to Taber test according to JIS K5400 is preferably as small as possible.

In the case where the hard coat layer is formed by the crosslinking reaction or polymerization reaction of an ionizing radiation-curing compound, the crosslinking reaction or polymerization reaction is preferably effected in an atmosphere having an oxygen concentration of not greater than 10% by volume. By forming the hard coat layer in an atmosphere having an oxygen concentration of not greater than 10% by volume, a hard coat layer excellent in physical strength and chemical resistance can be obtained.

The crosslinking reaction or polymerization reaction is more preferably effected in an atmosphere having an oxygen concentration of not greater than 6% by volume, even more preferably not greater than 4% by volume, particularly not greater than 2% by volume, most preferably not greater than 1% by volume.

The adjustment of the oxygen concentration to not greater than 10% by volume is preferably carried out by replacing the atmosphere (nitrogen concentration: about 79% by volume; oxygen concentration: about 21% by volume) by other gases, particularly nitrogen (purge with nitrogen).

The hard coat layer is preferably formed by applying a coating composition for forming a hard coat layer to the surface of a transparent support.

The coating solvent is preferably a ketone-based solvent as exemplified with reference to the high refraction film. By using such a ketone-based solvent, the adhesiveness of the surface of the transparent support (particularly triacetyl cellulose support) to the hard coat layer is further improved.

Particularly preferred examples of the coating solvent include methyl ethyl ketone, methyl isobutyl ketone, and cyclohexanone.

The coating solvent may contain solvents other than the ketone-based solvents exemplified with reference to the high refraction film.

Referring to the coating solvent, the content of the ketone-based solvent is preferably not smaller than 10% by weight, more preferably not smaller than 30% by weight, even more preferably 60% by weight based on the total weight of solvents contained in the coating composition.

Surface Roughness of Anti-Reflection Film

The anti-reflection film to be used in the present invention may have roughness formed on the surface thereof having the high refraction film to exhibit anti-glare properties.

The anti-glare properties are related to the average surface roughness (Ra). The surface roughness is preferably from 0.01 μm to 0.4 μm, more preferably from 0.03 μm to 0.3 μm, even more preferably from 0.05 μm to 0.25 μm, particularly from 0.07 μm to 0.2 μm as calculated in terms of average surface roughness (Ra) per surface area of 1 mm2 randomly sampled from area of 100 cm$^2$.

The average surface roughness (Ra) is described in Jiro Nara, "Hyoumen Arasa no Sokutei-Hyoukaho (Method for Measuring and Evaluating Surface Roughness)", Techno Compact Series (6), K. K. Sogo Gijutsu Center.

The shape of valley and mountain on the surface of the anti-reflection film to be used in the present invention can be evaluated by an atomic force microscope (AFM).

As the method for forming surface roughness there may be used any known method. In the present invention, a method which comprises pressing a plate having a roughened surface against the surface of a film at a high pressure (e.g., embossing) or a method which comprises incorporating a fine particles in any layer on the anti-reflection film to form an anti-glare layer, thereby forming roughness on the surface of the anti-reflection film.

As the embossing method for forming roughness on the surface of the film there may be used any known method, but it is particularly preferred that the method described in JP-A-2000-329905 be employed to form roughness.

In the case where a fine particles is incorporated in any layer on the anti-reflection film to form an anti-glare layer, as the fine particles to be incorporated in the anti-glare layer there is preferably used a fine particles having an average particle diameter of from 0.2 μm to 10 μm. The term "average particle diameter" as used herein is meant to indicate the weight-average diameter of secondary particles (primary particles if particles are not agglomerated).

Examples of the fine particles include inorganic fine particles and organic fine particles. Specific examples of the inorganic fine particles include fine particless of silicon dioxide, titanium dioxide, zirconium oxide, aluminum oxide, tin oxide, ITO, zinc oxide, calcium carbonate, barium sulfate, talc, kaolin, calcium sulfate, etc. Preferred among these inorganic fine particless are silicon dioxide and aluminum oxide.

As the organic fine particles there is preferably used resin fine particles. Specific examples of the resin fine particles include fine particless made of silicon resin, melamine resin, benzoguanamine resin, polymethyl methacrylate resin, polystyrene resin and polyvinylidene fluoride resin. Preferred among these resin fine paticles are those made of melamine resin, benzoguanamine resin, polymethyl methacrylate resin and polystyrene resin, particularly those made of polymethyl methacrylate resin, benzoguanamine resin and polystyrene resin.

As the fine particles to be used in the anti-glare layer to form roughness there is preferably used resin fine particles.

The average particle diameter of the fine particles is preferably from 0.5 μm to 7.0 μm, more preferably from 1.0 μm to 5.0 μm, particularly from 1.5 μm to 4.0 μm.

The refractive index of the fine particles is preferably from 1.35 to 1.80, more preferably from 1.40 to 1.75, even more preferably from 1.45 to 1.75.

The distribution of particle diameter of the fine particles is preferably as sharp as possible. S value indicating the distribution of particle diameter of the fine particles is represented by the following equation and is preferably not greater than 2, more preferably not greater than 1.0, particular not greater than 0.7.

$$S=[D(0.9)-D(0.1)]/D(0.5)$$

D(0.1): 10% value of integration of particle diameter calculated in volume equivalence D(0.5): 50% value of integration of particle diameter calculated in volume equivalence D(0.9): 90% value of integration of particle diameter calculated in volume equivalence The refractive index of the fine particles is not specifically limited but is preferably substantially the same (difference of not greater than 0.005) as that of the anti-glare layer or different from that of the anti-glare layer by not smaller than 0.02.

By predetermining the refractive index of the fine particles and the anti-glare layer to be substantially the same, the contrast on an image display device provided with the anti-reflection film is improved.

By making difference in refractive index between the fine particles and the anti-glare layer, the visibility (glare, angle of view, etc.) of a liquid crystal display provided with the anti-reflection film on the surface thereof is improved.

In the case where there is provided a difference in refractive index between the fine particles and the anti-glare layer, the difference is preferably from 0.03 to 0.5, more preferably from 0.03 to 0.4, particularly from 0.05 to 0.3.

The fine particles providing anti-glare performance may be incorporated in any layer formed on the anti-reflection film, preferably hard coat layer, low refraction film or high refraction film, particularly hard coat layer or high refraction film. The fine particles may be incorporated in a plurality of layers.

Other Layers in Anti-Reflection Film

In order to prepare an anti-reflection film having better anti-reflection performance, a middle refraction layer having a refractive index between that of the high refraction film and that of the transparent support is preferably provided.

The middle refraction layer is preferably prepared in the same manner as described with reference to the high refraction film of the present invention. The adjustment of the refractive index of the middle refraction layer can be carried out by controlling the content of the inorganic fine particles in the film.

The anti-reflection film may comprise layers other than mentioned above. For example, an adhesive layer, a shield layer, a sliding layer or an antistatic layer may be provided. The shield layer is provided to shield electromagnetic wave or infrared rays.

In the case where the anti-reflection film is applied to a liquid crystal display device, an undercoat layer having a fine particles having an average particle diameter of from 0.1 μm to 10 μm incorporated therein may be additionally formed for the purpose of improving the angle of view. The term "average particle diameter" as used herein is meant to indicate the weight-average particle diameter of secondary particles (primary particles if particles are not agglomerated). The average particle diameter of the fine particles is preferably from 0.3 μm to 5.0 μm, more preferably from 0.3 μm to 4.0 μm, particularly from 0.5 μm to 3.5 μm.

The refractive index of the fine particles is preferably from 1.35 to 1.80, more preferably from 1.40 to 1.75, particularly from 1.45 to 1.75.

The distribution of particle diameter of the fine particles is preferably as sharp as possible. S value indicating the distribution of particle diameter of the fine particles is represented by the foregoing equation and is preferably not greater than 1.5, more preferably not greater than 1.0, particular not greater than 0.7.

The difference in refractive index between the fine particles and the undercoat layer is preferably not smaller than 0.02, more preferably from 0.03 to 0.5, even more preferably from 0.05 to 0.4, particularly from 0.07 to 0.3.

Examples of the fine particles to be incorporated in the undercoat layer include the inorganic fine particles and organic fine particles described with reference to the anti-glare layer.

The undercoat layer is preferably formed interposed between the hard coat layer and the transparent support. The undercoat layer can act also as a hard coat layer.

In the case where the undercoat layer comprises a fine particles having an average particle diameter of from 0.1 μm to 10 μm incorporated therein, the haze of the undercoat layer is preferably from 3% to 60%, more preferably from 5% to 50%, even more preferably from 7% to 45%, particularly from 10% to 40%.

Method for Forming Anti-Reflection Film, etc.

In the present invention, the various layers constituting the anti-reflection film are preferably prepared by a coating method. In the case where the various layers are formed by a coating method, dip coating method, air knife coating method, curtain coating method, roller coating method, wire bar coating method, gravure coating method, micro gravure coating method or extrusion coating method (described in U.S. Pat. No. 2,681,294) may be employed. Two or more layers may be coated simultaneously. The simultaneous coating method is described in U.S. Pat. Nos. 2,761,791, 2,941, 898, 3,508,947 and 3,526,528, and Yuji Harasaki, "Kotingu Kogaku (Coating Engineering)", Asakura Shoten, page 253, 1973. Wire bar coating method, gravure coating method and micro gravure coating method are preferred.

The various layer in the anti-reflection film may comprise a resin, a surface active agent, an antistat, a coupling agent, a thickening agent, a coloring inhibitor, a coloring material (pigment, dye), an anti-foaming agent, a leveling agent, a fire retardant, an ultraviolet absorber, a tackifying agent, a polymerization inhibitor, an oxidation inhibitor, a surface modifier, etc. incorporated therein besides the aforementioned fine particles, polymerization initiator and photosensitizer.

In the present invention, the anti-reflection film preferably exhibits a dynamic friction coefficient of not greater than 0.25 on the high refraction layer side thereof to improve the physical strength (scratch resistance, etc.) thereof. The term "dynamic friction coefficient" as used herein is meant to indicate the dynamic fiction coefficient of the surface of the high refraction film side with respect to a stainless steel sphere having a diameter of 5 mm measured when the stainless steel sphere is allowed to move along the surface of the high refraction film side at a rate of 60 cm/min at a load of 0.98 N. The surface dynamic friction coefficient of the high refraction film side is preferably not greater than 0.17, particularly not greater than 0.15.

The anti-reflection film preferably exhibits a contact angle of not smaller than 90°, more preferably not smaller than 95°, particularly not 100° with respect to water on the high refraction film side thereof to improve its anti-glare properties.

In the case where the anti-reflection film has no anti-glare performance, the haze of the anti-reflection film is preferably as low as possible.

In the case where the anti-reflection film has an anti-glare performance, the haze of the anti-reflection film is preferably from 0.5% to 50%, more preferably from 1% to 40%, most preferably from 1% to 30%.

Constitution of Anti-Reflection Film

Examples of the constitution of the anti-reflection film of the present invention will be described in connection with the drawings.

FIG. 1 is a schematic sectional view illustrating typically the layer structure of an anti-reflection film having an excellent anti-reflection performance.

The embodiment shown in FIG. 1(a) has a layer structure having a transparent support 1, a hard coat layer 2, a high refraction film 3 and a low refraction film (outermost layer) 4 disposed in this order. The transparent support 1, the high refraction film 3 and the low refraction film 4 each have a refractive index satisfying the following relationship. Refractive index of high refraction film>refractive index of transparent support>refractive index of low refraction film The layer structure shown in FIG. 1(a) is advantageous in that when the high refraction film and the low refraction film satisfy the following equations (1) and (2), respectively, an anti-reflection film having a better anti-reflection performance can be prepared as described in JP-A-59-50401.

$$(m\lambda/4) \times 0.7 < n_1 d_1 < (m\lambda/4) \times 1.3 \tag{1}$$

In the equation (1), m represents a positive integer (normally 1, 2 or 3), $n_1$ represents the refractive index of the high refraction film, and $d_1$ represents the thickness (nm) of the high refraction film. $\lambda$ represents the wavelength of visible light ranging from 380 to 680 (nm).

$$(n\lambda/4) \times 0.7 < n_2 d_2 < (n\lambda/4) \times 1.3 \tag{2}$$

In the equation (2), n represents a positive odd number (normally 1), $n_2$ represents the refractive index of the low refraction film, and $d_2$ represents the thickness (nm) of the low refraction film. λ represents the wavelength of visible light ranging from 380 to 680 (nm).

The term "satisfying the equations (1) and (2)" as used herein is meant to indicate that there are m (positive integer which is normally 1, 2 or 3) satisfying the equation (1) and n (odd number which is normally 1) satisfying the equation (2) within the aforementioned range of wavelength. This can apply to the following equations (3) to (8).

The embodiment shown in FIG. 1(b) has a layer structure having a transparent support 1, a hard coat layer 2, a middle refraction layer 5, a high refraction film 3 and a low refraction film (outermost layer) 4 provided in this order. The transparent support 1, hard coat layer 2, middle refraction layer 5, high refraction film 3 and low refraction film 4 each have a refractive index satisfying the following relationship.

Refractive index of high refraction film>refractive index of middle refraction layer>refractive index of transparent support>refractive index of low refraction film The layer structure shown in FIG. 1(b) is advantageous in that when the middle refraction film, the high refraction film and the low refraction film satisfy the following equations (3), (4) and (5), respectively, an anti-reflection film having a better anti-reflection performance can be prepared as described in JP-A-59-50401.

$$(h\lambda/4) \times 0.7 < n_3 d_3 < (h\lambda/4) \times 1.3 \quad (3)$$

In the equation (3), h represents a positive integer (normally 1, 2 or 3), $n_3$ represents the refractive index of the middle refraction film, and $d_3$ represents the thickness (nm) of the middle refraction film. λ represents the wavelength of visible light ranging from 380 to 680 (nm).

$$(i\lambda/4) \times 0.7 < n_4 d_4 < (i\lambda/4) \times 1.3 \quad (4)$$

In the equation (4), i represents a positive integer (normally 1, 2 or 3), $n_4$ represents the refractive index of the high refraction film, and $d_4$ represents the thickness (nm) of the high refraction film. λ represents the wavelength of visible light ranging from 380 to 680 (nm).

$$(j\lambda/4) \times 0.7 < n_5 d_5 < (j\lambda/4) \times 1.3 \quad (5)$$

In the equation (5), j represents a positive odd number (normally 1), $n_5$ represents the refractive index of the low refraction film, and $d_5$ represents the thickness (nm) of the low refraction film. λ represents the wavelength of visible light ranging from 380 to 680 (nm).

In the layer structure shown in FIG. 1(b), it is particularly preferred that the middle refraction layer, the high refraction film and the low refraction film satisfy the following equations (6), (7) and (8), respectively.

Herein, λ is 500 nm, h is 1, i is 2, and j is 1.

$$(h\lambda/4) \times 0.80 < n_3 d_3 < (h\lambda/4) \times 1.00 \quad (6)$$

$$(i\lambda/4) \times 0.75 < n_4 d_4 < (i\lambda/4) \times 0.95 \quad (7)$$

$$(j\lambda/4) \times 0.95 < n_5 d_5 < (j\lambda/4) \times 1.05 \quad (8)$$

The term "high refractive index, middle refractive index, low refractive index" as used herein is meant to indicate the magnitude of the refractive index of the layers relative to each other. In FIGS. 1(a) and (b), the high refraction film is used as an optical interference layer, making it possible to prepare an anti-reflection film having an extremely excellent anti-reflection performance.

It is also preferred that the hard coat layer, middle refraction layer or middle refraction film comprise a fine particles having an average particle diameter of from 0.2 μm to 10 μm incorporated therein to prepare an anti-glare film having an anti-glare performance.

Figure 2:
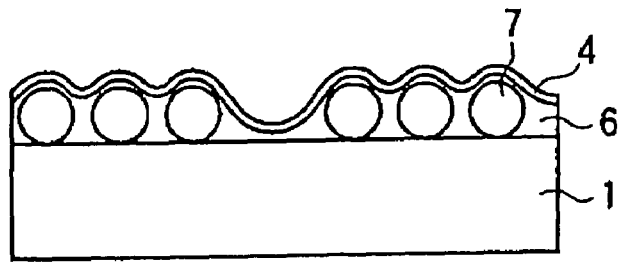
FIGS. 2(a) and (b) each are a schematic sectional view illustrating typically the layer structure of an anti-reflection film further having anti-glare properties.
Figure 2:
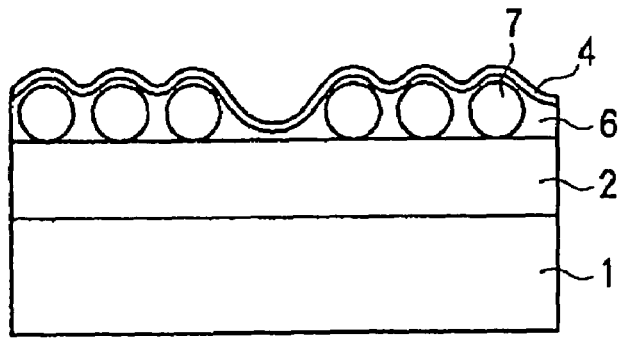

The embodiment shown in FIG. 2(a) has a layer structure having a transparent support 1, anti-glare layer (high refraction film) 6 and a low refraction film (outermost layer) 4 provided in this order. The fine particles 7 incorporated in the anti-glare layer are fine particles having an average particle diameter of from 0.2 μm to 10 μm.

The embodiment shown in FIG. 2(b) has a layer structure having a transparent support 1, a hard coat layer 2, an anti-glare layer (high refraction film) 6 and a low refraction film (outermost layer) 4 provided in this order. The fine particles 7 incorporated in the anti-glare layer 6 is a fine particles having an average particle diameter of from 0.2 μm to 10 μm.

In the embodiments shown in FIGS. 2(a) and (b), the transparent support 1, the anti-glare layer (high refraction film) 6 and the low refraction film 4 each have a refractive index satisfying the following relationship.

Refractive index of anti-glare layer>refractive index of transparent support>refractive index of low refraction film The layer structures shown in FIGS. 2(a) and (b) are advantageous in that when the low refraction film 4 satisfies the following equation (9), an excellent anti-reflection film can be prepared.

$$(k\lambda/4) \times 0.7 < n_6 d_6 < (k\lambda/4) \times 1.3 \quad (9)$$

In the equation (9), k represents a positive odd number (normally 1), $n_6$ represents the refractive index of the low refraction film, and $d_6$ represents the thickness (nm) of the low refraction film. λ represents the wavelength of visible light ranging from 380 to 680 (nm).

The term "satisfying the equation (9)" as used herein is meant to indicate that there is k (positive odd number which is normally 1) satisfying the equation (9) within the aforementioned range of wavelength.

The embodiments shown in FIGS. 2(a) and (b) are preferably used when the high refraction film is provided with hard coat properties, making it possible to prepare an anti-reflection film having an extremely excellent physical strength (scratch resistance, etc.).

Polarizing Plate

The polarizing plate of the present invention has an anti-reflection film of the present invention provided on at least one side of a protective film (protective film for polarizing plate) for polarizing film. The protective film for polarizing plate preferably exhibits a contact angle of not greater than 40° with respect to water on the surface of the transparent support on the side thereof opposite the high refraction film, i.e., on the side thereof to be laminated with the polarizing film as mentioned above.

By using the anti-reflection film of the present invention as a protective film for polarizing plate, a polarizing plate having an anti-reflection performance can be prepared, making it possible to drastically reduce the cost and the thickness of display device.

Further, by preparing a polarizing plate having an anti-reflection film of the present invention provided on one side of the protective film for polarizing plate and an optically anisotropic optically-compensated film provided on the other side of the protective film for polarizing plate, a polarizing plate can be prepared which can improve the daylight contrast of liquid crystal display device and drastically raise the horizontal and vertical angle of view.

Polarizing Film

As the polarizing film to be used in the polarizing plate of the present invention there may be used any known material. The polymer film to be used in the polarizing film is not specifically limited and may be a film made of a proper thermoplastic polymer soluble in volatile solvents. Examples of the polymer include PVA, polycarbonate, cellulose acylate, polysulfone, etc. The method for stretching the polymer film is not specifically limited. Any known stretching method may be employed.

Protective Film for Polarizing Plate

In the case where the anti-reflection film of the present invention is used as a protective film for polarizing film (protective film for polarizing plate), the anti-reflection film preferably exhibits a contact angle of not greater than 40°, more preferably not greater than 30°, particularly not greater than 25° with respect to water on the surface of the transparent support on the side thereof opposite the high refraction film, i.e., on the side thereof to be laminated with the polarizing film.

When the contact angle is not greater than 40°, it is useful to improve the adhesiveness to a polarizing plate mainly composed of polyvinyl alcohol.

As the transparent support there is particularly preferably used a triacetyl cellulose film.

Examples of the method for preparing the protective film for polarizing plate of the present invention include the following two methods.

(1) Method which comprises applying the aforementioned various layers (e.g., high refraction film, hard coat layer, outermost layer) to one side of a saponified transparent support.

(2) Method which comprises applying the aforementioned various layers (e.g., high refraction film, hard coat layer, low refraction film, outermost layer) to one side of a transparent support, and then subjecting the coated material to saponification on the side thereof to be laminated with the polarizing film.

In the method (1), when only one side of the transparent support has been saponified, the various layers are applied to the transparent support on the unsaponified side thereof. When the transparent support has been saponified on both sides thereof, the transparent support is then subjected to surface treatment such as corona discharge treatment, glow discharge treatment and flame treating on the saponified side thereof to be coated with the various layers before the application of the various layers.

In the method (2), the anti-reflection film is preferably entirely dipped in a saponifying solution. In this case, the anti-reflection film may be dipped in a saponifying solution with the side having the various layers protected by a protective film so that the transparent support is subjected to saponification on the side thereof to be laminated with the polarizing film.

Alternatively, the anti-reflection film may be coated with a saponifying solution on the surface of the transparent support on the side thereof to be laminated with the polarizing film so that the transparent support is subjected to saponification on the side thereof to be laminated with the polarizing film.

The method (2) is advantageous in that a protective film for polarizing plate can be produced at a low price.

The protective film for polarizing plate is required to satisfy optical properties (anti-reflection performance, anti-glare performance), physical properties (scratch resistance, etc.), chemical resistance, stainproofness (stain resistance, etc.) and weathering resistance (resistance to moist heat, light-resistance) as defined with reference to the anti-reflection film of the present invention.

Accordingly, the protective film for polarizing plate preferably exhibits a dynamic friction coefficient of not greater than 0.25, more preferably not greater than 0.17, particularly not greater than 0.15 on the side thereof having a high refraction film.

Further, the protective film for polarizing plate preferably exhibits a contact angle of not lower than 90°, more preferably not lower than 95°, not lower than 100° with respect to water on the side thereof having a high refraction film.

Saponification

The aforementioned saponification is preferably carried out by any known method, e.g., dipping the transparent support or anti-reflection film in an alkaline solution for a proper period of time.

The alkaline solution is preferably an aqueous solution of sodium hydroxide. The concentration of the aqueous solution of sodium hydroxide is preferably from 0.5 to 3 N, particularly from 1 to 2 N. The temperature of the alkaline solution is preferably from 30° C. to 70° C., particularly from 40° C. to 60° C.

The transparent support or anti-reflection film which has thus been dipped in the alkaline solution is preferably thoroughly washed with water or dipped in a diluted acid to neutralize the alkaline component so that prevent the alkaline component from remaining in the film.

When saponification is effected, the surface of the transparent support is hydrophilized. The protective film for polarizing plate is bonded to a polarizing film on the hydrophilized surface of the transparent support.

The hydrophilized surface is useful to improve the adhesiveness of the transparent support to a polarizing film mainly composed of polyvinyl alcohol.

The saponification is preferably effected in such a manner that the contact angle of the transparent support with respect to water on the side thereof opposite the high refraction film is not greater than 40°, more preferably not greater than 30°, particularly not greater than 25°.

Optically Compensated Film

The optically compensated film (retardation film) can improve the angle of view of a liquid crystal display.

As the optically compensated film there may be used any known material. For the purpose of raising the angle of view, however, an optically compensated sheet as described in U.S. Pat. Nos. 2,587,396 and 2,565,644, JP-A-2002-82226 may be used. Particularly preferred is an optically compensated film having an optically anisotropic layer formed by a compound having a discotic structural unit provided on a transparent support which changes in the angle between the surface of a disc of the discotic compound and the support with the distance from the transparent support as described in JP-A-2001-100042. In other words, the compound having a discotic structural unit may be hybrid-oriented, bent-oriented, twist-oriented, homogeneously-oriented, homeotropically-oriented or otherwise oriented, particularly hybrid-oriented.

The angle preferably increases with the rise of the distance from the support side of the optically anisotropic layer.

In the case where the optically compensated film is used as a protective film for polarizing film, the optically compensated film is preferably saponified on the side thereof to be laminated with the polarizing film. The saponification is preferably effected according to the aforementioned saponification method.

Also preferred are an embodiment wherein the transparent support is a cellulose ester, an embodiment wherein an oriented layer is formed interposed between the optically compensated film and the transparent support, an embodiment wherein the transparent support has an optically negative uniaxiality and an optic axis extending in the direction of line normal to the surface of the transparent support, an embodiment having an optical biaxiality and an embodiment satisfying the following conditions.

$$20 \leq \{(n_x+n_y)/2-n_z\} \times d \leq 400$$

wherein $n_x$ represents the in-plane refractive index in the direction of retarded axis (maximum in-plane refractive index); $n_y$ represents the in-plane refractive index in the direction perpendicular to retarded axis; $n_z$ represents the refractive index in the direction perpendicular to the plane; and d represents the thickness (nm) of the optically anisotropic layer.

Image Display Device

The anti-reflection film can be applied to an image display device such as liquid crystal display device (LCD), plasma display panel (PDP), electroluminescence display and cathode ray tube display device (CRT). The anti-reflection film is bonded to an image display device in such an arrangement that the transparent support side of the anti-reflection film is opposed to the image display surface of the image display device.

Figure 3:
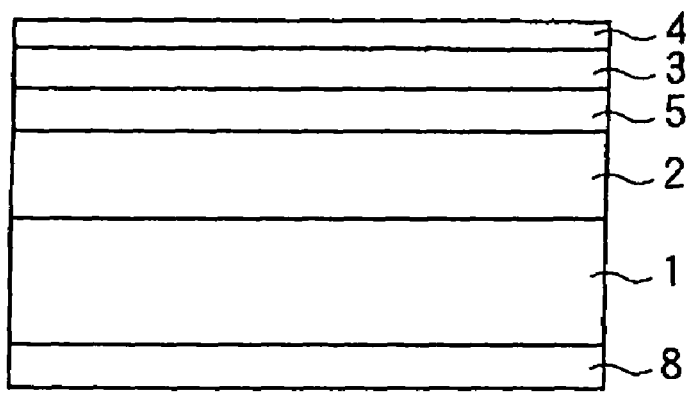
FIGS. 3(a) and (b) each are a schematic sectional view illustrating typically an embodiment of application of an anti-reflection film and a protective film for polarizing plate to a liquid crystal display device.
Figure 3:
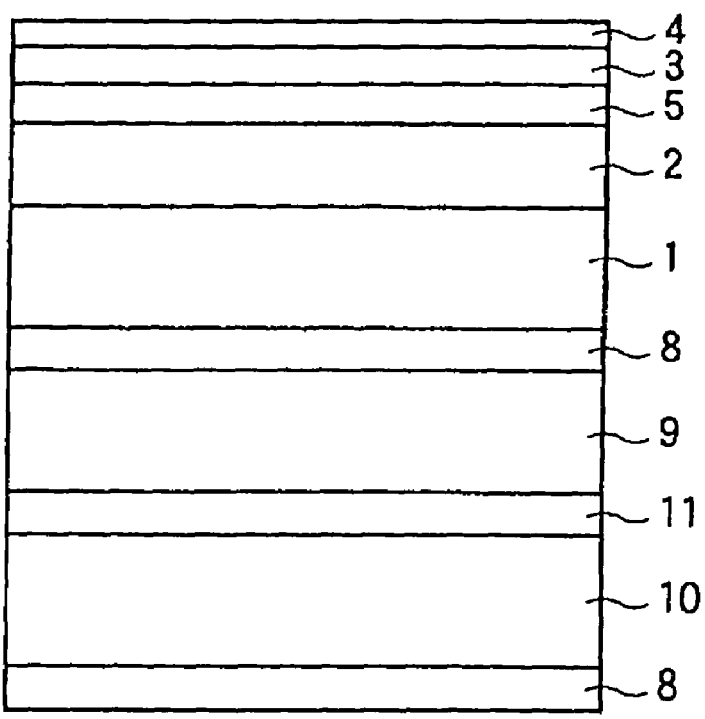
Figure 4:
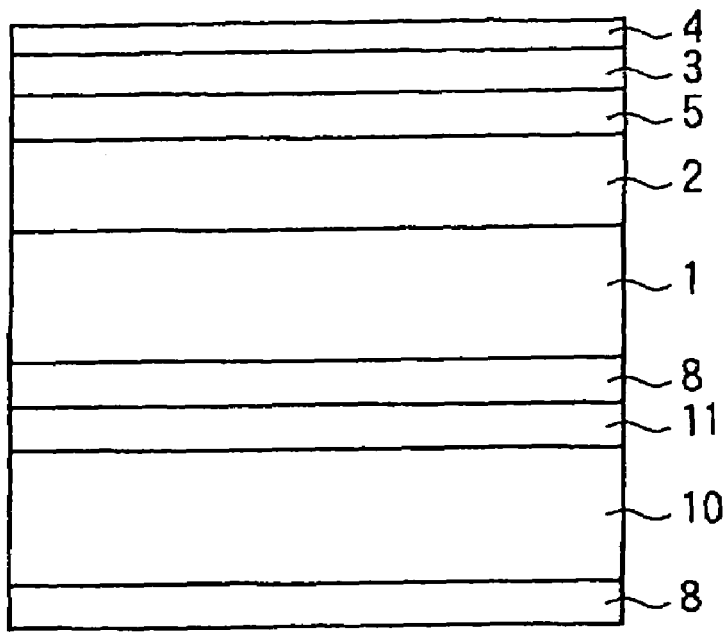
FIGS. 4(a) and 4(b) each are a schematic sectional view illustrating typically an embodiment of application of an anti-reflection film and a protective film for polarizing plate to a liquid crystal display device.
Figure 4:
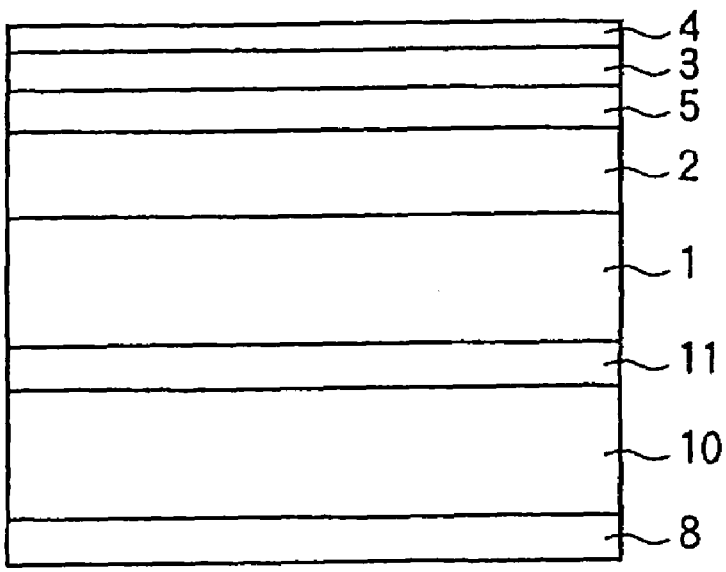

FIGS. 3 and 4 each are a schematic sectional view illustrating typically various embodiments wherein the anti-reflection film of the present invention is applied to an image display device.

FIG. 3(a) illustrates a preferred embodiment wherein an anti-reflection film is applied to an image display device, particularly PDP, ELD or CRT. The anti-reflection film has a transparent support (1) bonded to the image display surface of the image display device with an adhesive layer (8) interposed therebetween.

FIG. 3(b) and FIGS. 4(a) and 4(b) each are a preferred embodiment wherein an anti-reflection film is applied to LCD. In FIG. 3(b), the transparent support (1) of the anti-reflection film is bonded to a protective film (9) of a polarizing film with an adhesive layer (8) interposed therebetween. The other protective film (10) of the polarizing plate is bonded to the liquid crystal display surface of a liquid crystal display device with an adhesive layer (8) interposed therebetween.

In FIG. 4(a), the transparent support (1) of the anti-reflection film (protective film for polarizing plate) is bonded to a polarizing film (11) with an adhesive layer (8) interposed therebetween. A protective film (10) of the polarizing film is bonded to the liquid crystal display surface of a liquid crystal display device with an adhesive layer (8) interposed therebetween. In FIG. 4(b), the anti-reflection film (protective film for polarizing plate) of the present invention has a transparent support (1) bonded directly to a polarizing film (11). A protective film (10) of the polarizing film is bonded to the liquid crystal display surface of a liquid crystal display device with an adhesive layer (8) interposed therebetween. The adhesive layer (8) may comprise additives such as fine particles and dye incorporated therein.

The anti-reflection film and polarizing plate to be used in the present invention can be used in a transmission type, reflection type or semi-transmission type liquid crystal display device in a mode such as twisted nematic (TN) mode, supertwisted nematic (STN), vertical alignment (VA) mode, in-plane switching (IPS) mode and optically compensated bend cell (OCB) mode.

In the case where the anti-reflection film or polarizing plate is used in a transmission or semi-transmission type liquid crystal display device, it can be used in combination with a commercially available brightness enhancement film (polarization separation film having a polarization selection layer such as D-BEF, produced by Sumitomo 3M) to obtain a display device having a higher visibility.

Further, the anti-reflection film or polarizing plate can be combined with a λ/4 plate to form a polarizing plate for reflection type liquid crystal or surface protective plate for organic EL display which eliminates reflected light from the surface and interior thereof.

EXAMPLES

The present invention will be further described in the following examples, but the scope of the present invention should not be interpreted only by these examples.

Example 1-1

Preparation of Coating Solution for Hard Coat Layer

To 315.0 g of a mixture of dipentaerythritol pentaacrylate and dipentaerythritol hexaacrylate (DPHA, produced by NIPPON KAYAKU CO., LTD.) were added 450.0 g of a methyl ethyl ketone dispersion of silica fine particles (MEK-ST, solid content concentration: 30% by weight, produced by NISSAN CHEMICAL INDUSTRIES, LTD.), 15.0 g of methyl ethyl ketone, 220.0 g of cyclohexanone and 16.0 g of a photopolymerization initiator (Irgacure 907, produced by Cibasophy Ciba-Geigy Japan Limited). The mixture was then stirred. The mixture was then filtered through a filter made of polypropylene having a pore diameter of 0.4 μm to prepare a coating solution for hard coat layer. Preparation of dispersion of titanium dioxide fine particles Cobalt-containing titanium dioxide fine particles (MPT-129, produced by ISHIHARA SANGYO KAISHA, LTD.) which had not been subjected to surface treatment (surface treatment with aluminum hydroxide and zirconium hydroxide) was prepared.

To 257.1 g of the aforementioned fine particles were then added 38.6 g of the following dispersant and 704.3 g of cyclohexanone. The mixture was then subjected to dispersion using a dynomill to prepare a dispersion of titanium dioxide having a weight-average diameter of 70 nm.

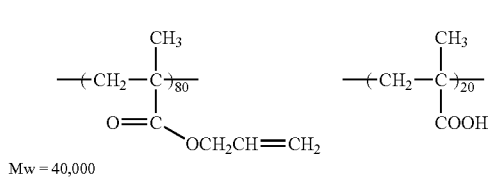

Mw = 40,000

Preparation of Coating Solution for Middle Refraction Layer

To 88.9 g of the above dispersion of titanium dioxide were added 58.4 g of a mixture of dipentaerythritol pentaacrylate and dipentaerythritol hexaacrylate (DPHA, produced by NIPPON KAYAKU CO., LTD.), 3.1 g of a photopolymerization initiator (Irgacure 907, produced by Cibasophy Ciba-Geigy Japan Limited), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 586.8 g of the aforementioned dispersion of titanium dioxide were added 49.9 g of a mixture of dipentaerythritol pentaacrylate and dipentaerythritol hexaacrylate (DPHA, produced by NIPPON KAYAKU CO., LTD.), 4.0 g of a photopolymerization initiator (Irgacure 907, produced by Cibasophy Ciba-Geigy Japan Limited), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was then filtered through a filter made of polypropylene having a pore diameter of 0.4 μm to prepare a coating solution for high refraction layer.

Preparation of Silane Compound

In a reaction vessel equipped with an agitator and a reflux condenser were charged and mixed 161 parts by weight of 3-acryloxypropyltrimethoxysilane (KBM-5103, produced by Shin-Etsu Chemical Co., Ltd.), 123 parts by weight of oxalic acid and 415 parts by weight of ethanol. The mixture was reacted at 70° C. for 4 hours, and then cooled to room temperature to obtain a transparent silane compound as a curable composition. The silane compound thus obtained had a weight-average molecular weight of 1,600, and the components having a molecular weight of from 1,000 to 20,000 account for 100% of the oligomer or higher components. The gas chromatography of the silane compound showed that 3-acryloxypropyltrimethoxysilane as a starting material had not been left therein.

Preparation of Coating Solution for Low Refraction Film

A heat crosslinkable fluorine-containing polymer having a refractive index of 1.42 (Opstar JN7228; solid content concentration: 6% by weight, produced by JSR Corporation) was subjected to solvent substitution to obtain a methyl isobutyl ketone solution of heat crosslinkable fluorine polymer having a solid content concentration of 10% by weight. To 56.0 g of the aforementioned heat crosslinkable fluorine polymer solution were then added 8.0 g of a methyl ethyl ketone dispersion of silica fine particles (MEK-ST, solid content concentration: 30% by weight, produced by NISSAN CHEMICAL INDUSTRIES, LTD.), 1.75 g of the aforementioned silane compound, 73.0 g of methyl isobutyl ketone and 33.0 g of cyclohexanone. The mixture was then stirred. The mixture was then filtered through a filter made of polypropylene having a pore diameter of 0.4 μm to prepare a coating solution for low refraction layer.

Preparation of Anti-Reflection Film

The coating solution for hard coat layer was applied to a triacetyl cellulose film having a thickness of 80 μm (TD-80UF, produced by Fuji Photo Film Co., Ltd.) using a gravure coater. The coated material was dried at 100° C., and then irradiated with ultraviolet ray having an illuminance of 400 mW/cm$^2$ from a 160 W/cm air-cooled metal halide lamp (produced by EYGRAPHICS CO., LTD.) at a dose of 300 mJ/cm$^2$ while the air in the reaction vessel was being purged with nitrogen to an oxygen concentration of not greater than 1.0% by volume to cause the coat layer to be cured, thereby forming a hard coat layer having a thickness of 3.5 μm.

The coating solution for middle refraction layer was applied to the hardcoat layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.65; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.93; thickness: 107 nm).

The coating solution for low refraction layer was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared.

Comparative Example 1-A

Preparation of Anti-Reflection Film

An anti-reflection film was prepared in the same manner as in Example 1-1 except that titanium dioxide fine particle (TTO-55N, produced by ISHIHARA SANGYO KAISHA, LTD.) were used instead of the cobalt-containing titanium dioxide fine particles of Example 1-1. The high refraction layer had a refractive index of 1.93 and a thickness of 107 nm.

Example 1-2

Preparation of Titanium Dioxide Fine Particles

Cobalt-containing titanium dioxide fine particles doped with cobalt therein were prepared according to a known method for the preparation of titanium dioxide fine particles and a known doping method (JP-A-5-330825) except that iron (Fe) was replaced by cobalt.

The doped amount of cobalt was 98.5/1.5 as calculated in terms of Ti/Co (by weight).

The titanium dioxide fine particles thus prepared were recognized to have a rutile type crystal structure and had an average primary particle size of 40 nm and a specific surface area of 44 m$^2$/g.

Preparation of Anti-Reflection Film

An anti-reflection film was prepared in the same manner as in Example 1-1 except that the titanium dioxide fine particles prepared above was used instead of the cobalt-containing titanium dioxide fine particles of Example 1-1. The high refraction layer had a refractive index of 1.93 and a thickness of 107 nm.

Example 1-3

Preparation of Titanium Dioxide Fine Particles

Aluminum-containing titanium dioxide fine particles doped with aluminum therein were prepared according to a known method for the preparation of titanium dioxide fine particles and a known doping method (JP-A-5-330825)

except that iron (Fe) was replaced by aluminum. The doped amount of aluminum was 97.5/2.5 as calculated in terms of Ti/Al (by weight).

The titanium dioxide fine particles thus prepared were recognized to have a rutile type crystal structure and had an average primary particle size of 39 nm and a specific surface area of 43 m$^2$/g.

Preparation of Anti-Reflection Film

An anti-reflection film was prepared in the same manner as in Example 1-1 except that the titanium dioxide fine particles prepared above were used instead of the cobalt-containing titanium dioxide fine particles of Example 1-1. The high refraction layer had a refractive index of 1.92 and a thickness of 107 nm.

Example 1-4

Preparation of Titanium Dioxide Fine Particles

Zirconium-containing titanium dioxide fine particles doped with zirconium therein were prepared according to a known method for the preparation of titanium dioxide fine particles and a known doping method (JP-A-5-330825) except that iron (Fe) was replaced by zirconium. The doped amount of zirconium was 97.5/2.5 as calculated in terms of Ti/Zr (by weight).

The titanium dioxide fine particles thus prepared were recognized to have a rutile type crystal structure and had an average primary particle size of 40 nm and a specific surface area of 39 m$^2$/g.

Preparation of Anti-Reflection Film

An anti-reflection film was prepared in the same manner as in Example 1-1 except that the titanium dioxide fine particles prepared above were used instead of the cobalt-containing titanium dioxide fine particles of Example 1-1. The high refraction layer had a refractive index of 1.92 and a thickness of 107 nm.

Example 1-5

Preparation of Titanium Dioxide Fine Particles

Cobalt/aluminum-containing titanium dioxide fine particles doped with cobalt and aluminum therein were prepared according to a known method for the preparation of titanium dioxide fine particles and a known doping method (JP-A-5-330825) except that iron (Fe) was replaced by cobalt and aluminum. The doped amount of cobalt and aluminum was 97.5/1.25/1.25 as calculated in terms of Ti/Co/Al (by weight).

The titanium dioxide fine particles thus prepared were recognized to have a rutile type crystal structure and had an average primary particle size of 40 nm and a specific surface area of 39 m$^2$/g.

Preparation of Anti-Reflection Film

An anti-reflection film was prepared in the same manner as in Example 1-1 except that the titanium dioxide fine particles prepared above were used instead of the cobalt-containing titanium dioxide fine particles of Example 1-1. The high refraction layer had a refractive index of 1.92 and a thickness of 107 nm.

Comparative Example 1-B

Preparation of Titanium Dioxide Fine Particles

Titanium dioxide fine particles were prepared in the same manner as in Example 1-2 except that there were no doping elements.

The titanium dioxide fine particles thus prepared were recognized to have a rutile type crystal structure and had an average primary particle size of 39 nm and a specific surface area of 42 m$^2$/g.

Preparation of Anti-Reflection Film

An anti-reflection film was prepared in the same manner as in Example 1-1 except that the titanium dioxide fine particles prepared above were used instead of the cobalt-containing titanium dioxide fine particles of Example 1-1. The high refraction layer had a refractive index of 1.93 and a thickness of 107 nm.

Evaluation of Anti-Reflection Film

The anti-reflection films thus prepared (Examples 1-1 to 1-5, Comparative Examples 1-A and 1-B) were then evaluated for the following properties. The results are shown in Table 1.

(1) Evaluation of Haze

The anti-reflection film was evaluated for haze using a haze meter (NHD-1001DP, produced by Nippon Denshoku Industries Co., Ltd.).

(2) Evaluation of Reflectance

The spectral reflectance at an incidence angle of 5° was measured at a wavelength of from 380 nm to 780 nm using a spectrophotometer (V-550, ARV-474, produced by JASCO Corporation). The average reflectance at a wavelength of from 450 nm to 650 nm was then determined.

(3) Evaluation of Weathering Resistance

Using a xenon arc lamp type light-resistance testing machine (XF type), a weathering resistance test was effected with light transmitted by a quartz filter in an atmosphere of a temperature of 63° C. and a relative humidity of 50% at an exposure time of 0 hour, 300 hours, 600 hours and 900 hours.

The anti-reflection film which had been thus exposed was then moisture-conditioned at a temperature of 25° C. and a relative humidity of 60% for 2 hours.

The anti-reflection film was then given a checkerboard cut comprising 11 longitudinal lines and 11 crosswise lines, totaling 100 squares, by a cutter knife on the surface thereof having a high refraction layer, and then subjected to adhesion test with a polyester adhesive tape (No. 31B) produced by NIITO DENKO CORPORATION three times on the same site. The anti-reflection film was then observed for the occurrence of peeling. The results were then evaluated according to the following 4-step criterion.

No checkers observed peeled out of 100 checkers: E 2 or less checkers observed peeled out of 100 checkers: G 3 to 10 checkers observed peeled out of 100 checkers: F More than 10 checkers observed peeled out of 100 checkers: P

TABLE 1

| | Haze (%) | Average reflectance (%) | Weathering resistance | | | |
|---|---|---|---|---|---|---|
| | | | 0 hr | 300 hr | 600 hr | 900 hr |
| Example 1-1 | 0.35 | 0.34 | E | E | E | E |
| Comparative Example 1-A | 0.38 | 0.35 | E | F | P | P |
| Example 1-2 | 0.33 | 0.32 | E | E | E | E |
| Example 1-3 | 0.36 | 0.33 | E | E | G | F |
| Example 1-4 | 0.35 | 0.33 | E | E | G | F |
| Example 1-5 | 0.34 | 0.34 | E | E | E | E |
| Comparative Example 1-B | 0.34 | 0.34 | E | F | P | P |

Example 2-1

Preparation of Coating Solution for Hard Coat Layer

To 315.0 g of a mixture of dipentaerythritol pentaacrylate and dipentaerythritol hexaacrylate (DPHA, produced by NIPPON KAYAKU CO., LTD.) were added 450.0 g of a methyl ethyl ketone dispersion of silica fine particles (MEK-ST, solid content concentration: 30% by weight, produced by NISSAN CHEMICAL INDUSTRIES, LTD.), 15.0 g of methyl ethyl ketone, 220.0 g of cyclohexanone and 16.0 g of a photopolymerization initiator (Irgacure 907, produced by Cibasophy Ciba-Geigy Japan Limited). The mixture was then stirred. The mixture was then filtered through a filter made of polypropylene having a pore diameter of 0.4 μm to prepare a coating solution for hard coat layer. Preparation of dispersion of titanium dioxide fine particles Cobalt-containing titanium dioxide fine particles (MPT-129, produced by ISHIHARA SANGYO KAISHA, LTD.) which had not been subjected to surface treatment (surface treatment with aluminum hydroxide and zirconium hydroxide) were prepared.

To 257.1 g of the aforementioned fine particles were then added 38.6 g of the following dispersant, an additive (N,N-dimethylaminoethylacrylate) and 701.7 g of cyclohexanone. The mixture was then subjected to dispersion using a dynomill to prepare a dispersion of titanium dioxide having a weight-average diameter of 70 nm.

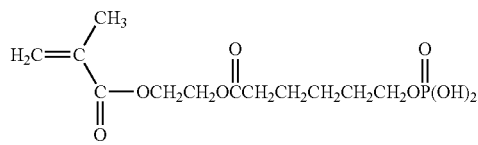

Mw = 324

Preparation of Coating Solution for Middle Refraction Layer

To 88.9 g of the aforementioned dispersion of titanium dioxide were added 58.4 g of a mixture of dipentaerythritol pentaacrylate and dipentaerythritol hexaacrylate (DPHA, produced by NIPPON KAYAKU CO., LTD.), 3.1 g of a photopolymerization initiator (Irgacure 907, produced by Cibasophy Ciba-Geigy Japan Limited), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 586.8 g of the aforementioned dispersion of titanium dioxide were added 49.9 g of a mixture of dipentaerythritol pentaacrylate and dipentaerythritol hexaacrylate (DPHA, produced by NIPPON KAYAKU CO., LTD.), 4.0 g of a photopolymerization initiator (Irgacure 907, produced by Cibasophy Ciba-Geigy Japan Limited), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was then filtered through a filter made of polypropylene having a pore diameter of 0.4 μm to prepare a coating solution for high refraction layer.

Preparation of Silane Compound

In a reaction vessel equipped with an agitator and a reflux condenser were charged and mixed 161 parts by weight of 3-acryloxypropyltrimethoxysilane (KBM-5103, produced by Shin-Etsu Chemical Co., Ltd.), 123 parts by weight of oxalic acid and 415 parts by weight of ethanol. The mixture was reacted at 70° C. for 4 hours, and then cooled to room temperature to obtain a transparent silane compound as a curable composition. The silane compound thus obtained had a weight-average molecular weight of 1,600, and the components having a molecular weight of from 1,000 to 20,000 account for 100% of the oligomer or higher components. The gas chromatography of the silane compound showed that 3-acryloxypropyltrimethoxysilane as a starting material had not been left therein.

Preparation of Coating Solution for Low Refraction Layer

A heat crosslinkable fluorine-containing polymer having a refractive index of 1.42 (Opstar JN7228; solid content concentration: 6% by weight, produced by JSR Corporation) was subjected to solvent substitution to obtain a methyl isobutyl ketone solution of heat crosslinkable fluorine polymer having a solid content concentration of 10% by weight. To 56.0 g of the aforementioned heat crosslinkable fluorine polymer solution were then added 8.0 g of a methyl ethyl ketone dispersion of silica fine particles (MEK-ST, solid content concentration: 30% by weight, produced by NISSAN CHEMICAL INDUSTRIES, LTD.), 1.75 g of the aforementioned silane compound, 73.0 g of methyl isobutyl ketone and 33.0 g of cyclohexanone. The mixture was then stirred. The mixture was then filtered through a filter made of polypropylene having a pore diameter of 0.4 μm to prepare a coating solution for low refraction layer.

Preparation of Anti-Reflection Film

The coating solution for hard coat layer was applied to a triacetyl cellulose film having a thickness of 80 μm (TD-80UF, produced by Fuji Photo Film Co., Ltd.) using a gravure coater. The coated material was dried at 100° C., and then irradiated with ultraviolet ray having an illuminance of 400 mW/cm$^2$ from a 160 W/cm air-cooled metal halide lamp (produced by EYGRAPHICS CO., LTD.) at a dose of 300 mJ/cm$^2$ while the air in the reaction vessel was being purged with nitrogen to an oxygen concentration of not greater than 1.0% by volume to cause the coat layer to be cured, thereby forming a hard coat layer having a thickness of 3.5 μm.

The coating solution for middle refraction layer was applied to the hardcoat layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.65; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 160 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured thereby forming a high refraction layer (refractive index: 1.93; thickness: 107 nm).

The coating solution for low refraction layer was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared.

Comparative Example 2-A

Preparation of Anti-Reflection Film

An anti-reflection film was prepared in the same manner as in Example 2-1 except that titanium dioxide fine particles (TTO-55N, produced by ISHIHARA SANGYO KAISHA, LTD.) were used instead of the cobalt-containing titanium dioxide fine particles of Example 2-1. The high refraction layer had a refractive index of 1.93 and a thickness of 107 nm.

Example 2-2

Preparation of Anti-Reflection Film

An anti-reflection film was prepared in the same manner as in Example 2-1 except that the cobalt-doped titanium dioxide fine particles prepared in Example 1-2 were used instead of the cobalt-containing titanium dioxide fine particles of Example 2-1. The high refraction layer had a refractive index of 1.93 and a thickness of 107 nm.

Example 2-3

Preparation of Anti-Reflection Film

An anti-reflection film was prepared in the same manner as in Example 2-1 except that the aluminum-doped titanium dioxide fine particles prepared in Example 1-3 were used instead of the cobalt-containing titanium dioxide fine particles of Example 2-1. The high refraction layer had a refractive index of 1.92 and a thickness of 107 nm.

Example 2-4

Preparation of Anti-Reflection Film

An anti-reflection film was prepared in the same manner as in Example 2-1 except that the zirconium-doped titanium dioxide fine particles prepared in Example 1-4 was used instead of the cobalt-containing titanium dioxide fine particles of Example 2-1. The high refraction layer had a refractive index of 1.92 and a thickness of 107 nm.

Example 2-5

Preparation of Anti-Reflection Film

An anti-reflection film was prepared in the same manner as in Example 2-1 except that the cobalt/aluminum-doped titanium dioxide fine particles prepared in Example 1-5 were used instead of the cobalt-containing titanium dioxide fine particles of Example 2-1. The high refraction layer had a refractive index of 1.92 and a thickness of 107 nm.

Comparative Example 2-B

Preparation of Anti-Reflection Film

An anti-reflection film was prepared in the same manner as in Example 2-1 except that the titanium dioxide fine particles prepared in Comparative Example 1-B was used instead of the cobalt-containing titanium dioxide fine particles of Example 2-1. The high refraction layer had a refractive index of 1.93 and a thickness of 107 nm.

Evaluation of Anti-Reflection Film

The anti-reflection films thus prepared (Examples 2-1 to 2-5, Comparative Examples 2-A and 2-B) were then evaluated in the same manner as in Example 1. The results are shown in Table 2.

TABLE 2

| | Haze (%) | Average reflectance (%) | Weathering resistance | | | |
|---|---|---|---|---|---|---|
| | | | 0 hr | 300 hr | 600 hr | 900 hr |
| Example 2-1 | 0.32 | 0.33 | E | E | E | E |
| Comparative Example 2-A | 0.35 | 0.36 | E | F | P | P |
| Example 2-2 | 0.31 | 0.33 | E | E | E | E |
| Example 2-3 | 0.35 | 0.35 | E | E | G | F |
| Example 2-4 | 0.34 | 0.34 | E | E | G | F |
| Example 2-5 | 0.32 | 0.34 | E | E | E | E |
| Comparative Example 2-B | 0.33 | 0.36 | E | F | P | P |

Example 3

Evaluation of Image Display Device

The anti-reflection films of the present invention prepared in Examples 1-1 to 1-5 and 2-1 to 2-5 were each attached to the display surface of an image display device to prepare image display devices. The image display devices comprising the anti-reflection films of the present invention exhibited an excellent anti-reflection performance and hence an extremely excellent visibility.

Example 4

Preparation of Protective Film for Polarizing Plate

A saponifying solution was prepared by keeping a 1.5 N aqueous solution of sodium hydroxide at 50° C. Further, a 0.01 N aqueous solution of diluted sulfuric acid was prepared.

The anti-reflection films prepared in Examples 1-1 to 1-5 and Examples 2-1 to 2-5 were each subjected to saponification with the aforementioned saponifying solution on the surface of the transparent support on the side thereof opposite the side having the high refraction layer of the present invention.

The transparent support which had been saponified was thoroughly washed with water to remove the aqueous solution of sodium hydroxide therefrom, washed with the aforementioned diluted aqueous solution of sulfuric acid, thoroughly washed with water to remove the diluted aqueous solution of sulfuric acid, and then thoroughly dried at 100° C.

The anti-reflection film was then evaluated for contact angle with respect to water on the saponified surface of the transparent support on the side thereof opposite the side having the high refraction layer. The contact angle was not greater than 40 degrees. Thus, a protective film for polarizing plate was prepared.

Preparation of Polarizing Plate

A polyvinyl alcohol film having a thickness of 75 μm (produced by KURARAY CO., LTD.) was dipped in an aqueous solution comprising 100 parts by weight of water, 7 parts by weight of iodine and 105 parts by weight of potassium iodide so that iodine was adsorbed thereto. Subsequently, this film was longitudinally monoaxially stretched by a factor of 4.4 in a 4 wt % aqueous solution of boric acid, and then dried while being tensed to prepare a polarizing plate.

The anti-reflection film (protective film for polarizing plate) of the present invention was then adhered to one side of the polarizing plate with a polyvinyl alcohol-based adhesive as an adhesive in such an arrangement that the saponified triacetyl cellulose side thereof was opposed to the polarizing plate. Further, a triacetyl cellulose film which had been saponified in the same manner as mentioned above was adhered to the other side of the polarizing plate with the same polyvinyl alcohol-based adhesive.

Evaluation of Image Display Device

TN, STN, IPS, VA and OCB mode transmission type, reflection type or semi-transmission type liquid crystal display devices provided with the polarizing plate of the present invention thus prepared exhibited an excellent anti-reflection performance and hence an extremely excellent visibility.

Example 5

Preparation of Polarizing Plate

An optically anisotropic optically-compensated film having a disc of discotic structural unit disposed oblique to the surface of the transparent support which changes in its angle between the disc of discotic structural unit and the surface of the transparent support with the distance from the transparent support (Wide View Film SA-12B, produced by Fuji Photo Film Co., Ltd.) was subjected to saponification on the side thereof opposite the side having an optically anisotropic layer under the same conditions as in Example 4.

The anti-reflection film (protective film for polarizing plate) prepared in Example 4 was then adhered to one side of the polarizing film prepared in Example 4 with a polyvinyl alcohol-based adhesive as an adhesive in such an arrangement that the saponified triacetyl cellulose side thereof was opposed to the polarizing film. Further, the saponified optically compensated film was adhered to the other side of the polarizing film with the same polyvinyl alcohol-based adhesive in such an arrangement that the triacetyl cellulose side thereof was opposed to the polarizing film.

Evaluation of Image Display Device

TN, STN, IPS, VA and OCB mode transmission type, reflection type or semi-transmission type liquid crystal display devices provided with the polarizing plate of the present invention thus prepared exhibited an excellent contrast, a very wide vertical and horizontal angle of view, an excellent anti-reflection performance and an extremely excellent visibility and display quality as compared with liquid crystal display devices provided with a polarizing plate free of optically compensated film.

Example 6-1

Preparation of Coating Solution for Hard Coat Layer

To 315.0 g of a mixture of dipentaerythritol pentaacrylate and dipentaerythritol hexaacrylate (DPHA, produced by NIPPON KAYAKU CO., LTD.) were added 450.0 g of a methyl ethyl ketone dispersion of silica fine particles (MEK-ST, solid content concentration: 30% by weight, produced by NISSAN CHEMICAL INDUSTRIES, LTD.), 15.0 g of methyl ethyl ketone, 220.0 g of cyclohexanone and 16.0 g of a photopolymerization initiator (Irgacure 907, produced by Cibasophy Ciba-Geigy Japan Limited). The mixture was then stirred. The mixture was then filtered through a filter made of polypropylene having a pore diameter of 0.4 μm to prepare a coating solution for hard coat layer. Preparation of dispersion of titanium dioxide fine particles To 250 g of titanium dioxide fine particles (TTO-55B, produced by ISHIHARA SANGYO KAISHA, LTD.) were added 37.5 g of the following dispersant, 2.5 g of a cationic monomer (DMAEA, produced by KOHJIN Co., Ltd.) and 710 g of cyclohexanone. The mixture was then subjected to dispersion using a dynomill to prepare a dispersion of titanium dioxide having a weight-average diameter of 65 nm.

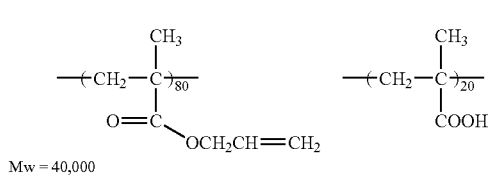

Mw = 40,000

Preparation of Coating Solution for Middle Refraction Layer

To 155.2 g of the aforementioned dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the aforementioned dispersion of titanium dioxide were added 48.8 g of a mixture of dipentaerythritol pentaacrylate and dipentaerythritol hexaacrylate (DPHA, produced by NIPPON KAYAKU CO., LTD.), 33.5 g of an acrylic group-containing silane coupling agent (KBM-5103, produced by Shin-Etsu Chemical Co., Ltd.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Coating Solution for Low Refraction Layer

To 93.0 g of a heat crosslinkable fluorine-containing polymer having a refractive index of 1.42 (Opstar JN7228; solid content concentration: 6% by weight, produced by JSR Corporation) were added 8.0 g of a methyl ethyl ketone dispersion of silica fine particles (MEK-ST, solid content concentration: 30% by weight, produced by NISSAN CHEMICAL INDUSTRIES, LTD.), 8.0 g of an acryloyl group-containing silane coupling agent (KBM-5103, produced by Shin-Etsu Chemical Co., Ltd.), 100.0 g of methyl ethyl ketone, and 5.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for hard coat layer was applied to a triacetyl cellulose film having a thickness of 80 μm (TD-80UF, produced by Fuji Photo Film Co., Ltd.) using a gravure coater. The coated material was dried at 100° C., and then irradiated with ultraviolet ray having an illuminance of 400 mW/cm$^2$ from a 160 W/cm air-cooled metal halide lamp (produced by EYGRAPHICS CO., LTD.) at a dose of 300 mJ/cm$^2$ while the air in the reaction vessel was being purged with nitrogen to an oxygen concentration of not greater than 1.0% by volume to cause the coat layer to be cured, thereby forming a hard coat layer having a thickness of 3.5 μm.

The coating solution for middle refraction layer was applied to the hard coat layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection films thus prepared were then evaluated for the following properties. The results are shown in Table 3.

(1) Evaluation of Resistance to Scratch with Steel Wool

The surface of the anti-reflection film on the side thereof having a high refraction layer was observed for scratch developed when a #0000 steel wool was allowed to make two reciprocal movements over the surface of the anti-reflection film at a load of 1.96 N/cm$^2$. The results were then evaluated to the following four-step criterion.

E: No scratch observed
G: Some substantially invisible scratches observed
F: Definitely visible scratches observed
P: Definitely visible scratches observed remarkably (2) Evaluation of Pencil Hardness The anti-reflection film was moist-conditioned at a temperature of 25° C. and a relative humidity of 60% for 2 hours. The anti-reflection film was then evaluated for pencil hardness on the surface thereof having a high refraction layer with a testing pencil defined in JIS S6006 according to the pencil hardness evaluation method defined in JIS K5400. The load was 4.9 N.

(3) Evaluation of Dynamic Friction Coefficient

The anti-reflection film was evaluated for dynamic friction coefficient on the side thereof having a high refraction layer as an index of surface slipperiness. For the measurement of dynamic friction coefficient, the sample was moist-conditioned at a temperature of 25° C. and a relative humidity of 60% for 2 hours. Using a dynamic friction measuring instrument (HEIDON-14) with a stainless steel sphere having a diameter of 5 mm, measurement was effected at a load of 0.98 N and a rate of 60 cm/min.

(4) Evaluation of Chemical Resistance

Methyl ethyl ketone was dropped onto the surface of the anti-reflection film on the side thereof having a high refraction layer. Methyl ethyl ketone was then wiped away with a cleaning cloth. The anti-reflection film was then observed for film exfoliation. The results were then evaluated according to the following 2-step criterion.

G: No film exfoliation
P: Film exfoliation (5) Evaluation of Finger Print Wipability The anti-reflection film was finger-printed on the side thereof having a high refraction layer. The finger-printed surface of the anti-reflection film was then wiped with a cleaning cloth. The anti-reflection film was then observed. The results were then evaluated according to the following 3-step criterion.

G: Finger print fully wiped away
F: Finger print partially left unwiped
P: Finger print substantially fully left unwiped (6) Evaluation of Magic Ink Wipability The anti-reflection film was stained with an oil-based magic ink (ZEBRA Macky, red) on the side thereof having a high refraction layer, and then allowed to stand for 1 minute. The oil-based magic ink was then wiped off with a cleaning cloth. The anti-reflection film was then observed. The results were then evaluated according to the following 3-step criterion.

G: Magic ink fully wiped away
F: Magic ink partially left unwiped
P: Magic ink substantially fully left unwiped (7) Evaluation of Contact Angle The anti-reflection film was moist-conditioned at a temperature of 25° C. and a relative humidity of 60% for 2 hours. The anti-reflection film was then evaluated for contact angle with water on the side thereof having a high refraction layer.

(8) Evaluation of Checkerboard Adhesion

The anti-reflection film was moist-conditioned at a temperature of 25° C. and a relative humidity of 60% for 2 hours. The anti-reflection film was then given a checkerboard cut comprising 11 longitudinal lines and 11 crosswise lines, totaling 100 squares, by a cutter knife on the surface thereof having a high refraction layer, and then subjected to adhesion test with a polyester adhesive tape (No. 31B) produced by NIITO DENKO CORPORATION three times on the same site. The anti-reflection film was then observed for the occurrence of peeling. The results were then evaluated according to the following 4-step criterion.

E: No checkers observed peeled out of 100 checkers
G: 2 or less checkers observed peeled out of 100 checkers
F: 3 to 10 checkers observed peeled out of 100 checkers
P: More than 10 checkers observed peeled out of 100 checkers (9) Evaluation of Light-Resistance Using a xenon arc lamp type light-resistance testing machine (XF type), a light-resistance test was effected with light transmitted by a quartz filter in an atmosphere of a temperature of 63° C. and a relative humidity of 50% at an exposure time of 100 hours, 200 hours and 300 hours.

The anti-reflection film which had been thus exposed was then moisture-conditioned at a temperature of 25° C. and a relative humidity of 60% for 2 hours.

The anti-reflection film was then given a checkerboard cut comprising 11 longitudinal lines and 11 crosswise lines, totaling 100 squares, by a cutter knife on the surface thereof having a high refraction layer, and then subjected to adhesion test with a polyester adhesive tape (No. 31B) produced by NIITO DENKO CORPORATION three times on the same site. The anti-reflection film was then observed for the occurrence of peeling. The results were then evaluated according to the following 4-step criterion.

E: No checkers observed peeled out of 100 checkers
G: 2 or less checkers observed peeled out of 100 checkers
F: 3 to 10 checkers observed peeled out of 100 checkers
P: More than 10 checkers observed peeled out of 100 checkers

TABLE 3

| | Resistance to scratch with steel wool | Pencil hardness | Dynamic friction coefficient | Chemical ressitance | Finger print wipabiity | Magic ink wipability | Contact angle (°) | Checkerboard adhesiveness | Ra (μm) | Antiglare performance | Light-resistance 100 hr | 200 hr | 300 hr |
|---|---|---|---|---|---|---|---|---|---|---|---|---|---|
| Example 6-1 | E | 3H | 0.10 | G | G | G | 104 | E | — | — | E | G | F |
| Example 6-2 | E | 3H | 0.10 | G | G | G | 103 | E | — | — | E | G | F |
| Example 6-3 | F | 3H | 0.09 | G | G | G | 103 | E | — | — | E | G | F |
| Example 6-4 | G | 3H | 0.23 | G | G | G | 101 | E | — | — | E | G | F |
| Example 6-5 | E | 3H | 0.11 | G | G | G | 102 | E | 0.06 | G | E | G | F |
| Example 6-6 | E | 3H | 0.11 | G | G | G | 102 | E | 0.06 | G | E | G | F |
| Example 6-7 | E | 3H | 0.10 | G | G | G | 102 | E | — | — | E | G | F |
| Example 6-8 | G | 3H | 0.09 | G | G | G | 103 | E | — | — | E | G | F |
| Example 6-9 | E | 3H | 0.11 | G | G | G | 102 | E | — | — | E | G | F |
| Example 6-10 | E | 3H | 0.10 | G | G | G | 102 | E | — | — | E | G | F |
| Example 6-11 | E | 3H | 0.12 | G | G | G | 101 | E | 0.07 | G | E | G | F |
| Example 6-12 | E | 3H | 0.12 | G | G | G | 103 | E | 0.06 | G | E | G | F |
| Example 6-13 | E | 3H | 0.10 | G | G | G | 104 | E | — | — | E | G | F |
| Example 6-14 | G | 3H | 0.09 | G | G | G | 103 | E | — | — | E | G | F |
| Example 6-15 | E | 3H | 0.10 | G | G | G | 102 | E | — | — | E | G | F |
| Example 6-16 | E | 3H | 0.09 | G | G | G | 103 | E | — | — | E | G | F |
| Example 6-17 | E | 3H | 0.11 | G | G | G | 104 | E | — | — | E | G | F |
| Example 6-18 | E | 3H | 0.10 | G | G | G | 103 | E | — | — | E | G | F |
| Example 6-19 | E | 3H | 0.10 | G | G | G | 102 | E | — | — | E | G | F |
| Example 6-20 | E | 3H | 0.11 | G | G | G | 104 | E | — | — | E | G | F |
| Example 6-21 | E | 3H | 0.11 | G | G | G | 103 | E | 0.13 | E | E | G | F |
| Example 6-22 | G | 3H | 0.11 | G | G | G | 103 | E | 0.13 | E | E | G | F |
| Example 6-23 | E | 3H | 0.10 | G | G | G | 103 | E | 0.12 | E | E | G | F |
| Example 6-24 | G | 3H | 0.11 | G | G | G | 104 | E | 0.12 | E | E | G | F |
| Example 6-25 | E | 3H | 0.10 | G | G | G | 102 | E | — | — | E | G | F |
| Example 6-26 | E | 3H | 0.11 | G | G | G | 103 | E | — | — | E | G | F |
| Example 6-27 | E | 3H | 0.09 | G | G | G | 102 | E | — | — | E | E | G |
| Example 6-28 | E | 3H | 0.10 | G | G | G | 101 | E | — | — | E | E | G |
| Example 6-29 | E | 3H | 0.09 | G | G | G | 103 | E | — | — | E | E | E |
| Example 6-30 | E | 3H | 0.11 | G | G | G | 106 | E | — | — | E | E | E |
| Example 6-31 | E | 3H | 0.09 | G | G | G | 104 | E | — | — | E | G | F |
| Example 6-32 | E | 3H | 0.10 | G | G | G | 105 | E | — | — | E | G | F |
| Example 6-33 | E | 3H | 0.09 | G | G | G | 104 | E | — | — | E | E | G |
| Example 6-34 | E | 3H | 0.09 | G | G | G | 104 | E | — | — | E | E | E |
| Example 6-35 | E | 3H | 0.09 | G | G | G | 105 | E | — | — | E | E | E |
| Comparative Example 3-A | F | 2H | 0.11 | P | G | P | 102 | E | — | — | E | G | F |
| Comparative Example 3-B | F | 2H | 0.10 | P | G | P | 103 | E | — | — | E | G | F |
| Comparative Example 3-C | P | 3H | 0.10 | G | G | G | 103 | E | — | — | E | G | F |
| Comparative Example 3-D | P | 3H | 0.09 | G | G | G | 103 | E | — | — | E | G | F |
| Comparative Example 3-E | P | 3H | 0.12 | G | G | G | 102 | E | 0.06 | G | E | G | F |

TABLE 3-continued

| | Resistance to scratch with steel wool | Pencil hardness | Dynamic friction coefficient | Chemical ressitance | Finger print wipabiity | Magic ink wipability | Contact angle (°) | Checkerboard adhesiveness | Ra (μm) | Anti-glare performance | Light-resistance 100 hr | 200 hr | 300 hr |
|---|---|---|---|---|---|---|---|---|---|---|---|---|---|
| Comparative Example 3-F | P | 2H | 0.27 | G | P | P | 43 | E | — | — | E | G | F |
| Comparative Example 3-G | P | B | 0.29 | G | G | G | 106 | E | — | — | E | G | F |
| Comparative Example 3-H | P | 3H | 0.10 | G | G | G | 103 | E | — | — | P | P | P |
| Comparative Example 3-I | P | 3H | 0.11 | G | G | G | 102 | E | — | — | P | P | P |
| Comparative Example 3-J | P | 3H | 0.09 | G | G | G | 104 | E | — | — | P | P | P |

Example 6-2

Preparation of Coating Solution for Low Refraction Layer

To 93.0 g of a heat crosslinkable fluorine-containing polymer having a refractive index of 1.42 (Opstar JN7228; solid content concentration: 6% by weight, produced by JSR Corporation) were added 8.0 g of a methyl ethyl ketone dispersion of silica fine particles (MEK-ST, solid content concentration: 30% by weight, produced by NISSAN CHEMICAL INDUSTRIES, LTD.), 100.0 g of methyl ethyl ketone and 5.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for low refraction layer was applied to the high refraction layer prepared in Example 6-1 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-3

Preparation of Coating Solution for Low Refraction Layer

To 130.0 g of a heat crosslinkable fluorine-containing polymer having a refractive index of 1.42 (Opstar JN7228; solid content concentration: 6% by weight, produced by JSR Corporation) were added 100.0 g of a methyl ethyl ketone and 5.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for low refraction layer was applied to the high refraction layer prepared in Example 6-1 using a gravure coater. The coated material was dried at 80° C., and then heated to 120° C. for 10 minutes to form a low refraction layer (refractive index: 1.42; thickness: 88 nm). Thus, an anti-reflection film was prepared.

Evaluation of Anti-Reflection Film

The anti-reflection film thus prepared was evaluated in the same manner as in Example 6-1. The results are shown in Table 3.

Example 6-4

Preparation of Coating Solution for Stain-Proofing Layer

To 1.0 g of a water-repellent surface active agent (KP801M, produced by Shin-Etsu Chemical Co., Ltd.) was added 100.0 g of a fluorine-based solvent (Florinate FC-77, produced by Sumitomo 3M). The mixture was then stirred. The mixture was then filtered through a filter made of polypropylene having a pore diameter of 1 μm to prepare a coating solution for stain-proofing layer.

Preparation of Anti-Reflection Film

A low refraction layer made of $SiO_2$ (refractive index: 1.47; thickness: 84 nm) was formed on the high refraction layer prepared in Example 6-1 by a sputtering method. The coating solution for stain-proofing layer was applied to the low refraction layer using a bar coater in such an amount that the coated amount of the water-repellent surface treatment agent reached 15 mg/m$^2$. The coated material was then heated to 120° C. for 6 minutes to form a stain-proofing layer. Thus, an anti-reflection film was prepared.

Evaluation of Anti-Reflection Film

The anti-reflection film thus prepared was evaluated in the same manner as in Example 6-1. The results are shown in Table 3.

Example 6-5

Preparation of Anti-Reflection Film

The anti-reflection film prepared in Example 6-1 was subjected to embossing according to the method described in examples in JP-A-2000-329905. Thus, an anti-reflection film having an anti-glare performance was prepared.

Evaluation of Anti-Reflection Film

The anti-reflection film thus prepared was evaluated in the same manner as in Example 6-1. Further, the anti-reflection film was evaluated for average surface roughness (Ra) and anti-glare performance according to the following methods. The results are shown in Table 3.

(1) Evaluation of Average Surface Roughness (Ra)

The average surface roughness was evaluated using an atomic force microscope (SPI-3800N AFM; produced by Seiko Instruments Inc.). The anti-reflection film thus prepared was measured for roughness on the side having a high refraction layer at an area of 100 μm×100 μm randomly sampled from the area of 100 cm². The average surface roughness values (Ra) measured at a total of 100 sites (1 mm² area) were then averaged.

(2) Evaluation of Anti-Glare Performance

An image of an exposed fluorescent lamp free of louver (8,000 cd/cm²) was reflected on the anti-reflection film. The degree of blurriness of the reflected image was then evaluated according to the following criterion.

E: The contour of the fluorescent lamp can be little or not recognized

G: The contour of the fluorescent lamp can be slightly recognized

F: The fluorescent lamp is shown blurred, but its contour can be recognized

P: The fluorescent lamp is shown little blurred

Example 6-6

Preparation of Anti-Reflection Film

The anti-reflection film prepared in Example 6-2 was subjected to embossing according to the method described in examples in JP-A-2000-329905. Thus, an anti-reflection film having an anti-glare performance was prepared.

Evaluation of Anti-Reflection Film

The anti-reflection film thus prepared was evaluated in the same manner as in Example 6-5. The results are shown in Table 3.

Example 6-7

Preparation of Coating Solution for High Refraction Layer

To 985.7 g of the dispersion of titanium dioxide prepared in Example 6-1 were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of anti-reflection film

The coating solution for high refraction layer was then applied to the middle refraction layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-8

Preparation of Anti-Reflection Film

The coating solution for low refraction layer prepared in Example 6-2 was then applied to the high refraction layer prepared in Example 6-7 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-9

Preparation of Dispersion of Titanium Dioxide Fine Particles

To 250 g of titanium dioxide fine particles (TTO-55B, produced by ISHIHARA SANGYO KAISHA, LTD.) were added 37.5 g of the dispersant used in Example 6-1 and 712.5 g of cyclohexanone. The mixture was subjected to dispersion using a dynomill to prepare a dispersion of titanium dioxide fine particles having a weight-average diameter of 65 nm.

Preparation of Coating Solution for Middle Refraction Layer

To 155.2 g of the aforementioned dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 33.5 g of an acrylic group-containing silane coupling agent (KBM-5103, produced by Shin-Etsu Chemical Co., Ltd.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-10

Preparation of Anti-Reflection Film

The coating solution for low refraction layer prepared in Example 6-2 was applied to the high refraction layer prepared in Example 6-9 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-11

Preparation of Anti-Reflection Film

The anti-reflection film prepared in Example 6-9 was subjected to embossing according to the method described in examples in JP-A-2000-329905. Thus, an anti-reflection film having an anti-glare performance was prepared.

Evaluation of Anti-Reflection Film

The anti-reflection film thus prepared was evaluated in the same manner as in Example 6-5. The results are shown in Table 3.

Example 6-12

Preparation of Anti-Reflection Film

The anti-reflection film prepared in Example 6-10 was subjected to embossing according to the method described in examples in JP-A-2000-329905. Thus, an anti-reflection film having an anti-glare performance was prepared.

Evaluation of Anti-Reflection Film

The anti-reflection film thus prepared was evaluated in the same manner as in Example 6-5. The results are shown in Table 3.

Example 6-13

Preparation of Coating Solution for High Refraction Layer

To 985.7 g of the dispersion of titanium dioxide prepared in Example 6-9 were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for high refraction layer was then applied to the middle refraction layer prepared in Example 6-9 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-14

Preparation of Anti-Reflection Film

The coating solution for low refraction layer prepared in Example 6-2 was applied to the high refraction layer prepared in Example 6-13 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-15

Preparation of Coating Solution for High Refraction Layer

To 985.7 g of the dispersion of titanium dioxide prepared in Example 6-9 were added 48.8 g of a mixture of dipentaerythritol pentaacrylate and dipentaerythritol hexaacrylate (DPHA, produced by NIPPON KAYAKU CO., LTD.), 5.6 g of an epoxy group-containing silane coupling agent (KBM-5103, produced by Shin-Etsu Chemical Co., Ltd.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Coating Solution for Low Refraction Layer

To 93.0 g of a heat crosslinkable fluorine-containing polymer having a refractive index of 1.42 (Opstar JN7228; solid content concentration: 6% by weight, produced by JSR Corporation) were added 8.0 g of a methyl ethyl ketone dispersion of silica fine particles (MEK-ST, solid content concentration: 30% by weight, produced by NISSAN CHEMICAL INDUSTRIES, LTD.), 0.8 g of an alkyl group-containing silane coupling agent (KBM-3103C, produced by Shin-Etsu Chemical Co., Ltd.), 100.0 g of methyl ethyl ketone, and 5.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for high refraction layer was then applied to the middle refraction layer prepared in Example 6-9 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-16

Preparation of Anti-Reflection Film

The coating solution for low refraction layer prepared in Example 6-2 was applied to the high refraction layer prepared in Example 6-15 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-17

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant and 712.5 g of cyclohexanone. The mixture was subjected to dispersion using a dynomill to prepare a dispersion of titanium dioxide fine particles having a weight-average diameter of 65 nm.

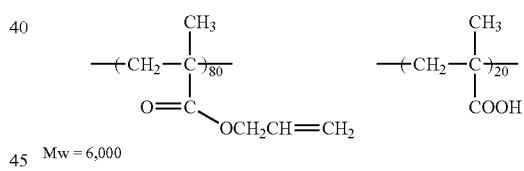

Mw = 6,000

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer)

To 985.7 g of the aforementioned dispersion of titanium dioxide were added 48.8 g of a mixture of dipentaerythritol pentaacrylate and dipentaerythritol hexaacrylate (DPHA, produced by NIPPON KAYAKU CO., LTD.), 33.5 g of an acrylic group-containing silane coupling agent (KBM-5103, produced by Shin-Etsu Chemical Co., Ltd.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-18

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant and 712.5 g of cyclohexanone. The mixture was subjected to dispersion using a dynomill to prepare a dispersion of titanium dioxide fine particles having a weight-average diameter of 65 nm.

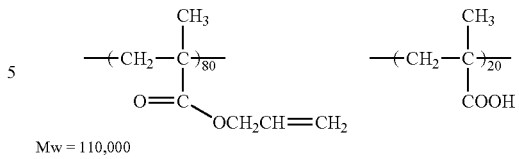

Mw = 110,000

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-19

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant and 712.5 g of cyclohexanone. The mixture was subjected to dispersion using a dynomill to prepare a dispersion of titanium dioxide fine particles having a weight-average diameter of 65 nm.

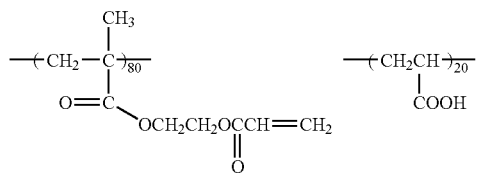

Mw = 20,000

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-20

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant and 712.5 g of cyclohexanone. The mixture was subjected to dispersion using a dynomill to prepare a dispersion of titanium dioxide fine particles having a weight-average diameter of 65 nm.

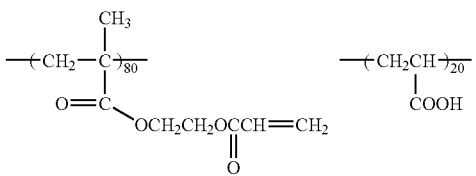

Mw = 6,000

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritolpentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-1 was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-21

Preparation of Coating Solution for Hard Coat Layer

To 625.0 g of a hard coat layer material (DeSolite Z7526; solid content concentration: 72% by weight, produced by JSR Corporation) were added 155.0 g of methyl ethyl ketone and 220.0 g of cyclohexanone. The mixture was then stirred. The mixture was then filtered through a filter made of polypropylene having a pore diameter of 0.4 μm to prepare a coating solution for hard coat layer.

Preparation of Dispersion of Zirconium Oxide

To 200.0 g of a zirconium oxide powder having a weight-average primary particle diameter of 30 nm were added 60.0 g of a dispersant (ka-14) and 740 g of cyclohexanone. The mixture was then subjected to dispersion using a dynomill to prepare a dispersion of zirconium oxide having a weight-average particle diameter of 40 nm.

Preparation of Coating Solution for Anti-Glare Layer 20.0 g of crosslinked polystyrene particles having an average particle diameter of 2 μm (SX-200H, produced by Soken Chemical & Engineering Co., Ltd.) was added to a 54/46 (by weight) mixture of methyl ethyl ketone and cyclohexanone. The mixture was then stirred at 5,000 rpm using a high speed disper to prepare a dispersion of crosslinked polystyrene fine particles.

To 355.8 g of the above dispersion of zirconium oxide were added 104.0 g of a mixture of dipentaerythritol pentaacrylate and dipentaerythritol hexaacrylate (DPHA, produced by NIPPON KAYAKU CO., LTD.) and 12.0 g of a photopolymerization initiator (Irgacure 907, produced by Cibasophy Ciba-Geigy Japan Limited). The mixture was then stirred. The coat layer obtained by the application and ultraviolet curing of this solution had a refractive index of 1.61.

To this solution was then added 29.0 g of the dispersion of crosslinked polystyrene particles prepared above. The mixture was then stirred. The mixture was then filtered through a filter made of polypropylene having a pore diameter of 30 μm to prepare a coating solution for anti-glare layer.

Preparation of Anti-Reflection Film

The coating solution for hard coat layer was applied to a triacetyl cellulose film having a thickness of 80 μm (TD-80UF, produced by Fuji Photo Film Co., Ltd.) using a gravure coater. The coated material was dried at 100° C., and then irradiated with ultraviolet ray having an illuminance of 400 mW/cm$^2$ from a 160 W/cm air-cooled metal halide lamp (produced by EYGRAPHICS CO., LTD.) at a dose of 300 mJ/cm$^2$ to cause the coat layer to be cured, thereby forming a hard coat layer having a thickness of 3.5 μm.

The coating solution for anti-glare layer was applied to the hard coat layer using a gravure coater. The coated material was dried at 90° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 2% by volume to cause the coat layer to be cured, thereby forming an anti-glare layer having a haze of 17%.

The coating solution for low refraction layer prepared in Example 6-1 was then applied to the anti-glare layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer having a thickness of 96 nm. Thus, an anti-reflection film was prepared. In the anti-glare layer, the dispersant was crosslinked and/or polymerized with the binder by the aforementioned irradiation with light.

Evaluation of Anti-Reflection Film

The anti-reflection film thus prepared was evaluated in the same manner as in Example 6-5. The results are shown in Table 3.

Example 6-22

Preparation of Anti-Reflection Film

The coating solution for low refraction film prepared in Example 6-2 was applied to the anti-glare layer prepared in Example 6-21 using a gravure coater. The coated material was dried at 80° C., and then further heated to 120° C. for 10 minutes to form a low refraction layer having a thickness of 96 nm. Thus, an anti-reflection film was prepared.

Evaluation of Anti-Reflection Film

The anti-reflection film thus prepared was then evaluated in the same manner as in Example 6-5. The results are shown in Table 3.

Example 6-23

Preparation of Dispersion of ATO

To 200.0 g of ATO fine particles (SN-100P, produced by ISHIHARA SANGYO KAISHA, LTD.) were added 40.0 g of the following dispersant, 2.7 g of a cationic monomer (DMAEA, produced by KOHJIN Co., Ltd.) and 760 g of cyclohexanone. The mixture was then subjected to dispersion using a dynomill to prepare a dispersion of ATO having a weight-average diameter of 40 nm.

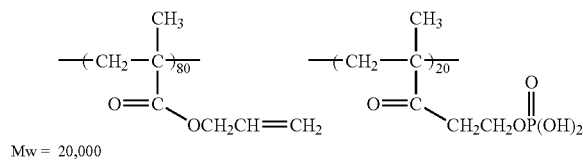

Mw = 20,000

Preparation of Coating Solution for Anti-Glare Layer 200.0 g of crosslinked polystyrene particles having an average particle diameter of 3.5 μm (SX-350H, produced by Soken Chemical & Engineering Co., Ltd.) was added to 800.0 g of methyl isobutyl ketone. The mixture was then stirred at 10,000 rpm for 1 hour using a polytron dispersing machine to prepare a dispersion A of crosslinked polystyrene particles.

200.0 g of crosslinked polystyrene particles having an average particle diameter of 5.0 μm (SX-500H, produced by Soken Chemical & Engineering Co., Ltd.) was added to 800.0 g of methyl isobutyl ketone. The mixture was then stirred at 10,000 rpm for 1 hour using a polytron dispersing machine to prepare a dispersion B of crosslinked polystyrene particles.

To 335.0 g of the above dispersion of ATO were added 96.0 g of a mixture of dipentaerythritol pentaacrylate and dipentaerythritol hexaacrylate (DPHA, produced by NIPPON KAYAKU CO., LTD.), 11.0 g of a photopolymerization initiator (Irgacure 184, produced by Cibasophy Ciba-Geigy Japan Limited) and 19.6 g of an acrylic group-containing silane coupling agent (KBM-5103, produced by Shin-Etsu Chemical Co., Ltd.). The coat layer obtained by the application and ultraviolet curing of this solution had a refractive index of 1.57.

To this solution were then added 55.0 g of the dispersion A of crosslinked polystyrene particles prepared above and 72.3 g of the dispersion B of crosslinked polystyrene particles prepared above. The mixture was then stirred. The mixture was then filtered through a filter made of polypropylene having a pore diameter of 30 μm to prepare a coating solution for anti-glare layer.

Preparation of Anti-Reflection Film

The coating solution for anti-glare layer was applied to a triacetyl cellulose film having a thickness of 80 μm (TD-80UF, produced by Fuji Photo Film Co., Ltd.) using a gravure coater. The coated material was dried at 90° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming an anti-glare layer having a haze of 44.5%.

The coating solution for low refraction layer prepared in Example 6-1 was then applied to the anti-glare layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer having a thickness of 96 nm. Thus, an anti-reflection film was prepared. In the anti-glare layer, the dispersant was crosslinked and/or polymerized with the binder by the aforementioned irradiation with light.

Evaluation of Anti-Reflection Film

The anti-reflection film thus prepared was evaluated in the same manner as in Example 6-5. The results are shown in Table 3.

Example 6-24

Preparation of Anti-Reflection Film

The coating solution for low refraction film prepared in Example 6-2 was applied to the anti-glare layer prepared in Example 6-23 using a gravure coater. The coated material was dried at 80° C., and then further heated to 120° C. for 10 minutes to form a low refraction layer having a thickness of 96 nm. Thus, an anti-reflection film was prepared.

Evaluation of Anti-Reflection Film

The anti-reflection film thus prepared was then evaluated in the same manner as in Example 6-5. The results are shown in Table 3.

Example 6-25

Preparation of Dispersion of Titanium Dioxide Fine Particles

To 257.1 g of titanium dioxide fine particles (MT-500HD, produced by TAYCA CORPORATION) were then added 38.6 g of the dispersant used in Example 6-1 and 704.3 g of cyclohexanone. The mixture was then subjected to dispersion using a dynomill to prepare a dispersion of titanium dioxide having a weight-average diameter of 75 nm.

Preparation of Coating Solution for Middle Refraction Layer

To 151.1 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 959.2 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Silane Compound

In a reaction vessel equipped with an agitator and a reflux condenser were charged and mixed 161 parts by weight of 3-acryloxypropyltrimethoxysilane (KBM-5103, produced by Shin-Etsu Chemical Co., Ltd.), 123 parts by weight of oxalic acid and 415 parts by weight of ethanol. The mixture was reacted at 70° C. for 4 hours, and then cooled to room temperature to obtain a transparent silane compound as a curable composition. The silane compound thus obtained had a weight-average molecular weight of 1,600, and the components having a molecular weight of from 1,000 to 20,000 account for 100% of the oligomer or higher components. The gas chromatography of the silane compound showed that 3-acryloxypropyltrimethoxysilane as a starting material had not been left therein.

Preparation of Coating Solution for Low Refraction Film

A heat crosslinkable fluorine-containing polymer having a refractive index of 1.42 (Opstar JN7228; solid content concentration: 6% by weight, produced by JSR Corporation) was subjected to solvent substitution to obtain a methyl isobutyl ketone solution of heat crosslinkable fluorine polymer having a solid content concentration of 10% by weight. To 56.0 g of the aforementioned heat crosslinkable fluorine polymer solution were then added 8.0 g of a methyl ethyl ketone dispersion of silica fine particles (MEK-ST, solid content concentration: 30% by weight, produced by NISSAN CHEMICAL INDUSTRIES, LTD.), 1.75 g of the above silane compound, 73.0 g of methyl isobutyl ketone and 33.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for middle refraction layer was applied to the hard coat layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm)). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection films thus prepared were then evaluated in the same manner as in Example 6-1. The results are shown in Table 3.

Example 6-26

Preparation of Coating Solution for Low Refraction Film

A heat crosslinkable fluorine-containing polymer having a refractive index of 1.42 (Opstar JN7228; solid content concentration: 6% by weight, produced by JSR Corporation) was subjected to solvent substitution to obtain a methyl isobutyl ketone solution of heat crosslinkable fluorine polymer having a solid content concentration of 10% by weight. To 56.0 g of the above heat crosslinkable fluorine polymer solution were then added 8.0 g of a methyl ethyl ketone dispersion of silica fine particles (MEK-ST, solid content concentration: 30% by weight, produced by NISSAN CHEMICAL INDUSTRIES, LTD.), 73.0 g of methyl isobutyl ketone and 33.0 g of cyclohexanone. The mixture was then stirred. The mixture was then filtered through a filter made of polypropylene having a pore diameter of 1 μm to prepare a coating solution for low refraction layer.

Preparation of Anti-Reflection Film

The coating solution for low refraction film thus prepared was applied to the high refraction layer prepared in Example 6-25 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was then evaluated in the same manner as in Example 6-1. The results are shown in Table 3.

Example 6-27

Preparation of Titanium Dioxide Fine Particles

Cobalt-containing titanium dioxide fine particles doped with cobalt therein were prepared according to a known method for the preparation of titanium dioxide fine particles and a known doping method (JP-A-5-330825) except that iron (Fe) was replaced by cobalt.

The doped amount of cobalt was 100/2 as calculated in terms of Ti/Co (by weight).

The titanium dioxide fine particles thus prepared were recognized to have a rutile type crystal structure and had an average primary particle size of 41 nm and a specific surface area of 45 m²/g.

Preparation of Dispersion of Titanium Dioxide Fine Particles

To 257.1 g of the above particles were then added 38.6 g of the dispersant used in Example 6-1 and 704.3 g of cyclohexanone. The mixture was then subjected to dispersion using a dynomill to prepare a dispersion of titanium dioxide having a weight-average diameter of 70 nm.

Preparation of Coating Solution for Middle Refraction Layer

To 151.1 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 959.2 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was applied to the hard coat layer prepared in Example 6-1 using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.91; thickness: 107 nm).

The coating solution for low refraction layer prepared in Example 6-25 was then applied to the high refraction layer using a gravure coater. The coated material was dried at 80° C., irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-28

Preparation of Anti-Reflection Film

The coating solution for low refraction layer prepared in Example 6-26 was applied to the high refraction layer prepared in Example 6-27 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-29

Preparation of Titanium Dioxide Fine Particles

Cobalt-containing titanium dioxide fine particles doped with cobalt therein were prepared according to a known method for the preparation of titanium dioxide fine particles and a known doping method (JP-A-5-330825) except that iron (Fe) was replaced by cobalt.

The doped amount of cobalt was 100/2 as calculated in terms of Ti/Co (by weight).

The titanium dioxide fine particles thus prepared were recognized to have a rutile type crystal structure and had an average primary particle size of 41 nm and a specific surface area of 45 m²/g.

The particles thus prepared were then subjected to surface treatment with a surface treatment agent (aluminum hydroxide/zirconium hydroxide=6/1.5 (by weight)) in such a manner that the ratio of titanium dioxide/surface treatment reached 100/3.5 (by weight).

Preparation of Dispersion of Titanium Dioxide Fine Particles

The particles thus prepared were then subjected to dispersion in the same manner as in Example 6-27 to prepare a dispersion of titanium dioxide having a weight-average diameter of 70 nm.

Preparation of Coating Solution for Middle Refraction Layer

To 151.1 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 µm to prepare a coating solution for middle refraction layer.

Preparation of Coating Solution for High Refraction Layer

To 959.2 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 µm to prepare a coating solution for high refraction layer.

Preparation of Anti-Reflection Film

The coating solution for middle refraction layer was applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.64; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

The coating solution for low refraction layer prepared in Example 6-25 was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-30

Preparation of Anti-Reflection Film

The coating solution for low refraction layer prepared in Example 6-26 was applied to the high refraction layer prepared in Example 6-29 using a gravure coater. The coated material was dried at 80° C., and then heated to 120° C. for 10 minutes to form a low refraction layer (refractive index: 1.43; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Example 6-31

Preparation of Dispersion of Titanium Dioxide Fine Particles

To 257.1 g of titanium dioxide fine particles (TTO-55B, produced by ISHIHARA SANGYO KAISHA, LTD.) were added 38.6 g of the dispersant used in Example 6-1 and 704.3 g of cyclohexanone. The mixture was subjected to dispersion using a dynomill to prepare a dispersion of titanium dioxide fine particles having a weight-average diameter of 70 nm.

(Preparation of Coating Solution for Middle Refraction Layer)

To 85.3 g of the above dispersion of titanium dioxide were added 58.4 g of a mixture of dipentaerythritol pentaacrylate and dipentaerythritol hexaacrylate (DPHA, produced by NIPPON KAYAKU CO., LTD.), 3.1 g of a photopolymerization initiator (Irgacure 907, produced by Cibasophy Ciba-Geigy Japan Limited), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was then filtered through a filter made of polypropylene having a pore diameter of 0.4 µm to prepare a coating solution for middle refraction layer.

Preparation of Coating Solution for High Refraction Layer

To 563.2 g of the above dispersion of titanium dioxide were added 47.9 g of a mixture of dipentaerythritol pentaacrylate and dipentaerythritol hexaacrylate (DPHA, produced by NIPPON KAYAKU CO., LTD.), 4.0 g of a photopolymerization initiator (Irgacure 907, produced by Cibasophy Ciba-Geigy Japan Limited), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was then filtered through a filter made of polypropylene having a pore diameter of 0.4 µm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.89; thickness: 108 nm).

The coating solution for low refraction layer prepared in Example 6-25 was then applied to the high refraction layer using a gravure coater. The coated material was dried at 80° C., irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume, and then heated to 120° C. for 10 minutes to form a low refraction layer (refractive index: 1.43; thickness: 86 nm). Thus, an anti-reflection film was prepared. In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-32

Preparation of Dispersion of Titanium Dioxide Fine Particles

A dispersion of titanium dioxide was prepared in the same manner as in Example 6-31 except that the titanium dioxide fine particles of Example 6-31 were replaced by MT-500HD (produced by TAYCA CORPORATION).

Preparation of Coating Solution for Middle Refraction Layer

A coating solution for middle refraction layer was prepared in the same manner as in Example 6-31 except that the above dispersion of titanium dioxide was used.

Preparation of Coating Solution for High Refraction Layer

A coating solution for high refraction layer was prepared in the same manner as in Example 6-31 except that the above dispersion of titanium dioxide was used.

Preparation of Anti-Reflection Film

An anti-reflection film was prepared in the same manner as in Example 6-31.

In the middle refraction layer and high refraction layer, the dispersant was crosslinked and/or polymerized with the binder by the above irradiation with light.

Evaluation of Anti-Reflection Film

The anti-reflection film thus prepared was evaluated in the same manner as in Example 6-1. The results are shown in Table 3.

Example 6-33

Preparation of Dispersion of Titanium Dioxide Fine Particles

A dispersion of titanium dioxide was prepared in the same manner as in Example 6-31 except that the titanium dioxide fine particles of Example 6-31 were replaced by the titanium dioxide fine particles prepared in Example 6-27.

Preparation of Coating Solution for Middle Refraction Layer

A coating solution for middle refraction layer was prepared in the same manner as in Example 6-31 except that the above dispersion of titanium dioxide was used.

Preparation of Coating Solution for High Refraction Layer

A coating solution for high refraction layer was prepared in the same manner as in Example 6-31 except that the above dispersion of titanium dioxide was used.

Preparation of Anti-Reflection Film

An anti-reflection film was prepared in the same manner as in Example 6-31.

In the middle refraction layer and high refraction layer, the dispersant was crosslinked and/or polymerized with the binder by the above irradiation with light.

Evaluation of Anti-Reflection Film

The anti-reflection film thus prepared was evaluated in the same manner as in Example 6-1. The results are shown in Table 3.

Example 6-34

Preparation of Dispersion of Titanium Dioxide Fine Particles

A dispersion of titanium dioxide was prepared in the same manner as in Example 6-31 except that the titanium dioxide fine particles of Example 6-31 were replaced by the titanium dioxide fine articles prepared in Example 6-29.

Preparation of Coating Solution for Middle Refraction Layer

A coating solution for middle refraction layer was prepared in the same manner as in Example 6-31 except that the above dispersion of titanium dioxide was used.

Preparation of Coating Solution for High Refraction Layer

A coating solution for high refraction layer was prepared in the same manner as in Example 6-31 except that the above dispersion of titanium dioxide was used.

Preparation of Anti-Reflection Film

An anti-reflection film was prepared in the same manner as in Example 6-31.

In the middle refraction layer and high refraction layer, the dispersant was crosslinked and/or polymerized with the binder by the aforementioned irradiation with light.

Evaluation of Anti-Reflection Film

The anti-reflection film thus prepared was evaluated in the same manner as in Example 6-1. The results are shown in Table 3.

Example 6-35

Preparation of Dispersion of Titanium Dioxide Fine Particles

A dispersion of titanium dioxide was prepared in the same manner as in Example 6-31 except that the titanium dioxide fine particles of Example 6-31 were replaced by titanium dioxide fine particles containing cobalt (MPT-129, produced by ISHIHARA SANGYOKAISHA, LTD.). MPT-129 is particles comprising titanium dioxide particles the surface of which have been subjected to surface treatment (surface treatment with aluminum hydroxide and zirconium hydroxide).

Preparation of Coating Solution for Middle Refraction Layer

A coating solution for middle refraction layer was prepared in the same manner as in Example 6-31 except that the above dispersion of titanium dioxide was used.

Preparation of Coating Solution for High Refraction Layer

A coating solution for high refraction layer was prepared in the same manner as in Example 6-31 except that the above dispersion of titanium dioxide was used.

Preparation of Anti-Reflection Film

An anti-reflection film was prepared in the same manner as in Example 6-31.

In the middle refraction layer and high refraction layer, the dispersant was crosslinked and/or polymerized with the binder by the above irradiation with light.

Evaluation of Anti-Reflection Film

The anti-reflection film thus prepared was evaluated in the same manner as in Example 6-1. The results are shown in Table 3.

Comparative Example 3-A

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant and 712.5 g of cyclohexanone. The mixture was subjected to dispersion using a dynomill to prepare a dispersion of titanium dioxide fine particles having a weight-average diameter of 65 nm.

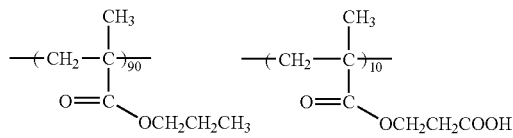

Mw = 30,000

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 33.5 g of an acryloyl group-containing silane coupling agent (KBM-5103, produced by Shin-Etsu Chemical Co., Ltd.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

A low refraction film (refractive index: 1.43; thickness: 86 nm) was then formed on the high refraction film in the same manner as in Example 6-1. Thus, an anti-reflection film was prepared.

Evaluation of Anti-Reflection Film

The anti-reflection film thus prepared was evaluated in the same manner as in Example 6-1. The results are shown in Table 3.

Comparative Example 3-B

Preparation of Anti-Reflection Film

A low refraction film (refractive index: 1.43; thickness: 86 nm) was formed on the high refraction film prepared in Comparative Example 3-A in the same manner as in Example 6-2. Thus, an anti-reflection film was prepared.

Evaluation of Anti-Reflection Film

The anti-reflection film thus prepared was evaluated in the same manner as in Example 6-1. The results are shown in Table 3.

Comparative Example 3-C

Preparation of Dispersion of Titanium Dioxide Fine Particles

To 250 g of titanium dioxide fine particles (TTO-55B, produced by ISHIHARA SANGYO KAISHA, LTD.) were added 37.5 g of the following dispersant, 2.5 g of a cationic monomer (DMAEA, produced by KOHJIN Co., Ltd.) and 712.5 g of cyclohexanone. The mixture was subjected to dispersion using a dynomill to prepare a dispersion of titanium dioxide fine particles having a weight-average diameter of 65 nm.

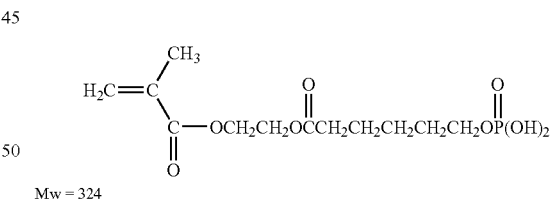

Mw = 324

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.63; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.90; thickness: 107 nm).

A low refraction film (refractive index: 1.43; thickness: 86 nm) was then formed on the high refraction film in the same manner as in Example 6-1. Thus, an anti-reflection film was prepared.

Evaluation of Anti-Reflection Film

The anti-reflection film thus prepared was evaluated in the same manner as in Example 6-1. The results are shown in Table 3.

Comparative Example 3-D

Preparation of Anti-Reflection Film

A low refraction film (refractive index: 1.43; thickness: 86 nm) was formed on the high refraction film prepared in Comparative Example 3-C in the same manner as in Example 6-2. Thus, an anti-reflection film was prepared.

Evaluation of Anti-Reflection Film

The anti-reflection film thus prepared was evaluated in the same manner as in Example 6-1. The results are shown in Table 3.

Comparative Example 3-E

Preparation of Anti-Reflection Film

The anti-reflection film prepared in Example 3-D was subjected to embossing according to the method described in examples in JP-A-2000-329905. Thus, an anti-reflection film having an anti-glare performance was prepared.

Evaluation of Anti-Reflection Film

The anti-reflection film thus prepared was evaluated in the same manner as in Example 6-5. The results are shown in Table 3.

Comparative Example 3-F

Preparation of Coating Solution for Low Refraction Layer

To 180.0 g of monomethyltrimethoxysilane were added 280.0 g of ethanol, 440.0 g of 1-butanol, 110.0 g of water and 3.0 g of phosphoric acid. The mixture was then stirred. The mixture was then filtered through a filter made of polypropylene having a pore diameter of 0.4 μm to prepare a coating solution for low refraction layer.

Preparation of Anti-Reflection Film

The coating solution for low refraction layer was applied to the high refraction layer prepared in Comparative Example 3-C using a gravure coater. The coated material was dried at 80° C., and then heated to 120° C. for 24 hours to form a low refraction layer (refractive index: 1.46; thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Comparative Example 3-G

Preparation of Coating Solution for Low Refraction Layer

A commercially available coating composition for low refraction layer (Cytop CTL-102AP, produced by ASAHI GLASS COMPANY) was applied to the high refraction layer prepared in Comparative Example 3-C using a gravure coater. The coated material was dried at 80° C., and then heated to 120° C. for 10 minutes to form a low refraction layer (thickness: 86 nm). Thus, an anti-reflection film was prepared.

Evaluation of Anti-Reflection Film

The anti-reflection film thus prepared was evaluated in the same manner as in Example 6-1. The results are shown in Table 3.

Comparative Example 3-H

Preparation of Dispersion of Titanium Dioxide Fine Particles

To 250 g of titanium dioxide fine particles (TTO-55N, produced by ISHIHARA SANGYO KAISHA, LTD.) were added 37.5 g of the dispersant used in Comparative Example 3-C, 2.5 g of a cationic monomer (DMAEA, produced by KOHJIN Co., Ltd.) and 710 g of cyclohexanone. The mixture was then subjected to dispersion using a dynomill to prepare a dispersion of titanium dioxide having a weight-average diameter of 65 nm.

Preparation of Coating Solution for Middle Refraction Layer

To 155.2 g of the above dispersion of titanium dioxide were added 89.5 g of a mixture of dipentaerythritol pentaacrylate and dipentaerythritol hexaacrylate (DPHA, produced by NIPPON KAYAKU CO., LTD.), 4.68 g of a photopolymerization initiator (Irgacure 907, produced by Cibasophy Ciba-Geigy Japan Limited), 1.56 g of a photosensitizer (Kayacure DETX, produced by NIPPON KAYAKU CO., LTD.), 770.4 g of methyl ethyl ketone and 2,983.0 g of cyclohexanone. The mixture was then stirred. The mixture was then filtered through a filter made of polypropylene having a pore diameter of 0.4 μm to prepare a coating solution for middle refraction layer.

Preparation of Coating Solution for High Refraction Layer

To 985.7 g of the above dispersion of titanium dioxide were added 48.8 g of a mixture of dipentaerythritol pentaacrylate and dipentaerythritol hexaacrylate (DPHA, produced by NIPPON KAYAKU CO., LTD.), 4.03 g of a photopolymerization initiator (Irgacure 907, produced by Cibasophy Ciba-Geigy Japan Limited), 1.35 g of a photosensitizer (Kayacure DETX, produced by NIPPON KAYAKU CO., LTD.), 622.5 g of methyl ethyl ketone and 1,865.0 g of cyclohexanone. The mixture was then stirred. The mixture was then filtered through a filter made of polypropylene having a pore diameter of 0.4 μm to prepare a coating solution for high refraction layer.

Preparation of Anti-Reflection Film

The coating solution for middle refraction layer was then applied to the hard coat layer prepared in Example 6-1 using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a middle refraction layer (refractive index: 1.64; thickness: 67 nm).

The coating solution for high refraction layer was then applied to the middle refraction layer using a gravure coater. The coated material was dried at 100° C., and then irradiated with ultraviolet ray having an illuminance of 550 mW/cm$^2$ from a 240 W/cm air-cooled metal halide lamp (produced by EYGRAPHICS CO., LTD.) at a dose of 600 mJ/cm$^2$ while the air in the reaction vessel was being purged with nitrogen to an oxygen concentration of not greater than 1.0% by volume to cause the coat layer to be cured, thereby forming a high refraction layer (refractive index: 1.91; thickness: 107 nm).

A low refraction film (refractive index: 1.43; thickness: 86 nm) was then formed on the high refraction film in the same manner as in Example 6-25. Thus, an anti-reflection film was prepared.

Evaluation of Anti-Reflection Film

The anti-reflection film thus prepared was evaluated in the same manner as in Example 6-1. The results are shown in Table 3.

Comparative Example 3-I

Preparation of Anti-Reflection Film

A low refraction film (refractive index: 1.43; thickness: 86 nm) was formed on the high refraction film prepared in Comparative Example 3-H in the same manner as in Example 6-26. Thus, an anti-reflection film was prepared.

Evaluation of Anti-Reflection Film

The anti-reflection film thus prepared was evaluated in the same manner as in Example 6-1. The results are shown in Table 3.

Comparative Example 3-J

Preparation of Dispersion of Titanium Dioxide Fine Particles

To 257.1 g of titanium dioxide fine particles (TTO-55N, produced by ISHIHARA SANGYO KAISHA, LTD.) were added 38.6 g of the dispersant used in Comparative Example 1-C, 2.6 g of a cationic monomer (DMAEA, produced by KOHJIN Co., Ltd.) and 701.7 g of cyclohexanone. The mixture was then subjected to dispersion using a dynomill to prepare a dispersion of titanium dioxide having a weight-average diameter of 70 nm.

Preparation of Coating Solution for Middle Refraction Layer

A coating solution for middle refraction layer was prepared in the same manner as in Example 6-31 except that the above dispersion of titanium dioxide was used.

Preparation of Coating Solution for High Refraction Layer

A coating solution for high refraction layer was prepared in the same manner as in Example 6-31 except that the above dispersion of titanium dioxide was used.

Preparation of Anti-Reflection Film

An anti-reflection film was prepared in the same manner as in Example 6-31.

Evaluation of Anti-Reflection Film

The anti-reflection film thus prepared was then evaluated in the same manner as in Example 6-1. The results are shown in Table 3.

Example 6-36

Preparation of Anti-Reflection Film

An anti-reflection film was prepared in the same manner as in Example 6-1 except that the following hard coat layer having a thickness of 8 μm was provided in place of the hard coat layer of Example 6-1.

Preparation of Composition for Hard Coat Layer 1,296 g of trimethylolpropane triacrylate and 809 g of a 53.2 mass % methyl ethyl ketone solution of polygcidyl methacrylate (mass average molecular weight: $1.5 \times 10^4$) were dissolved in a mixed solution of 943 g of methyl ethyl ketone and 880 g of cyclohexane. 184.48 g of Irgacure and 24 g of di(t-butylphenyl iodonium hexafluorophosphate) were added to the solution while stirring, and the resulting mixture was stirred for 10 minutes. The mixture was filtered through a filter made of polypropylene having a pore size of 0.5 μm to prepare a composition for hard coat layer.

Preparation of Hard Coat Layer

The coating composition obtained above was applied to the high reflection layer using a bar coater. After drying at 80° C. for 2 minutes, the coating film was irradiated with ultraviolet ray of 500 mJ/cm$^2$ while purging with nitrogen gas so as to maintain an atmosphere such that oxygen concentration was 1.0 vol % or less. Thus, a hard coat layer having a thickness of 8 μm was formed.

Performance of the anti-reflection film thus obtained was evaluated in the same manner as in Example 6-1. As a result, the same good results as in Example 6-1 were obtained.

Example 7-1

Preparation of Saponified Transparent Support

A 1.5 N aqueous solution of sodium hydroxide was prepared, and then kept at 50° C. A 0.01 N diluted aqueous solution of sulfuric acid.

A triacetyl cellulose film having a thickness of 80 μm (TAC-TD80UF, produced by Fuji Photo Film Co., Ltd.) was dipped in the aforementioned aqueous solution of sodium hydroxide for 2 minutes, and then dipped in water so that the aqueous solution of sodium hydroxide was thoroughly washed away. Subsequently, the triacetyl cellulose film was dipped in the aforementioned diluted aqueous solution of sulfuric acid for 1 minute, dipped in water so that the diluted aqueous solution of sulfuric acid was thoroughly washed away, and then thoroughly dried at 100° C.

The triacetyl cellulose film thus saponified was then evaluated for contact angle with respect to water on the surface thereof. As a result, the contact angle was not greater than 40 degrees on the both surfaces thereof.

Thus, a saponified transparent support was prepared.

Preparation of Protective Film for Polarizing Plate

Using a corona discharge treatment machine produced by Vetaphone Inc. of Denmark, the saponified transparent support was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-1 to prepare a protective film for polarizing plate.

Evaluation of Protective Film for Polarizing Plate

The protective film for polarizing plate thus prepared was evaluated in the same manner as in Example 6-1. The results are shown in Table 4.

Example 7-2

Preparation of Protective Film for Polarizing Plate

Using a corona discharge treatment machine produced by Vetaphone Inc. of Denmark, the saponified transparent support prepared in Example 7-1 was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-2 to prepare a protective film for polarizing plate.

Evaluation of Protective Film for Polarizing Plate

The protective film for polarizing plate thus prepared was evaluated in the same manner as in Example 6-1. The results are shown in Table 4.

Example 7-3

Preparation of Protective Film for Polarizing Plate

Using a corona discharge treatment machine produced by Vetaphone Inc. of Denmark, the saponified transparent support prepared in Example 7-1 was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-13 to prepare a protective film for polarizing plate.

Evaluation of Protective Film for Polarizing Plate

The protective film for polarizing plate thus prepared was evaluated in the same manner as in Example 6-1. The results are shown in Table 4.

Example 7-4

Preparation of Protective Film for Polarizing Plate

Using a corona discharge treatment machine produced by Vetaphone Inc. of Denmark, the saponified transparent support prepared in Example 7-1 was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-14 to prepare a protective film for polarizing plate.

Evaluation of Protective Film for Polarizing Plate

The protective film for polarizing plate thus prepared was evaluated in the same manner as in Example 6-1. The results are shown in Table 4.

Example 7-5

Preparation of Protective Film for Polarizing Plate

Using a corona discharge treatment machine produced by Vetaphone Inc. of Denmark, the saponified transparent support prepared in Example 7-1 was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-21 to prepare a protective film for polarizing plate.

Evaluation of Protective Film for Polarizing Plate

The protective film for polarizing plate thus prepared was evaluated in the same manner as in Example 6-5. The results are shown in Table 4.

Example 7-6

Preparation of Protective Film for Polarizing Plate

Using a corona discharge treatment machine produced by Vetaphone Inc. of Denmark, the saponified transparent support prepared in Example 7-1 was subjected to corona discharge treatment on one side thereof.

Subsequently, on the corona-discharged side of the saponified transparent support were applied a hard coat layer, a middle refraction layer, a high refraction layer and a low refraction layer in the same manner as in Example 6-22 to prepare a protective film for polarizing plate.

Evaluation of Protective Film for Polarizing Plate

The protective film for polarizing plate thus prepared was evaluated in the same manner as in Example 6-5. The results are shown in Table 4.

Example 7-7

Preparation of Saponified Transparent Support

A 1.5 N aqueous solution of sodium hydroxide was prepared, and then kept at 50° C. A 0.01 N diluted aqueous solution of sulfuric acid.

The anti-reflection film prepared in Example 6-1 was dipped in the above aqueous solution of sodium hydroxide for 2 minutes, and then dipped in water so that the aqueous solution of sodium hydroxide was thoroughly washed away. Subsequently, the anti-reflection film was dipped in the aforementioned diluted aqueous solution of sulfuric acid for 1 minute, dipped in water so that the diluted aqueous solution of sulfuric acid was thoroughly washed away, and then thoroughly dried at 100° C.

The anti-reflection film thus saponified was then evaluated for contact angle with respect to water on the surface of the transparent support on the side thereof opposite the side having a high refraction film. As a result, the contact angle was not greater than 40 degrees. Thus, a saponified transparent support was prepared.

Evaluation of Protective Film for Polarizing Plate

The protective film for polarizing plate thus prepared was then evaluated for film exfoliation due to saponification.

The protective film for polarizing plate was further evaluated in the same manner as in Example 6-1. The results are shown in Table 4.

(1) Evaluation of Film Exfoliation Due to Saponification 100 sheets of the anti-reflection film were subjected to saponification. These sheets of anti-reflection film were each then visually observed for the occurrence of film exfoliation. The results were then evaluated according to the following 3-step criterion.

G: None of 100 sheets observed exfoliated

F: 5 or less out of 100 sheets observed exfoliated

P: More than 5 out of 100 sheets observed exfoliated

Example 7-8

Preparation of Protective Film for Polarizing Plate

The anti-reflection film prepared in Example 6-2 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-9

Preparation of Protective Film for Polarizing Plate

The anti-reflection film prepared in Example 6-5 was subjected to saponification in the same manner as in Example 7-7. Thus, a protective film for polarizing plate was prepared.

Evaluation of Protective Film for Polarizing Plate

The protective film for polarizing plate thus prepared was then evaluated for film exfoliation due to saponification in the same manner as in Example 7-7. The protective film for polarizing plate thus prepared was then evaluated in the same manner as in Example 6-5. The results are shown in Table 4.

Example 7-10

Preparation of Protective Film for Polarizing Plate

The anti-reflection film prepared in Example 6-6 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-11

Preparation of Protective Film for Polarizing Plate

The anti-reflection film prepared in Example 6-7 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-12

Preparation of Protective Film for Polarizing Plate

The anti-reflection film prepared in Example 6-8 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-13

Preparation of Protective Film for Polarizing Plate

The anti-reflection film prepared in Example 6-9 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-14

Preparation of Protective Film for Polarizing Plate

The anti-reflection film prepared in Example 6-10 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-15

Preparation of Protective Film for Polarizing Plate

The anti-reflection film prepared in Example 6-11 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-16

Preparation of Protective Film for Polarizing Plate

The anti-reflection film prepared in Example 6-12 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-17

Preparation of Protective Film for Polarizing Plate

The anti-reflection film prepared in Example 6-13 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-18

Preparation of Protective Film for Polarizing Plate

The anti-reflection film prepared in Example 6-14 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-19

Preparation of Protective Film for Polarizing Plate

The anti-reflection film prepared in Example 6-15 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-20

Preparation of Protective Film for Polarizing Plate

The anti-reflection film prepared in Example 6-16 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-21

Preparation of Protective Film for Polarizing Plate

The anti-reflection film prepared in Example 6-17 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-22

Preparation of Protective Film for Polarizing Plate

The anti-reflection film prepared in Example 6-18 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-23

Preparation of Protective Film for Polarizing Plate

The anti-reflection film prepared in Example 6-19 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-24

Preparation of Protective Film for Polarizing Plate

The anti-reflection film prepared in Example 6-20 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-25

Preparation of Protective Film for Polarizing Plate

The anti-reflection film prepared in Example 6-21 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-26

Preparation of Protective Film for Polarizing Plate

The anti-reflection film prepared in Example 6-22 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-27

Preparation of Protective Film for Polarizing Plate

The anti-reflection film prepared in Example 6-23 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-28

Preparation of Protective Film for Polarizing Plate

The anti-reflection film prepared in Example 6-24 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Example 7-29

Preparation of Protective Film for Polarizing Plate

The anti-reflection film prepared in Example 6-25 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-30

Preparation of Protective Film for Polarizing Plate

The anti-reflection film prepared in Example 6-26 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-31

Preparation of Protective Film for Polarizing Plate

The anti-reflection film prepared in Example 6-27 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-32

Preparation of Protective Film for Polarizing Plate

The anti-reflection film prepared in Example 6-28 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-33

Preparation of Protective Film for Polarizing Plate

The anti-reflection film prepared in Example 6-29 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-34

Preparation of Protective Film for Polarizing Plate

The anti-reflection film prepared in Example 6-30 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-35

Preparation of Protective Film for Polarizing Plate

The anti-reflection film prepared in Example 6-31 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-36

Preparation of Protective Film for Polarizing Plate

The anti-reflection film prepared in Example 6-32 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-37

Preparation of Protective Film for Polarizing Plate

The anti-reflection film prepared in Example 6-33 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-38

Preparation of Protective Film for Polarizing Plate

The anti-reflection film prepared in Example 6-34 was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Example 7-39

Preparation of Protective Film for Polarizing Plate

The anti-reflection film prepared in Example 6-35 was subjected to saponification in the same manner as in Example 2-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-A

Preparation of Protective Film for Polarizing Plate

The anti-reflection film prepared in comparative Example 3-A was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-B

Preparation of Protective Film for Polarizing Plate

The anti-reflection film prepared in comparative Example 3-B was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-C

Preparation of Protective Film for Polarizing Plate

The anti-reflection film prepared in comparative Example 3-C was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-D

Preparation of Protective Film for Polarizing Plate

The anti-reflection film prepared in comparative Example 3-D was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-E

Preparation of Protective Film for Polarizing Plate

The anti-reflection film prepared in comparative Example 3-E was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-9. The results are shown in Table 4.

Comparative Example 4-F

Preparation of Protective Film for Polarizing Plate

An anti-reflection film was prepared in the same manner as in Comparative Example 3-D except that nitrogen purge was not effect during the preparation of the middle refraction layer and the high refraction layer.

The anti-reflection film thus prepared was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-G

Preparation of Protective Film for Polarizing Plate

The anti-reflection film prepared in comparative Example 3-H was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-H

Preparation of Protective Film for Polarizing Plate

The anti-reflection film prepared in comparative Example 3-I was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

Comparative Example 4-I

Preparation of Protective Film for Polarizing Plate

The anti-reflection film prepared in comparative Example 3-J was subjected to saponification in the same manner as in Example 7-7. Thus, a protective film for polarizing plate was prepared.

Evaluation of Protective Film for Polarizing Plate

The protective film for polarizing plate thus prepared was then evaluated in the same manner as in Example 7-7. The results are shown in Table 4.

TABLE 4

| | Film exfoliation | Resistance to scratch with steel wool | Pencil hardness | Dynamic friction coefficient | Chemical resistance | Finger print wipability | Magic ink wipability | Contact angle (°) | Checkerboard adhesiveness | Ra (μm) | Antiglare performace | Light-resistance Hours 100 | 200 | 300 |
|---|---|---|---|---|---|---|---|---|---|---|---|---|---|---|
| Example 7-1 | — | E | 3H | 0.10 | G | G | G | 102 | E | — | — | — | — | — |
| Example 7-2 | — | E | 3H | 0.09 | G | G | G | 103 | E | — | — | — | — | — |
| Example 7-3 | — | E | 3H | 0.10 | G | G | G | 102 | E | — | — | — | — | — |
| Example 7-4 | — | G | 3H | 0.09 | G | G | G | 103 | E | — | — | — | — | — |
| Example 7-5 | — | E | 3H | 0.11 | G | G | G | 102 | E | 0.13 | E | — | — | — |
| Example 7-6 | — | G | 3H | 0.11 | G | G | G | 102 | E | 0.13 | E | — | — | — |
| Example 7-7 | G | E | 3H | 0.13 | G | G | G | 102 | E | — | — | — | — | — |
| Example 7-8 | G | E | 3H | 0.12 | G | G | G | 101 | E | — | — | — | — | — |
| Example 7-9 | G | E | 3H | 0.13 | G | G | G | 101 | E | 0.06 | G | — | — | — |
| Example 7-10 | G | E | 3H | 0.13 | G | G | G | 100 | E | 0.06 | G | — | — | — |
| Example 7-11 | G | E | 3H | 0.12 | G | G | G | 101 | E | — | — | — | — | — |
| Example 7-12 | G | G | 3H | 0.11 | G | G | G | 101 | E | — | — | — | — | — |
| Example 7-13 | G | E | 3H | 0.13 | G | G | G | 102 | E | — | — | — | — | — |
| Example 7-14 | G | E | 3H | 0.12 | G | G | G | 101 | E | — | — | — | — | — |
| Example 7-15 | G | E | 3H | 0.13 | G | G | G | 100 | E | 0.07 | G | — | — | — |
| Example 7-16 | G | E | 3H | 0.13 | G | G | G | 102 | E | 0.06 | G | — | — | — |
| Example 7-17 | G | E | 3H | 0.12 | G | G | G | 102 | E | — | — | — | — | — |
| Example 7-18 | G | G | 3H | 0.12 | G | G | G | 101 | E | — | — | — | — | — |
| Example 7-19 | G | E | 3H | 0.12 | G | G | G | 101 | E | — | — | — | — | — |
| Example 7-20 | G | E | 3H | 0.12 | G | G | G | 101 | E | — | — | — | — | — |
| Example 7-21 | G | E | 3H | 0.13 | G | G | G | 103 | E | — | — | — | — | — |
| Example 7-22 | G | E | 3H | 0.12 | G | G | G | 101 | E | — | — | — | — | — |
| Example 7-23 | G | E | 3H | 0.13 | G | G | G | 101 | E | — | — | — | — | — |
| Example 7-24 | G | E | 3H | 0.12 | G | G | G | 102 | E | — | — | — | — | — |
| Example 7-25 | G | E | 3H | 0.13 | G | G | G | 101 | E | 0.13 | E | — | — | — |
| Example 7-26 | G | G | 3H | 0.13 | G | G | G | 101 | E | 0.13 | E | — | — | — |
| Example 7-27 | G | E | 3H | 0.12 | G | G | G | 102 | E | 0.12 | E | — | — | — |
| Example 7-28 | G | G | 3H | 0.13 | G | G | G | 102 | E | 0.12 | E | — | — | — |
| Example 7-29 | G | E | 3H | 0.12 | G | G | G | 101 | E | — | — | — | — | — |
| Example 7-30 | G | E | 3H | 0.13 | G | G | G | 100 | E | — | — | — | — | — |
| Example 7-31 | G | E | 3H | 0.12 | G | G | G | 102 | E | — | — | — | — | — |
| Example 7-32 | G | E | 3H | 0.13 | G | G | G | 100 | E | — | — | — | — | — |
| Example 7-33 | G | E | 3H | 0.12 | G | G | G | 101 | E | — | — | — | — | — |
| Example 7-34 | G | E | 3H | 0.13 | G | G | G | 100 | E | — | — | — | — | — |
| Example 7-35 | G | E | 3H | 0.12 | G | G | G | 101 | E | — | — | F | P | P |
| Example 7-36 | G | E | 3H | 0.11 | G | G | G | 102 | E | — | — | G | P | P |
| Example 7-37 | G | E | 3H | 0.12 | G | G | G | 101 | E | — | — | E | G | F |
| Example 7-38 | G | E | 3H | 0.12 | G | G | G | 102 | E | — | — | E | G | F |
| Example 7-39 | G | E | 3H | 0.12 | G | G | G | 101 | E | — | — | E | G | F |
| Comparative Example 4-A | G | F | 2H | 0.13 | P | G | P | 100 | E | — | — | — | — | — |
| Comparative Example 4-B | G | F | 2H | 0.12 | P | G | P | 101 | E | — | — | — | — | — |
| Comparative Example 4-C | G | P | 3H | 0.12 | P | G | P | 101 | E | — | — | — | — | — |
| Comparative Example 4-D | G | P | 3H | 0.11 | P | G | P | 101 | E | — | — | — | — | — |
| Comparative Example 4-E | G | P | 3H | 0.13 | P | G | P | 102 | E | 0.06 | G | — | — | — |
| Comparative Example 4-F | P | — | — | — | — | — | — | — | E | — | — | — | — | — |
| Comparative Example 4-G | G | P | 3H | 0.12 | P | G | P | 101 | E | — | — | — | — | — |
| Comparative Example 4-H | G | P | 3H | 0.13 | P | G | P | 100 | E | — | — | — | — | — |
| Comparative Example 4-I | G | P | 3H | 0.12 | P | G | P | 102 | E | — | — | P | P | P |

Example 8

Preparation of Protective Film for Polarizing Plate

A 1.5 N aqueous solution of sodium hydroxide was prepared, and then kept at 35° C. A 0.01 N diluted aqueous solution of sulfuric acid.

A protective film for polarizing plate was prepared in the same manner as in Example 7 except that the time during which the film is dipped in the aqueous solution of sodium hydroxide was properly adjusted such that the transparent support exhibited a contact angle of 35 degrees with respect to water on the side thereof opposite the side having a high refraction film.

Evaluation of Protective Film for Polarizing Plate

The protective film for polarizing plate thus prepared was then evaluated in the same manner as in Example 7-7 and 7-9. The results are shown in Table 5.

TABLE 5

| | Film exfoliation | Resistance to scratch with steel wool | Pencil hardness | Dynamic friction coefficient | Chemical ressitance | Finger print wipability | Magic ink wipability | Contact angle (°) | Checkerboard adhesiveness | Ra (µm) | Antiglare performace | Light-resistance Hours 100 | 200 | 300 |
|---|---|---|---|---|---|---|---|---|---|---|---|---|---|---|
| Example 8-1 | — | E | 3H | 0.09 | G | G | G | 103 | E | — | — | E | G | F |
| Example 8-2 | — | E | 3H | 0.10 | G | G | G | 103 | E | — | — | E | G | F |
| Example 8-3 | — | E | 3H | 0.09 | G | G | G | 103 | E | — | — | E | G | F |
| Example 8-4 | — | G | 3H | 0.10 | G | G | G | 104 | E | — | — | E | G | F |
| Example 8-5 | — | E | 3H | 0.10 | G | G | G | 103 | E | 0.13 | E | E | G | F |
| Example 8-6 | — | G | 3H | 0.10 | G | G | G | 102 | E | 0.13 | E | E | G | F |
| Example 8-7 | G | E | 3H | 0.12 | G | G | G | 103 | E | — | — | E | G | F |
| Example 8-8 | G | E | 3H | 0.11 | G | G | G | 102 | E | — | — | E | G | F |
| Example 8-9 | G | E | 3H | 0.12 | G | G | G | 101 | E | 0.06 | G | E | G | F |
| Example 8-10 | G | E | 3H | 0.12 | G | G | G | 101 | E | 0.06 | G | E | G | F |
| Example 8-11 | G | E | 3H | 0.11 | G | G | G | 101 | E | — | — | E | G | F |
| Example 8-12 | G | G | 3H | 0.10 | G | G | G | 102 | E | — | — | E | G | F |
| Example 8-13 | G | E | 3H | 0.12 | G | G | G | 102 | E | — | — | E | G | F |
| Example 8-14 | G | E | 3H | 0.11 | G | G | G | 102 | E | — | — | E | G | F |
| Example 8-15 | G | E | 3H | 0.12 | G | G | G | 102 | E | 0.07 | G | E | G | F |
| Example 8-16 | G | E | 3H | 0.12 | G | G | G | 102 | E | 0.06 | G | E | G | F |
| Example 8-17 | G | E | 3H | 0.11 | G | G | G | 102 | E | — | — | E | G | F |
| Example 8-18 | G | G | 3H | 0.11 | G | G | G | 101 | E | — | — | E | G | F |
| Example 8-19 | G | E | 3H | 0.11 | G | G | G | 102 | E | — | — | E | G | F |
| Example 8-20 | G | E | 3H | 0.11 | G | G | G | 103 | E | — | — | E | G | F |
| Example 8-21 | G | E | 3H | 0.12 | G | G | G | 103 | E | — | — | E | G | F |
| Example 8-22 | G | E | 3H | 0.11 | G | G | G | 101 | E | — | — | E | G | F |
| Example 8-23 | G | E | 3H | 0.12 | G | G | G | 102 | E | — | — | E | G | F |
| Example 8-24 | G | E | 3H | 0.11 | G | G | G | 102 | E | — | — | E | G | F |
| Example 8-24 | G | E | 3H | 0.11 | G | G | G | 102 | E | — | — | E | G | F |
| Example 8-25 | G | E | 3H | 0.12 | G | G | G | 103 | E | 0.13 | E | E | G | F |
| Example 8-26 | G | G | 3H | 0.12 | G | G | G | 101 | E | 0.13 | E | E | G | F |
| Example 8-27 | G | E | 3H | 0.11 | G | G | G | 103 | E | 0.12 | E | E | G | F |
| Example 8-28 | G | G | 3H | 0.12 | G | G | G | 102 | E | 0.12 | E | E | G | F |
| Example 8-29 | G | E | 3H | 0.11 | G | G | G | 102 | E | — | — | E | G | F |
| Example 8-30 | G | E | 3H | 0.12 | G | G | G | 101 | E | — | — | E | G | F |
| Example 8-31 | G | E | 3H | 0.11 | G | G | G | 103 | E | — | — | E | E | G |
| Example 8-32 | G | E | 3H | 0.12 | G | G | G | 103 | E | — | — | E | E | G |
| Example 8-33 | G | E | 3H | 0.11 | G | G | G | 102 | E | — | — | E | E | E |
| Example 8-34 | G | E | 3H | 0.12 | G | G | G | 101 | E | — | — | E | E | E |
| Example 8-35 | G | E | 3H | 0.10 | G | G | G | 103 | E | — | — | E | G | F |
| Example 8-36 | G | E | 3H | 0.11 | G | G | G | 102 | E | — | — | E | G | F |
| Example 8-37 | G | E | 3H | 0.10 | G | G | G | 103 | E | — | — | E | E | G |
| Example 8-38 | G | E | 3H | 0.11 | G | G | G | 102 | E | — | — | E | E | E |
| Example 8-39 | G | E | 3H | 0.10 | G | G | G | 103 | E | — | — | E | E | E |
| Comparative Example 5-A | G | F | 2H | 0.12 | G | G | G | 103 | E | — | — | E | G | F |
| Comparative Example 5-B | G | F | 2H | 0.11 | G | G | G | 102 | E | — | — | E | G | F |
| Comparative Example 5-C | G | P | 3H | 0.11 | G | G | G | 101 | E | — | — | E | G | F |
| Comparative Example 5-D | G | P | 3H | 0.10 | G | G | G | 102 | E | — | — | E | G | F |
| Comparative Example 5-E | G | P | 3H | 0.12 | G | G | G | 103 | E | 0.06 | G | E | G | F |
| Comparative Example 5-F | P | — | — | — | G | G | G | 103 | E | — | — | — | — | — |
| Comparative Example 5-G | G | P | 3H | 0.11 | G | G | G | 101 | E | — | — | P | P | P |
| Comparative Example 5-H | G | P | 3H | 0.12 | G | G | G | 103 | E | — | — | P | P | P |
| Comparative Example 5-I | G | P | 3H | 0.12 | G | G | G | 102 | E | — | — | P | P | P |

Example 9

Preparation of Transparent Support

A heterogeneous gel-like solution obtained by mixing and stirring 20 parts by weight of triacetyl cellulose, 48 parts by weight of methyl acetate, 20 parts by weight of cyclohexanone, 5 parts by weight of methanol, 5 parts by weight of ethanol, 2 parts by weight of triphenyl phosphate/biphenyldiphenyl phosphate (1/2), 0.1 parts by weight of silica (particle diameter: 20 nm) and 0.2 parts by weight of 2,4-bis-(n-octylthio)-6-(4-hydroxy-3,5-di-tert-butylanilino)-1,3,5-triazine was cooled to −70° C. for 6 hours, and then heated to 50° C. with stirring to prepare a triacetyl cellulose dope A.

The above triacetyl cellulose dope A was subjected to single-layer drum casting according to JP-A-7-11055 to prepare a triacetyl cellulose film having a thickness of 80 μm. Thus, a transparent support was prepared.

Preparation and Evaluation of Anti-Reflection Film and Protective Film for Polarizing Plate The testing procedure of Examples 6 to 8 were followed except that the transparent support thus prepared was used. The results were substantially the same as in Examples 6 to 8.

Example 10

Preparation of Transparent Support

The triacetyl cellulose dope A of Example 9 was heated to 180° C. at 1 MPa in a stainless steel sealable vessel for 5 minutes. The sealed vessel was then put in a 50° C. water bath to prepare a triacetyl cellulose dope B.

The above triacetyl cellulose dope B was then subjected to single-layer drum casting according to JP-A-7-11055 to prepare a triacetyl cellulose film having a thickness of 40 μm. Thus, a transparent support was prepared.

Preparation and Evaluation of Anti-Reflection Film and Protective Film for Polarizing Plate The testing procedure of Example 9 was followed except that the transparent support thus prepared was used. The results were substantially the same as in Example 9.

Example 11

Preparation of Polarizing Plate

A polyvinyl alcohol film having a thickness of 75 μm (produced by KURARAY CO., LTD.) was dipped in an aqueous solution comprising 100 parts by weight of water, 7 parts by weight of iodine and 105 parts by weight of potassium iodide so that iodine was adsorbed thereto. Subsequently, this film was longitudinally monoaxially stretched by a factor of 4.4 in a 4 wt % aqueous solution of boric acid, and then dried while being tensed to prepare a polarizing plate.

The protective films for polarizing plate described in Examples 7 to 10 were each then adhered to one side of the polarizing plate with a polyvinyl alcohol-based adhesive as an adhesive in such an arrangement that the saponified triacetyl cellulose side thereof was opposed to the polarizing plate. Further, a triacetyl cellulose film which had been saponified in the same manner as in Example 7-1 was adhered to the other side of the polarizing plate with the same polyvinyl alcohol-based adhesive. Thus, polarizing plates of the present invention were prepared.

For comparison, a protective film for polarizing plate having a contact angle of greater than 40 degrees with respect to water on the side thereof opposed to the polarizing plate was prepared by properly adjusting the saponification time. This protective film for polarizing plate was then processed in the same manner as mentioned above to prepare a polarizing plate.

Evaluation of Polarizing plate and Results of Evaluation

The polarizing plates thus prepared were each then evaluated for the following properties.

(1) Punching Test

The polarizing plates thus prepared were each subjected to punching test by which it is punched to a size of 26 in. by 100 sheets using a dumbbell die. The presence or absence of exfoliation of the polarizing film from the protective film for polarizing plate was then observed.

(2) Durability Test 100 sheets of the polarizing plate which had not been observed exfoliated in the punching test were allowed to stand in a thermo-hygrostat of 70° C. and 93% RH and a thermo-hygrostat of 25° C. and 93% RH alternately for 12 hours, totaling 100 hours, to undergo durability test. The test specimens were then observed for exfoliation of protective film from polarizing film.

None of 100 sheets of the polarizing plates prepared from the protective films for polarizing plate of the present invention having a contact angle of not greater than 40 degrees with respect to water on the side thereof opposed to the polarizing film were observed exfoliated between the polarizing film and the protective film for polarizing plate in the punching test and the durability test.

On the other hand, 5 or more of 100 sheets of the protective films for polarizing plate having a contact angle of greater than 40 degrees with respect to water on the side thereof opposite the polarizing film were observed exfoliated between the polarizing film and the protective film for polarizing plate in the punching test and the durability test.

Example 12

An optically anisotropic optically-compensated film having a disc of discotic structural unit disposed oblique to the surface of the transparent support which changes in its angle between the disc of discotic structural unit and the surface of the transparent support with the distance from the transparent support (Wide View Film SA-12B, produced by Fuji Photo Film Co., Ltd.) was subjected to saponification on the side thereof opposite the side having an optically anisotropic layer under the same conditions as in Example 7-7.

The protective films for polarizing plate of the present invention prepared in Examples 7 to 10 were each then adhered to one side of the polarizing film prepared in Example 6 with a polyvinyl alcohol-based adhesive as an adhesive in such an arrangement that the saponified triacetyl cellulose side thereof was opposed to the polarizing film. Further, the saponified optically compensated film was adhered to the other side of the polarizing film with the same polyvinyl alcohol-based adhesive in such an arrangement that the triacetyl cellulose side thereof was opposed to the polarizing film. TN, STN, IPS, VA and OCB mode transmission type, reflection type or semi-transmission type liquid crystal display devices provided with the polarizing plate of the present invention thus prepared exhibited an excellent daylight contrast, a very wide vertical and horizontal angle of view, an extremely excellent visibility and an excellent display quality as compared with liquid crystal display devices provided with a polarizing plate free of optically compensated film.

Example 13

Preparation of Coating Solution for Hard Coat Layer

To 315.0 g of a mixture of dipentaerythritol pentaacrylate and dipentaerythritol hexaacrylate (DPHA, produced by NIPPON KAYAKU CO., LTD.) were added 450.0 g of a methyl ethyl ketone dispersion of silica fine particles (MEK-ST, solid content concentration: 30% by weight, produced by NISSAN CHEMICAL INDUSTRIES, LTD.), 15.0 g of methyl ethyl ketone, 220.0 g of cyclohexanone and 16.0 g of a photopolymerization initiator (Irgacure 907, produced by Cibasophy Ciba-Geigy Japan Limited). The mixture was then stirred. The mixture was then filtered through a filter made of polypropylene having a pore diameter of 0.4 μm to prepare a coating solution for hard coat layer.

Preparation of Dispersion of Titanium Dioxide Fine Particles

As titanium dioxide fine particles there were used cobalt-containing titanium dioxide fine particles (MPT-129, produced by ISHIHARA SANGYO KAISHA, LTD.) which had been subjected to surface treatment with aluminum hydroxide and zirconium hydroxide.

To 257.1 g of the fine particles were then added 38.6 g of the following dispersant and 704.3 g of cyclohexanone. The mixture was then subjected to dispersion using a dynomill to prepare a dispersion of titanium dioxide having a weight-average diameter of 70 nm.

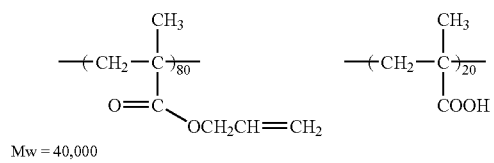

Mw = 40,000

Preparation of Coating Solution A for Middle Refraction Layer

To 88.9 g of the aforementioned dispersion of titanium dioxide were added 58.4 g of a mixture of dipentaerythritol pentaacrylate and dipentaerythritol hexaacrylate (DPHA), 3.1 g of a photopolymerization initiator (Irgacure 907, produced by Cibasophy Ciba-Geigy Japan Limited), 1.1 g of a photosensitizer (Kayacure DETX, produced by NIPPON KAYAKU CO., LTD.), 482.4 g of methyl ethyl ketone and 1,869.8 g of cyclohexanone. The mixture was then stirred. The mixture was then filtered through a filter made of polypropylene having a pore diameter of 0.4 μm to prepare a coating solution for middle refraction layer.

Preparation of Coating Solution A for High Refraction Layer

To 586.8 g of the aforementioned dispersion A of titanium dioxide were added 47.9 g of a mixture of dipentaerythritol pentaacrylate and dipentaerythritol hexaacrylate (DPHA, produced by NIPPON KAYAKU CO., LTD.), 4.0 g of a photopolymerization initiator (Irgacure 907, produced by Cibasophy Ciba-Geigy Japan Limited), 1.3 g of a photosensitizer (Kayacure DETX, produced by NIPPON KAYAKU CO., LTD.), 455.8 g of methyl ethyl ketone and 1,427.8 g of cyclohexanone. The mixture was then stirred. The mixture was then filtered through a filter made of polypropylene having a pore diameter of 0.4 μm to prepare a coating solution for high refraction layer.

Preparation of Silane Compound

In a reaction vessel equipped with an agitator and a reflux condenser were charged and mixed 161 parts by weight of 3-acryloxypropyltrimethoxysilane (KBM-5103, produced by Shin-Etsu Chemical Co., Ltd.), 123 parts by weight of oxalic acid and 415 parts by weight of ethanol. The mixture was reacted at 70° C. for 4 hours, and then cooled to room temperature to obtain a transparent silane compound as a curable composition. The silane compound thus obtained had a weight-average molecular weight of 1,600, and the components having a molecular weight of from 1,000 to 20,000 account for 100% of the oligomerorhigher components. The gas chromatography of the silane compound showed that 3-acryloxypropyltrimethoxysilane as a starting material had not been left therein.

Preparation of Coating Solution A for Low Refraction Film

The polymer (P-1) according to the present invention was dissolved in methyl isobutyl ketone in a concentration of 30% by weight. To the solution was then added a photopolymerization initiator Irgacure 907 (trade name) in an amount of 5% by weight based on the solid content to prepare a coating solution A for low refraction layer.

Preparation of Anti-Reflection Film 101

The coating solution for hard coat layer was applied to a triacetyl cellulose film having a thickness of 80 μm (TD-80UF, produced by Fuji Photo Film Co., Ltd.) using a gravure coater. The coated material was dried at 100° C., and then irradiated with ultraviolet ray having an illuminance of 400 mW/cm² from a 160 W/cm air-cooled metal halide lamp (produced by EYGRAPHICS Co., LTD.) at a dose of 300 mJ/cm² while the air in the reaction vessel was being purged with nitrogen to an oxygen concentration of not greater than 1.0% by volume to cause the coat layer to be cured, thereby forming a hard coat layer having a thickness of 3.5 μm.

The coating solution A for middle refraction layer was applied to the hard coat layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a middle refraction layer (refractive index: 1.65; thickness: 67 nm).

The coating solution A for high refraction layer was then applied to the middle refraction layer using a gravure coater. The coated material was dried at 100° C., and then irradiated with ultraviolet ray having an illuminance of 550 mW/cm² from a 240 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to cause the coat layer to be cured, thereby forming a high refraction layer (refractive index: 1.93; thickness: 107 nm).

The coating solution A for low refraction layer was then applied to the high refraction layer using a gravure coater. The coated material was dried at 80° C., irradiated with ultraviolet ray having an illuminance of 550 mW/cm² from a 160 W/cm air-cooled metal halide lamp (produced by EYGRAPHICS CO., LTD.) at a dose of 600 mJ/cm² while the air in the reaction vessel was being purged with nitrogen to an oxygen concentration of not greater than 1.0% by volume to form a low refraction layer (refractive index: 1.43; thickness: 86 nm). Thus, an anti-reflection film 101 was prepared.

Preparation of Anti-Reflection Film Samples 102 to 116

Anti-reflection films 102 to 116 were then prepared in the same manner as in the aforementioned anti-reflection film sample 101 except that (1) the titanium dioxide fine particles to be used in the middle refraction layer and the high refraction film were changed, (2) the copolymer (P-1) according to the present invention to be used in the low refraction layer A was changed to P-4, P-5 and P-13, respectively, and (3) the coating solution A for low refraction layer was replaced by the following coating solution B for low refraction layer as shown in Table 6.

a solid content concentration of 10% by weight. To 56.0 g of the aforementioned heat crosslinkable fluorine polymer solution were then added 8.0 g of a methyl ethyl ketone dispersion of silica fione particles (MEK-ST, solid content concentration: 30% by weight, produced by NISSAN CHEMICAL INDUSTRIES, LTD.), 1.75 g of the aforementioned silane compound, 73.0 g of methyl isobutyl ketone and 33.0 g of cyclohexanone. The mixture was then stirred. The mixture was then filtered through a filter made of polypropylene having a pore diameter of 0.4 μm to prepare a coating solution for low refraction layer.

TABLE 6

| | Sample No. | | | | | | | |
|---|---|---|---|---|---|---|---|---|
| | 101 | 102 | 103 | 104 | 105 | 106 | 107 | 108 |
| Element in titanium dioxide | Cobalt | " | " | " | Aluminum | Zirconium | None | Cobalt |
| Surface treatment | Aluminum hydroxide and Zirconium hydroxide | " | " | " | " | " | " | None |
| Low refraction layer | A(P-1) | A(P-4) | A(P-5) | A(P-13) | A(P-1) | " | " | " |
| Remarks | Invention | Invention | Invention | Invention | Invention | Invention | Comparison | Invention |

TABLE 7

| | Sample No. | | | | | | | |
|---|---|---|---|---|---|---|---|---|
| | 109 | 110 | 111 | 112 | 113 | 114 | 115 | 116 |
| Element in titanium dioxide | Aluminum | Zirconium | None | Cobalt | Aluminum | Zirconium | Cobalt | None |
| Surface treatment | None | " | " | Aluminum hydroxide and Zirconium hydroxide | " | " | None | None |
| Low refraction layer | A(P-1) | " | " | B | " | " | " | " |
| Remarks | Invention | Invention | Comparison | Comparison | Comparison | Comparison | Comparison | Comparison |

Preparation of Titanium Dioxide Fine Particles

A differently surface-treated titanium dioxide fine particles having other elements incorporated therein was prepared in the same manner as Sample 102 except that the preparation of the titanium dioxide fine particles used and the doping (injection) of cobalt, aluminum or zirconium instead of iron (Fe) and the surface treatment were carried out according to a known method (JP-A-5-330825). The content of the various elements were adjusted such that the ratio of Ti/element (by weight) was 98.5/1.5. The titanium dioxide fine particles thus prepared was recognized to have a rutile type crystal structure and had an average primary particle size of 40 nm, a specific surface area of 38 nm and a specific surface area of. 44 m²/g.

Preparation of Coating Solution B for Low Refractive Index

A heat crosslinkable fluorine-containing polymer having a refractive index of 1.42 (Opstar JN7228; solid content concentration: 6% by weight, produced by JSR Corporation) was subjected to solvent substitution to obtain a methyl isobutyl ketone solution of heat crosslinkable fluorine polymer having Evaluation of Anti-Reflection Film The various anti-reflection films thus prepared were then evaluated for the following properties. The results are shown in Table 8.

(1) Evaluation of Haze

The anti-reflection film was evaluated for haze using a haze meter (NHD-1001DP, produced by Nippon Denshoku Industries Co., Ltd.).

(2) Evaluation of Reflectance

The spectral reflectance at an incidence angle of 5° was measured at a wavelength of from 380 nm to 780 nm using a spectrophotometer (V-550, ARV-474, produced by JASCO Corporation). The average reflectance at a wavelength of from. 450 nm to 650 nm was then determined.

(3) Evaluation of Weathering Resistance

Using a xenon arc lamp type light-resistance testing machine (XF type) which had been conditioned for outdoor average sunshine with a borosilicate glass filer and a quartz filter, a weathering resistance test was effected at an illuminance of 80 klux on the irradiated surface in an atmosphere of a black body temperature of 63° C. and a relative humidity of 50% at an exposure time of 0 hour, 300 hours, 600 hours and 900 hours.

The anti-reflection film which had been thus exposed was then moisture-conditioned at a temperature of 25° C. and a relative humidity of 60% for 2 hours.

The anti-reflection film was then given a checkerboard cut comprising 11 longitudinal lines and 11 crosswise lines, totaling 100 squares, by a cutter knife on the surface thereof having a high refraction layer, and then subjected to adhesion test with a polyester adhesive tape (No. 31B) produced by NIITO DENKO CORPORATION three times on the same site. The anti-reflection film was then observed for the occurrence of peeling. The results were then evaluated according to the following 4-step criterion.

E: No checkers observed peeled out of 100 checkers

G: 2 or less checkers observed peeled out of 100 checkers

F: 3 to 10 checkers observed peeled out of 100 checkers

P: More than 10 checkers observed peeled out of 100 checkers

TABLE 8

| Sample No. | Haze (%) | Average reflectance (%) | Weathering resistance | | | |
|---|---|---|---|---|---|---|
| | | | 0 hr | 300 hr | 600 hr | 900 hr |
| 101 | 0.34 | 0.34 | E | E | E | E |
| 102 | 0.34 | 0.35 | E | F | E | E |
| 103 | 0.34 | 0.35 | E | E | E | E |
| 104 | 0.34 | 0.34 | E | E | E | E |
| 105 | 0.34 | 0.35 | E | E | E | G |
| 106 | 0.34 | 0.34 | E | E | E | G |
| 107 | 0.35 | 0.35 | E | G | P | P |
| 108 | 0.34 | 0.34 | E | E | E | G |
| 109 | 0.34 | 0.34 | E | E | G | G |
| 110 | 0.34 | 0.34 | E | E | G | G |
| 111 | 0.34 | 0.34 | E | F | P | P |
| 112 | 0.35 | 0.34 | E | G | P | P |
| 113 | 0.35 | 0.34 | E | F | P | P |
| 114 | 0.35 | 0.34 | E | F | P | P |
| 115 | 0.34 | 0.34 | E | F | P | P |
| 116 | 0.35 | 0.33 | E | P | P | P |

It can be seen in Table 7 that an excellent weathering resistance and anti-reflection performance can be realized by the use of an anti-reflection film having a titanium dioxide fine particles according to the present invention incorporated in the high refraction layer and a fluorine-containing copolymer according to the present invention incorporated in the low refraction layer. It can be also seen that cobalt-containing titanium dioxide fine particles which have been subjected to surface treatment exhibits an excellent weathering resistance.

In the samples prepared in the same manner as in Samples 101 to 116 except that the hard coat layer of Samples 101 to 116 was changed to the hard coat layer used in Examples 6 to 36, the same effect as obtained in Samples 101 to 116 was obtained.

Example 14

Evaluation of Image Display Device

The image display device provided with the anti-reflection film of the present invention thus prepared exhibited an excellent anti-reflection performance and an extremely excellent visibility.

Example 15

Preparation of Protective Film for Polarizing Plate

A saponifying solution was prepared by keeping a 1.5 N aqueous solution of sodium hydroxide at 50° C. Further, a 0.01 N aqueous solution of diluted sulfuric acid was prepared.

The anti-reflection films prepared in Examples 13 (Sample Nos. 101 to 116) were dipped in the above aqueous solution of sodium hydroxide for 2 minutes, and then dipped in water so that the aqueous solution of sodium hydroxide was thoroughly washed away. Subsequently, the anti-reflection films were dipped in the afore-mentioned diluted aqueous solution of sulfuric acid for 1 minute, dipped in water so that the diluted aqueous solution of sulfuric acid was thoroughly washed away, and then thoroughly dried at 100° C.

The anti-reflection films thus saponified were then evaluated for contact angle with respect to water on the surface of the transparent support on the side thereof opposite the side having a high refraction film. As a result, the contact angle was not greater than 40 degrees. Thus, a saponified transparent supports were prepared.

Preparation of Polarizing Plate

A polyvinyl alcohol film having a thickness of 75 μm (produced by KURARAY CO., LTD.) was dipped in an aqueous solution comprising 100 parts by weight of water, 7 parts by weight of iodine and 105 parts by weight of potassium iodide so that iodine was adsorbed thereto. Subsequently, this film was longitudinally monoaxially stretched by a factor of 4.4 in a 4 wt-% aqueous solution of boric acid, and then dried while being tensed to prepare a polarizing plate.

The anti-reflection film (protective film for polarizing plate) of the present invention was then adhered to one side of the polarizing plate with a polyvinyl alcohol-based adhesive as an adhesive in such an arrangement that the saponified triacetyl cellulose side thereof was opposed to the polarizing plate. Further, a triacetyl cellulose film which had been saponified in the same manner as mentioned above was adhered to the other side of the polarizing plate with the same polyvinyl alcohol-based adhesive.

Evaluation of Image Display Device

TN, STN, IPS, VA and OCB mode transmission type, reflection type or semi-transmission type liquid crystal display devices provided with the polarizing plate of the present invention thus prepared exhibited an excellent anti-reflection performance and hence an extremely excellent visibility. These effects were remarkable particularly in VA mode.

Example 16

Preparation of Polarizing Plate

An optically anisotropic optically-compensated film having a disc of discotic structural unit disposed oblique to the surface of the transparent support which changes in its angle between the disc of discotic structural unit and the surface of the transparent support with the distance from the transparent support (Wide View Film SA-12B, produced by Fuji Photo Film Co., Ltd.) was subjected to saponification on the side thereof opposite the side having an optically anisotropic layer under the same conditions as in Example 15.

The anti-reflection film (protective film for polarizing plate) prepared in Example 15 was then adhered to one side of the polarizing film prepared in Example 15 with a polyvinyl alcohol-based adhesive as an adhesive in such an arrangement that the saponified triacetyl cellulose side thereof was opposed to the polarizing film. Further, the saponified optically compensated film was adhered to the other side of the polarizing film with the same polyvinyl alcohol-based adhesive in such an arrangement that the triacetyl cellulose side thereof was opposed to the polarizing film.

Evaluation of Image Display Device

TN, STN, IPS, VA and OCB mode transmission type, reflection type or semi-transmission type liquid crystal display devices provided with the polarizing plate of the present invention thus prepared exhibited an excellent contrast, a very wide vertical and horizontal angle of view, an excellent anti-reflection performance and an extremely excellent visibility and display quality as compared with liquid crystal display devices provided with a polarizing plate free of optically compensated film.

These effects were remarkable particularly in VA mode.

ADVANTAGE OF THE PRESENT INVENTION

By preparing a high refraction film containing an inorganic fine particles comprising as a main component titanium dioxide comprising at least one element selected from the group consisting of cobalt, aluminum and zirconium, an anti-reflection film excellent in weathering resistance (particularly light-resistance) can be provided at a low price in a large amount.

By preparing a high refraction layer having the constitution of the present invention made of a dispersant, a binder and an inorganic fine particles as described in detail herein by a coating method, an anti-reflection film and a protective film for polarizing plate excellent in physical strength (scratch resistance, etc.), chemical resistance and weathering resistance (resistance to moist heat, light-resistance) can be provided at a low price in a large amount. Further, a polarizing plate and an image display device having the aforementioned characteristics can be provided thereby.

The invention claimed is:

1. A high refraction film having a refractive index of from 1.55 to 2.40 comprising inorganic fine particles having an average particle diameter of from 1 to 200 nm comprising titanium dioxide as a main component, said titanium dioxide containing cobalt, wherein the film further comprises an organic compound binder, and wherein said inorganic fine particles comprising titanium dioxide containing cobalt are dispersed with a dispersant.

2. The high refraction film of claim 1, wherein the cobalt is contained in an amount of from 0.05 to 30% by mass based on the mass of titanium.

3. The high refraction film of claim 1, wherein the cobalt is present in the interior of the inorganic fine particles.

4. The high refraction film of claim 1, wherein said inorganic fine particles have a specific surface area of from 10 to 400 m$^2$/g.

5. The high refraction film of claim 1, wherein said inorganic fine particles are coated with at least one compound selected from the group consisting of an inorganic compound, organic metallic compound and organic compound, which lowers or eliminates photocatalytic activity.

6. The high refraction film of claim 5, wherein the inorganic compound which lowers or eliminates photocatalytic activity contains at least one element selected from the group consisting of cobalt, aluminum and zirconium.

7. The high refraction film of claim 5, wherein said at least one compound which lowers or eliminates photocatalytic activity is an organic metal compound represented by the following general formula (I) or a derivative thereof:

$$(R^1)_m\text{—Si}(OR^2)_n \qquad (I)$$

wherein $R^1$ represents a substituted or unsubstituted alkyl group or aryl group, $R^2$ represents a substituted or unsubstituted alkyl group or acyl group, m represents 0 or an integer of from 1 to 3 and n represents an integer of from 1 to 4, with the proviso that the sum of m and n is 4.

8. The high refraction film of claim 1, wherein said dispersant has an anionic group.

9. The high refraction film of claim 1, wherein said dispersant further has a crosslinkable or polymerizable functional group.

10. The high refraction film of claim 9, wherein said dispersant has a crosslinkable or polymerizable functional group at the side chain.

11. The high refraction film of claim 9, wherein said dispersant has a weight-average molecular weight of not lower than 1,000.

12. A high refraction film having a refractive index of from 1.55 to 2.40 comprising inorganic fine particles having an average particle diameter of from 1 to 200 nm comprising titanium dioxide as a main component, wherein said titanium dioxide contains cobalt, and said titanium dioxide has a rutile crystal structure, wherein the film further comprises an organic compound binder, and wherein said inorganic fine particles comprising titanium dioxide containing cobalt are dispersed with a dispersant.

13. An anti-reflection film comprising a transparent support and at least one of a high refraction layer and a low refraction layer formed thereon, wherein said high refraction layer is a layer having a refractive index of from 1.55 to 2.40 and a thickness in the range of from 30 to 200 nm, wherein the high refraction layer is an optical interference layer, the high refraction layer comprising inorganic fine particles having an average particle diameter of from 1 to 200 nm comprising titanium dioxide as a main component, and said titanium dioxide contains cobalt.

14. A process for the production of the anti-reflection film of claim 13, comprising providing the high refraction film on a transparent support.

15. A protective film for polarizing plate comprising the anti-reflection film of claim 13, wherein the contact angle of the surface of the transparent support on the side thereof opposite the side having said high refraction film with respect to water is not greater than 40 degrees.

16. A process for the production of the protective film for polarizing plate of claim 15, comprising providing the high refraction film on a transparent support.

17. A polarizing plate comprising a polarizing film and two protective films having said polarizing film interposed therebetween, wherein the anti-reflection film of claim 13 is used as at least one of the two protective films.

18. A polarizing plate comprising a polarizing film and two protective films having said polarizing film interposed therebetween, wherein the anti-reflection film of claim 13 is used as one protective film and an optically compensated film having optical isomerism is used as another protective film.

19. The polarizing plate of claim 18, wherein said optically compensated film has an optically isomeric layer provided on one surface of the transparent support, said optically isomeric layer has a compound having a discotic structure unit, the surface of a disc of said discotic structure unit is oblique to the surface of the transparent support and the angle between the surface of a disc of said discotic structure unit and the surface of the transparent support changes with the distance from the transparent support.

20. An image display device having the anti-reflection film of claim 13 disposed on the image display surface thereof.

21. An image display device having the polarizing plate of claim 17 disposed on the image display surface thereof.

22. An image display device having the polarizing plate of claim 18 disposed on the image display surface thereof.

23. An anti-reflection film comprising a transparent support and at least one of a high refraction layer and a low refraction layer formed thereon, wherein said high refraction layer is a layer having a refractive index of from 1.55 to 2.40 comprising inorganic fine particles having an average particle diameter of from 1 to 200 nm comprising titanium dioxide as a main component, wherein said titanium dioxide contains cobalt, and said low refraction layer is a layer comprising a cured film of a copolymer as a main component comprising a repeating unit derived from a fluorine-containing vinyl monomer and a repeating unit having a (meth)acryloyl group in its side chain.

24. The anti-reflection film of claim 23, wherein said copolymer is a copolymer of the following general formula (III):

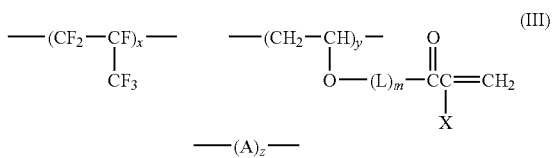
(III)

wherein L represents a $C_1$-$C_{10}$ connecting group, m represents 0 or 1, X represents a hydrogen atom or methyl group, A represents a repeating unit derived from an arbitrary vinyl monomer and may be constituted of a single component or a plurality of components, and x, y and z each represent mol % of the respective constituent and represent a value satisfying the relationships $30 \geq x \geq 60$, $5 \geq y \geq 70$ and $0 \geq z \geq 65$.

25. The anti-reflection film of claim 23, wherein said inorganic fine particles are coated with at least one compound selected from the group consisting of an inorganic compound, organic metallic compound and organic compound, which lowers or eliminates photocatalytic activity.

26. The anti-reflection film of claim 25, wherein the inorganic compound which lowers or eliminates photocatalytic activity contains at least one element selected from tile group consisting of cobalt, aluminum and zirconium.

27. The anti-reflection film of claim 25, wherein said at least one compound which lowers or eliminates photocatalytic activity is an organic metal compound represented by the following general formula (I) or a derivative thereof:

$$(R^1)_m—Si(OR^2)_n \qquad (I)$$

wherein $R^1$ represents a substituted or unsubstituted alkyl group or aryl group, $R^2$ represents a substituted or unsubstituted alkyl group or acyl group, m represents 0 or an integer of from 1 to 3 and n represents an integer of from 1 to 4, with the proviso that the sum of m and n is 4.

28. An image display device comprising the anti-reflection film of claim 23 disposed on an image display surface thereof.

29. An anti-reflection film comprising a transparent support and at least one of a high refraction layer and a low refraction layer formed thereon, wherein said high refraction layer is a layer having a refractive index of from 1.55 to 2.40 comprising inorganic fine particles having an average particle diameter of from 1 to 200 nm comprising titanium dioxide as a main component, wherein said titanium dioxide contains cobalt, and said titanium dioxide has a rutile crystal structure, wherein the film further comprises an organic compound binder, and wherein said inorganic fine particles comprising titanium dioxide containing cobalt are dispersed with a dispersant.

30. An image display device comprising the anti-reflection film of claim 29 disposed on an image display surface thereof.

* * * * *